(12) United States Patent
Beck et al.

(10) Patent No.: US 8,438,427 B2
(45) Date of Patent: May 7, 2013

(54) VISUALIZING RELATIONSHIPS BETWEEN A TRANSACTION TRACE GRAPH AND A MAP OF LOGICAL SUBSYSTEMS

(75) Inventors: Laura G Beck, San Francisco, CA (US); Natalya E Litt, San Francisco, CA (US); Nathan A Isley, San Francisco, CA (US)

(73) Assignee: CA, Inc., Islandia, NY (US)

( * ) Notice: Subject to any disclaimer, the term of this patent is extended or adjusted under 35 U.S.C. 154(b) by 109 days.

(21) Appl. No.: 13/082,737

(22) Filed: Apr. 8, 2011

(65) Prior Publication Data

US 2012/0260135 A1    Oct. 11, 2012

(51) Int. Cl.
*G06F 11/00* (2006.01)

(52) U.S. Cl.
USPC .......................................... 714/46; 714/38.1

(58) Field of Classification Search .................... 714/46, 714/38.1, 38.14, 37; 717/127, 128, 109; 345/594, 650, 661
See application file for complete search history.

(56) References Cited

U.S. PATENT DOCUMENTS

| | | | |
|---|---|---|---|
| 5,485,616 A | 1/1996 | Burke et al. | |
| 5,592,600 A | 1/1997 | De Pauw et al. | |
| 6,186,677 B1 | 2/2001 | Angel et al. | |
| 6,240,549 B1 | 5/2001 | Hamada et al. | |
| 6,260,187 B1 | 7/2001 | Cirne | |
| 6,282,701 B1 | 8/2001 | Wygodny et al. | |
| 6,338,159 B1 | 1/2002 | Alexander, III et al. | |
| 6,584,501 B1 | 6/2003 | Cartsonis et al. | |
| 6,792,460 B2 | 9/2004 | Oulu et al. | |
| 6,857,120 B1 | 2/2005 | Arnold et al. | |
| 6,996,806 B2 | 2/2006 | Bates et al. | |
| 7,003,781 B1 | 2/2006 | Blackwell et al. | |
| 7,203,624 B2 | 4/2007 | Warshawsky | |
| 7,281,170 B2 | 10/2007 | Taylor et al. | |
| 7,310,777 B2 | 12/2007 | Cirne | |
| 7,310,780 B2 | 12/2007 | Diering et al. | |
| 7,350,107 B2 | 3/2008 | Thaler et al. | |
| 7,505,953 B2 | 3/2009 | Doshi | |
| 7,509,632 B2 | 3/2009 | Boger | |
| 7,558,847 B2 | 7/2009 | Strassner | |
| 7,590,715 B1 | 9/2009 | Raanan | |
| 7,607,169 B1 | 10/2009 | Njemanze et al. | |
| 7,668,953 B1 | 2/2010 | Sinclair et al. | |
| 7,681,182 B1 | 3/2010 | Mistry et al. | |
| 7,904,892 B2 | 3/2011 | Babb, II et al. | |

(Continued)

OTHER PUBLICATIONS

Extended European Search Report dated Dec. 19, 2011, European Patent Application No. 11250805.6.

(Continued)

*Primary Examiner* — Dieu-Minh Le

(74) *Attorney, Agent, or Firm* — Vierra Magen Marcus LLP

(57) ABSTRACT

A method for diagnosing problems in a computer system by providing a user interface for visualizing flows through subsystems of the computer system, and allowing a user to explore relationships between a triage map which graphically depicts subsystems, and a transaction trace graph, which depicts a time sequence of invoked components of the subsystems. In one aspect, in response to a user selecting a portion of the transaction trace graph which depicts an invoked component, the user interface visually distinguishes one of the subsystems which invokes the invoked component. In another aspect, the transaction trace can be played back so that subsystems in the triage map are highlighted in turn, in a time sequence, as components of different subsystems are invoked. A time marker can skip to selected time points which result in updating of the triage map.

20 Claims, 30 Drawing Sheets

U.S. PATENT DOCUMENTS

| | | | |
|---|---|---|---|
| 8,135,739 B2 | 3/2012 | Karidi et al. | |
| 2002/0062237 A1 | 5/2002 | Matsumoto et al. | |
| 2002/0173997 A1 | 11/2002 | Menard et al. | |
| 2003/0056199 A1* | 3/2003 | Li et al. | 717/127 |
| 2003/0084018 A1 | 5/2003 | Chintalapati et al. | |
| 2004/0039728 A1 | 2/2004 | Fenlon et al. | |
| 2004/0064543 A1 | 4/2004 | Ashutosh et al. | |
| 2004/0075690 A1* | 4/2004 | Cirne | 345/771 |
| 2004/0078691 A1* | 4/2004 | Cirne et al. | 714/38 |
| 2005/0120273 A1 | 6/2005 | Hudson et al. | |
| 2005/0131927 A1 | 6/2005 | Fildebrandt et al. | |
| 2005/0210454 A1 | 9/2005 | DeWitt, Jr. et al. | |
| 2006/0004802 A1 | 1/2006 | Phillips et al. | |
| 2006/0036726 A1 | 2/2006 | Fabbio et al. | |
| 2007/0043861 A1 | 2/2007 | Baron et al. | |
| 2007/0263541 A1 | 11/2007 | Cobb et al. | |
| 2007/0266149 A1 | 11/2007 | Cobb et al. | |
| 2007/0288633 A1 | 12/2007 | Mullarkey | |
| 2008/0059625 A1 | 3/2008 | Barnett et al. | |
| 2009/0019428 A1 | 1/2009 | Li et al. | |
| 2009/0028053 A1 | 1/2009 | Kannan et al. | |
| 2009/0112667 A1 | 4/2009 | Blackwell et al. | |
| 2009/0144305 A1 | 6/2009 | Little | |
| 2009/0177509 A1 | 7/2009 | David et al. | |
| 2010/0145945 A1 | 6/2010 | Episale et al. | |
| 2010/0169331 A1 | 7/2010 | Karidi et al. | |
| 2010/0275054 A1 | 10/2010 | Grace et al. | |
| 2012/0072887 A1 | 3/2012 | Basak | |
| 2012/0259793 A1 | 10/2012 | Umansky et al. | |
| 2012/0260135 A1 | 10/2012 | Beck et al. | |

OTHER PUBLICATIONS

U.S. Appl. No. 12/885,135, filed Sep. 17, 2010.
Extended European Search Report dated Jun. 25, 2012, European Patent Application No. 12163428.1.
Extended European Search Report dated Jun. 28, 2012, European Patent Application No. 12163435.6.
Extended European Search Report dated Jul. 16, 2012, European Patent Application No. 12163454.7.
Non-final Office Action dated Nov. 20, 2012, U.S. Appl. No. 12/885,135, filed Sep. 17, 2010.
Response to Office Action dated Jan. 22, 2013, U.S. Appl. No. 13/082,723, filed Apr. 8, 2011.
Response to Office Action dated Sep. 21, 2012, European Patent Application No. 11250805.6.
Extended European Search Report dated Sep. 24, 2012, European Patent Application No. 12163427.3.
Non-final Office Action dated Oct. 22, 2012, U.S. Appl. No. 13/082,723 filed Apr. 8, 2011.
Response to Office Action dated Feb. 20, 2013, U.S. Appl. No. 12/885,135 filed Sep. 17, 2010.
Final Office Action dated Mar. 7, 2013, U.S. Appl. No. 13/082,737 filed Apr. 8, 2011.

* cited by examiner

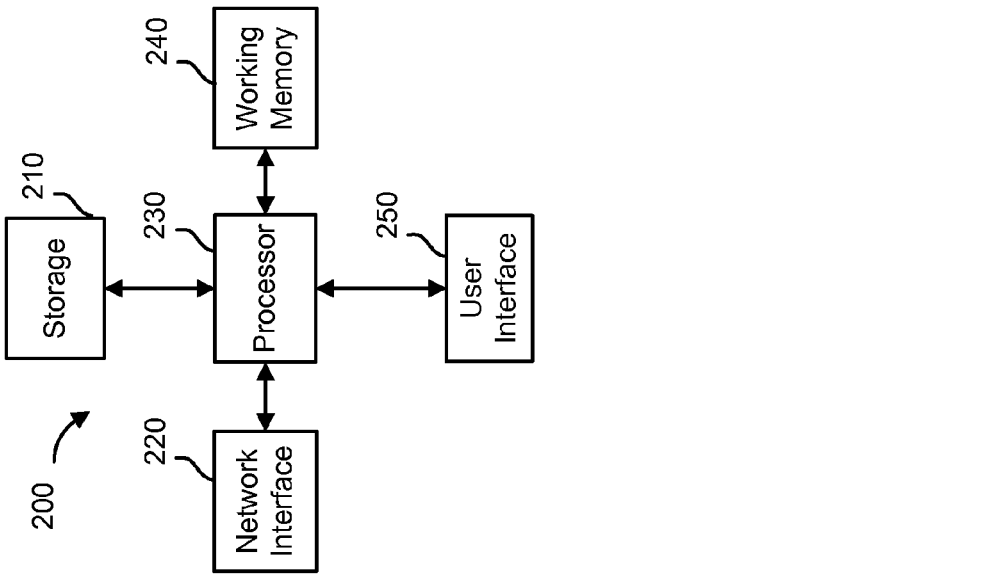
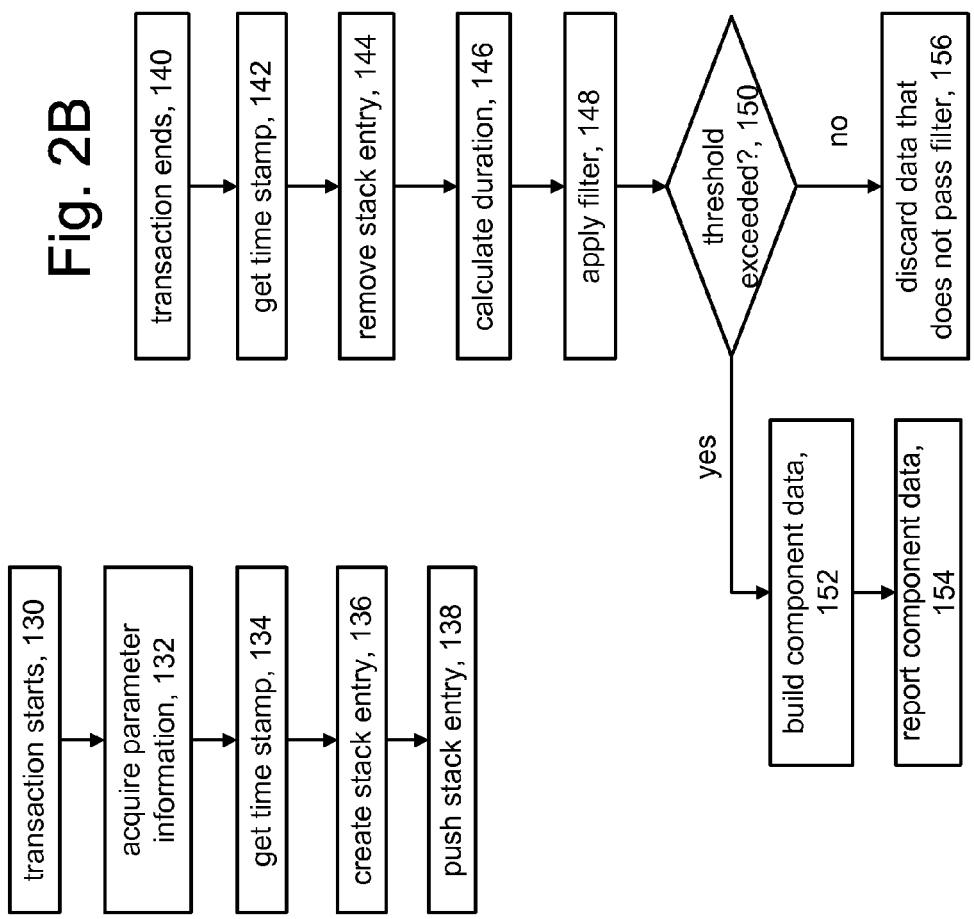

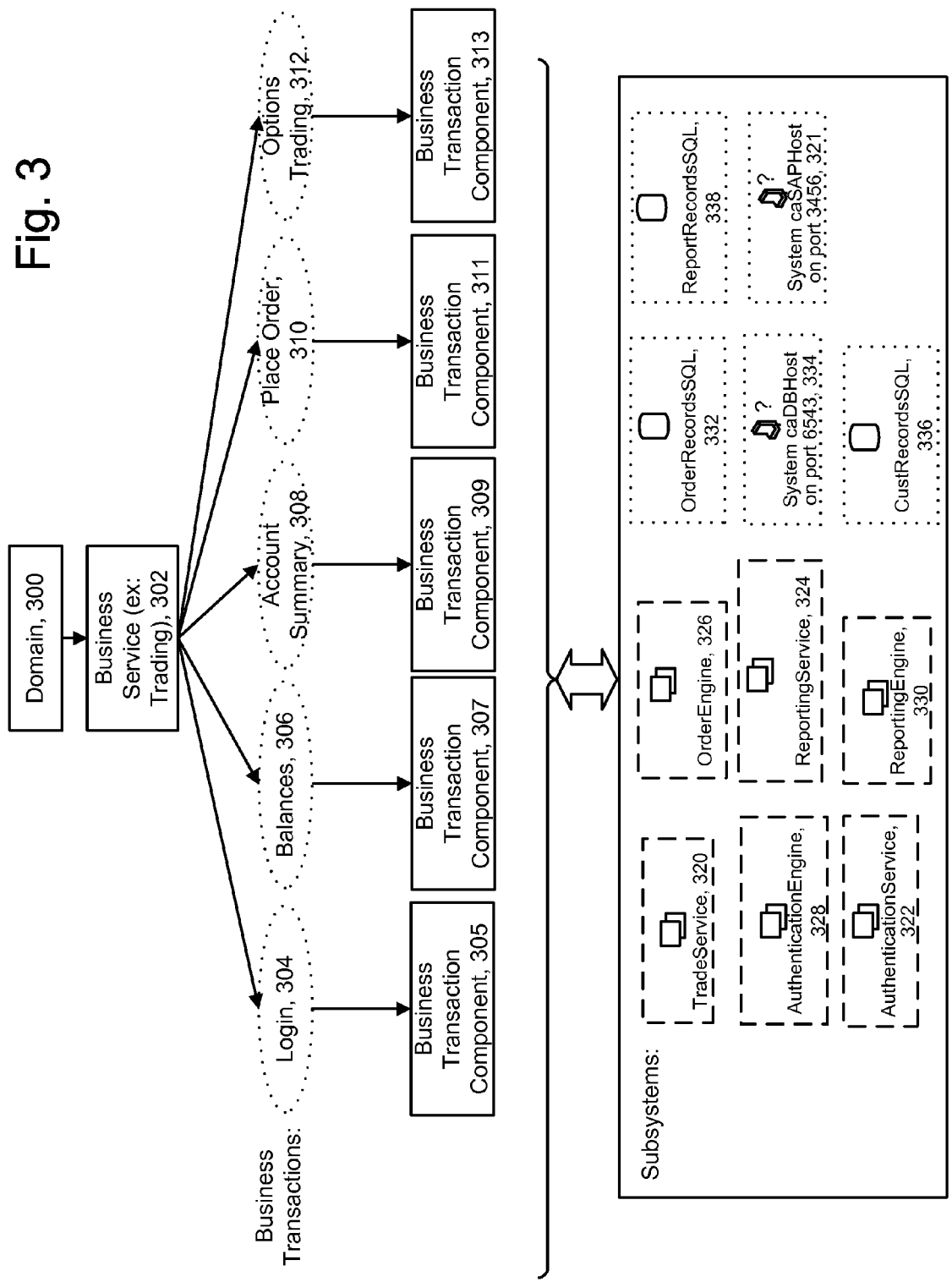

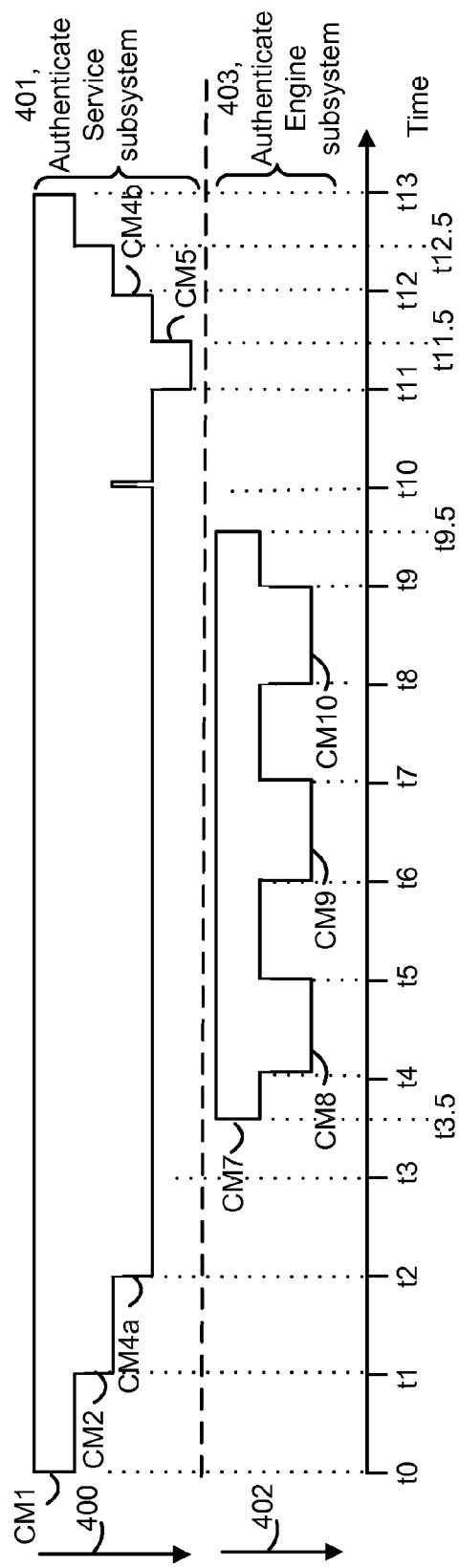
Fig. 4B1
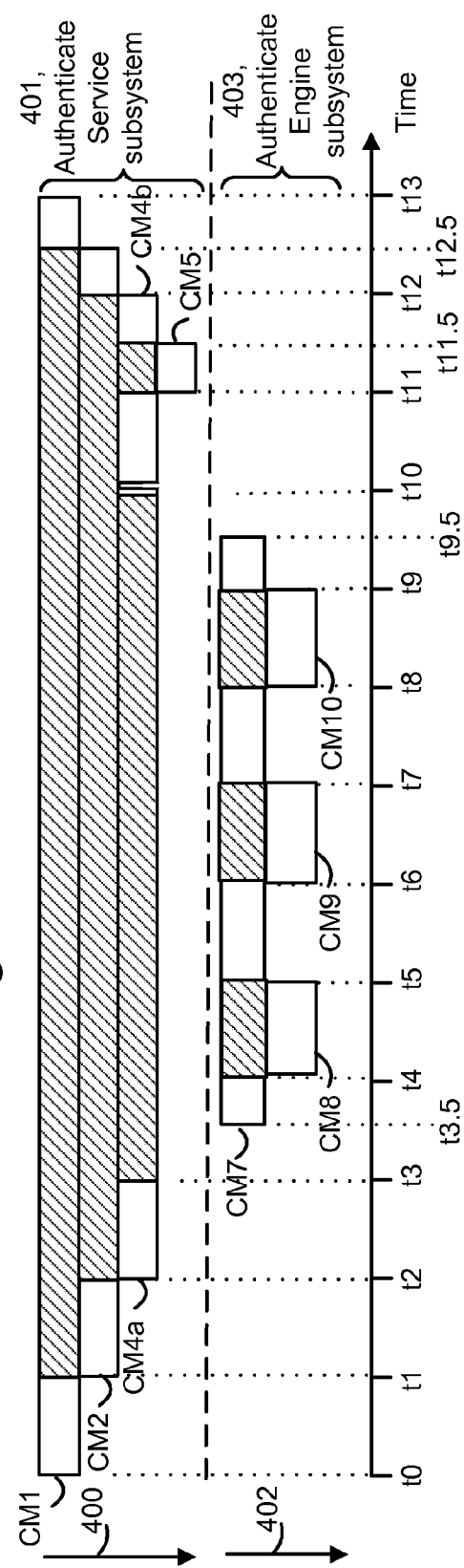
Fig. 4B2

Fig. 4B3
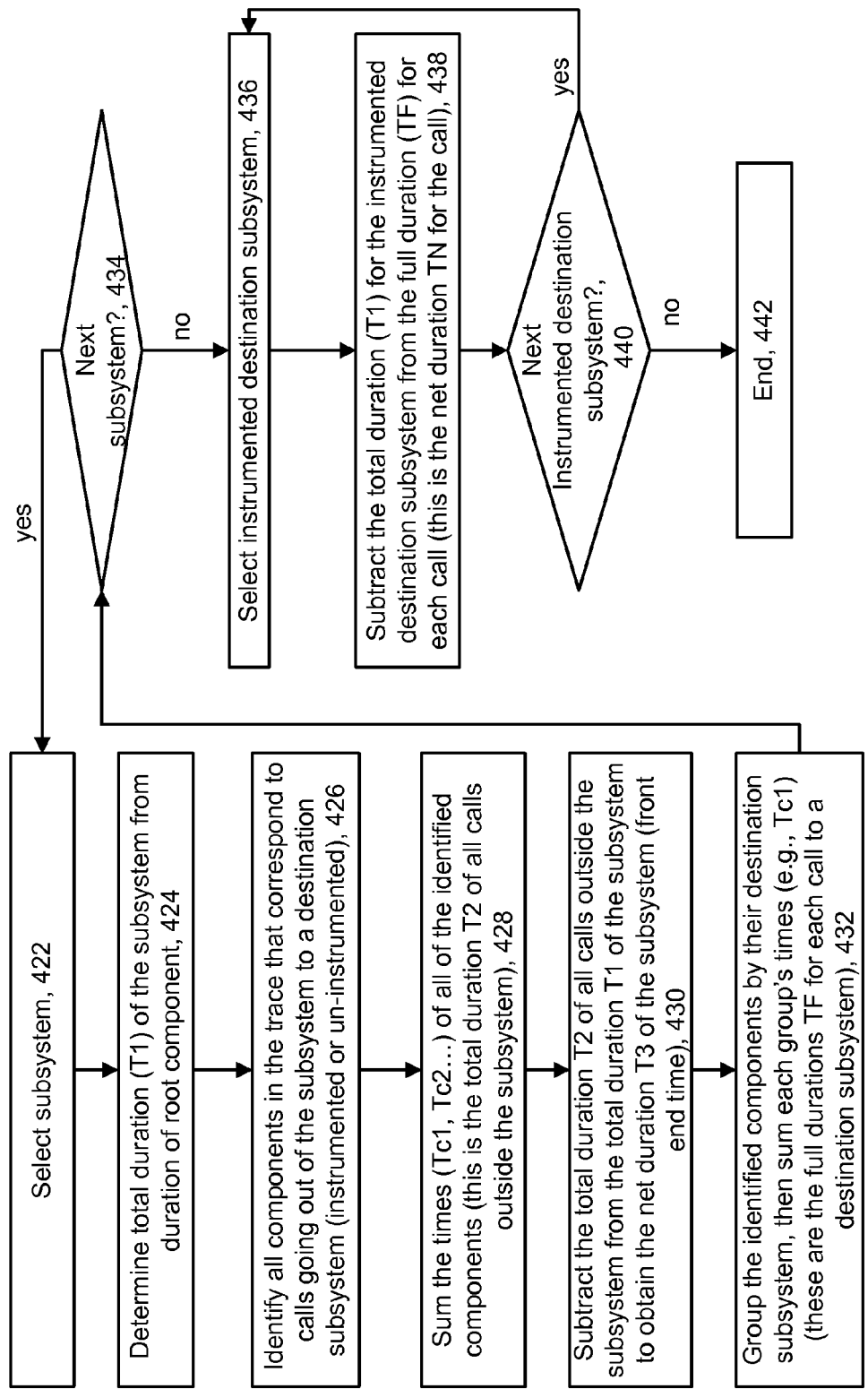

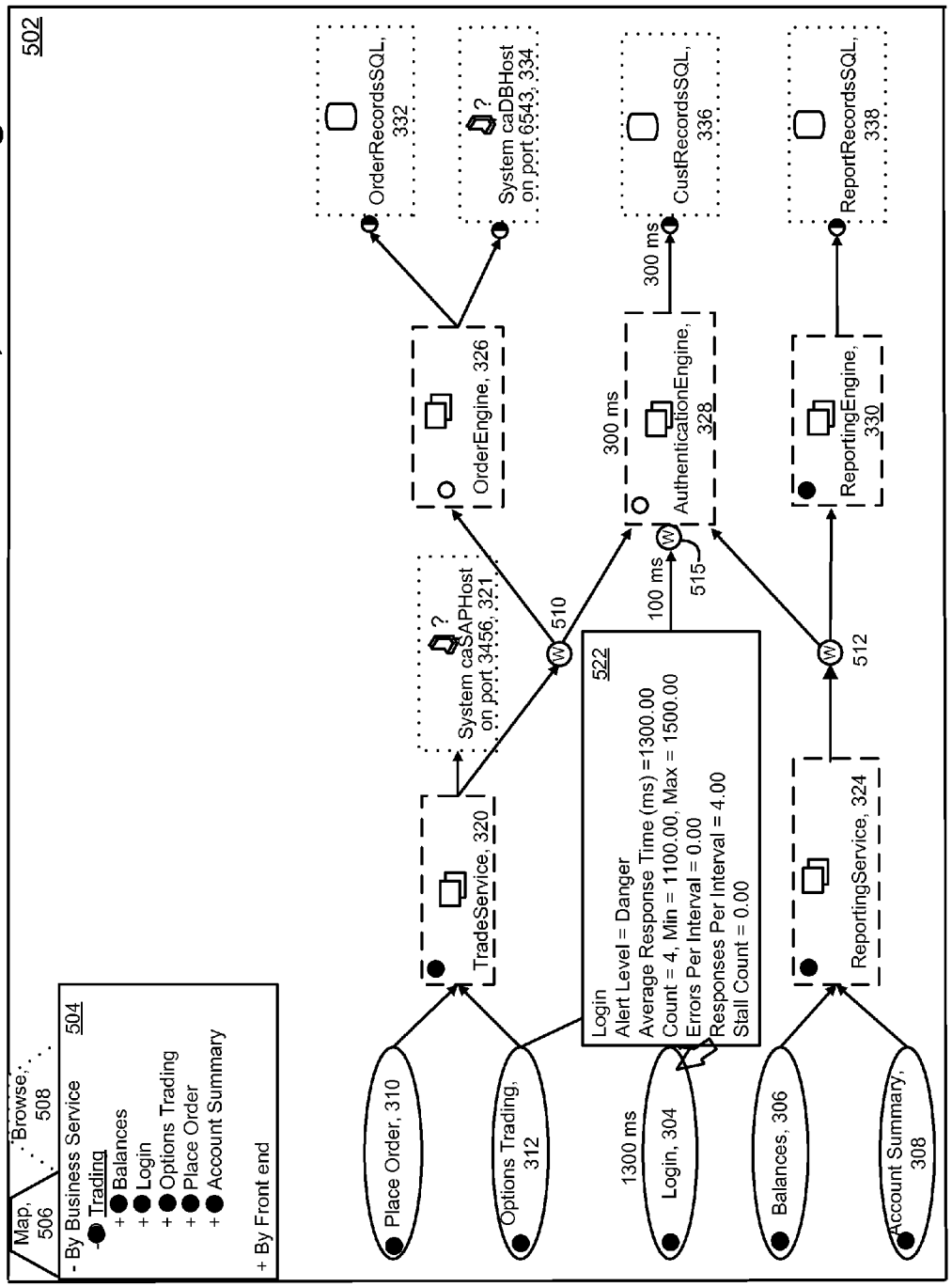
Fig. 5B1

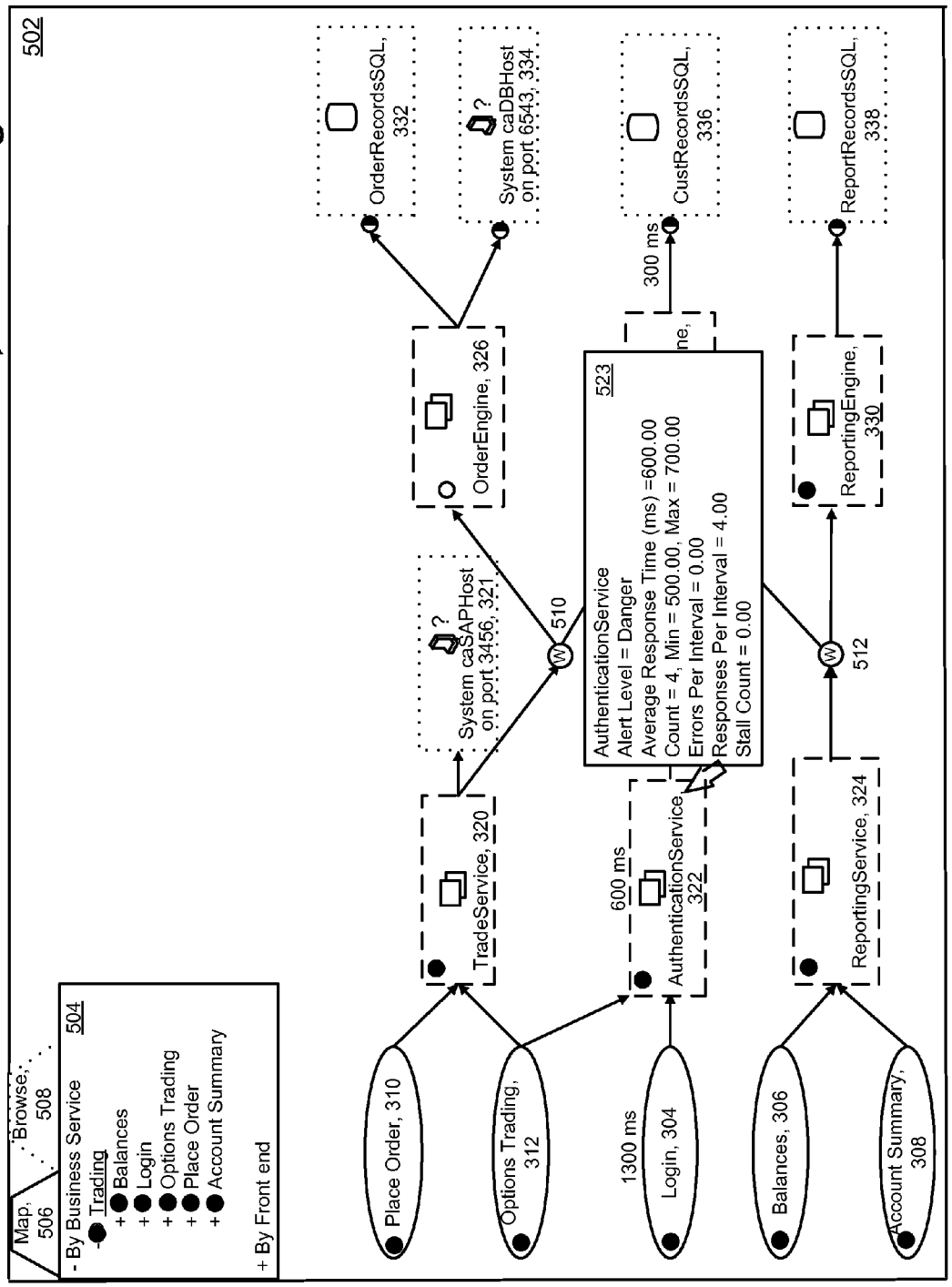
Fig. 5B2

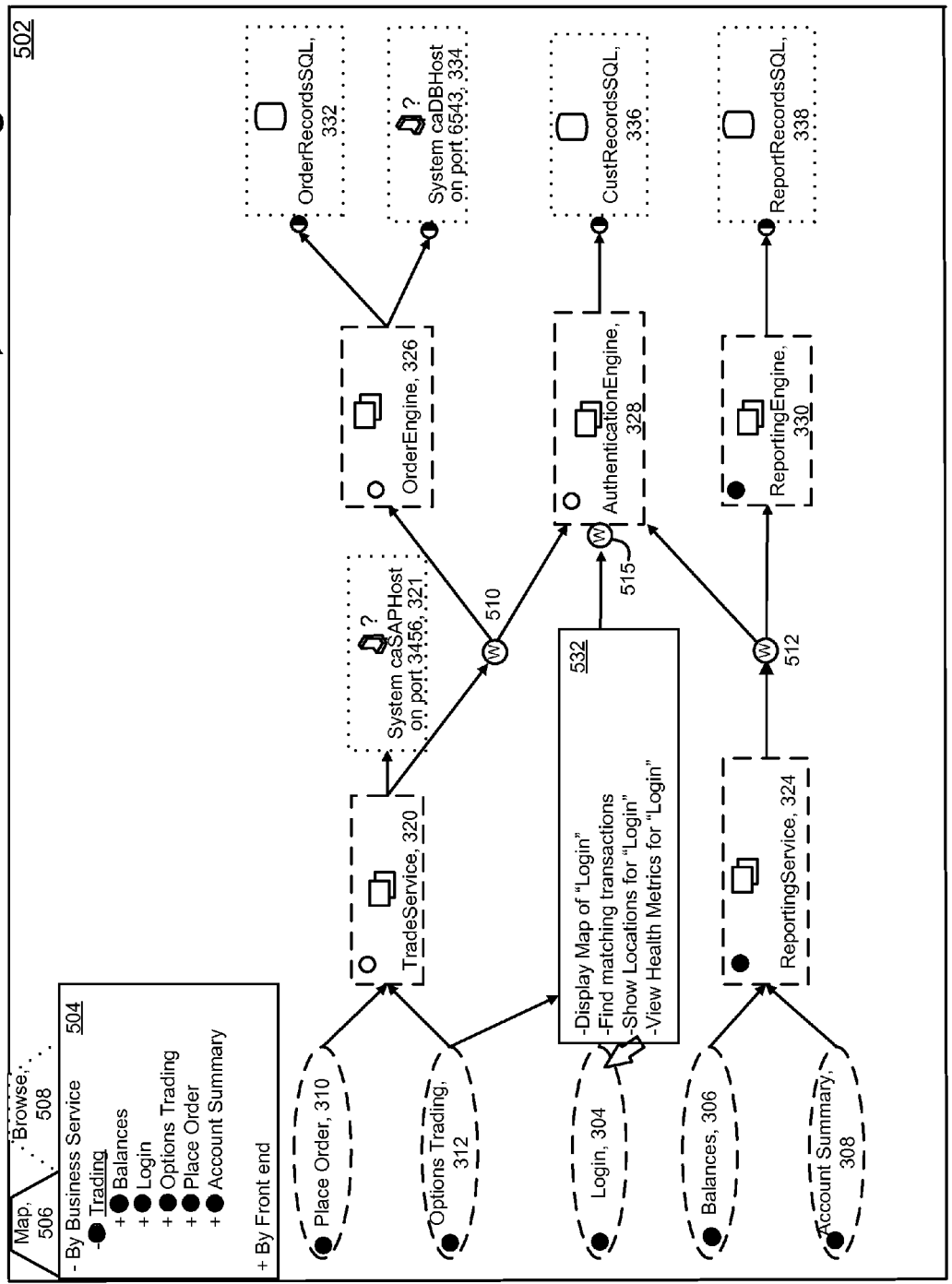

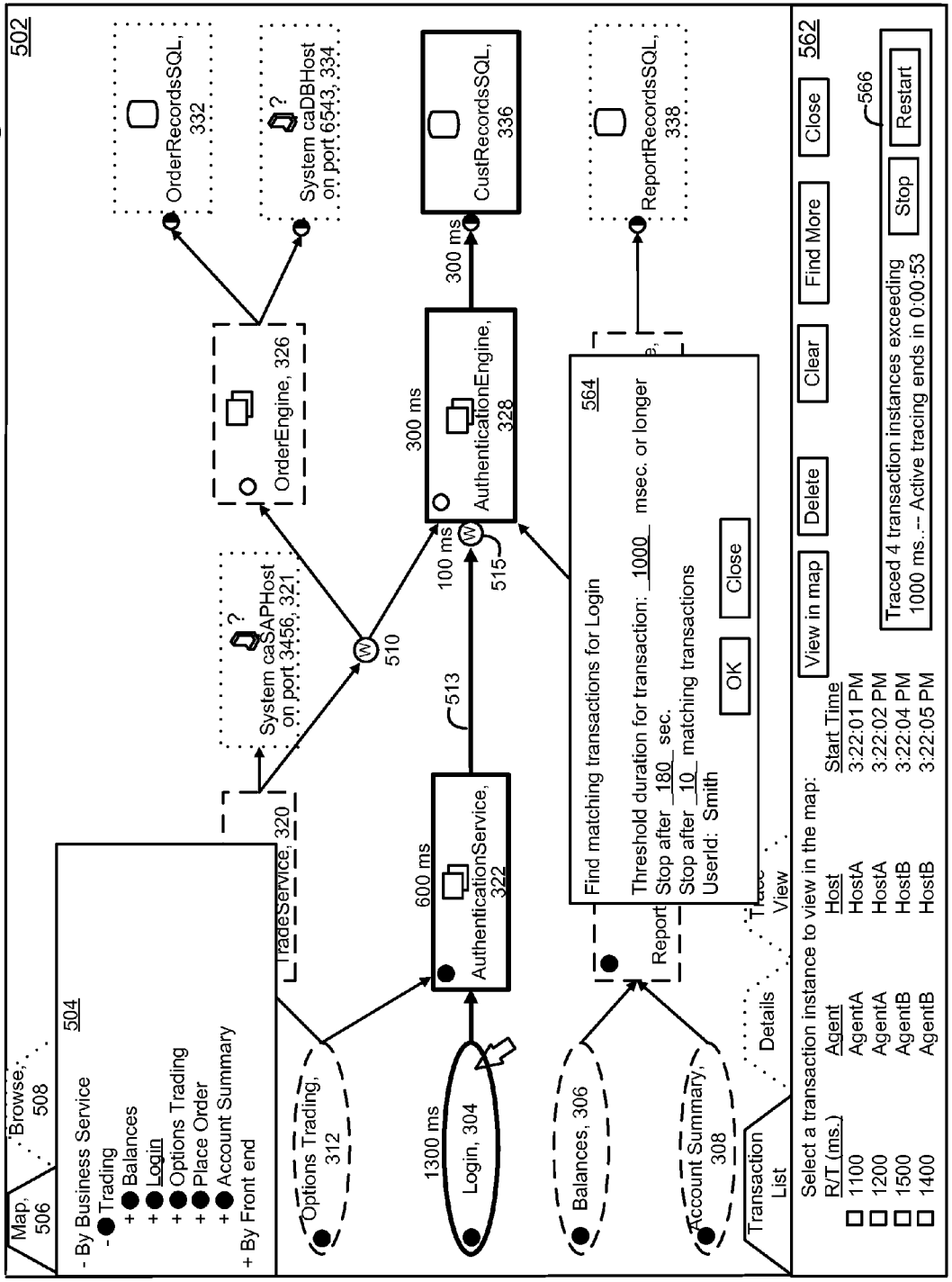
Fig. 5E1

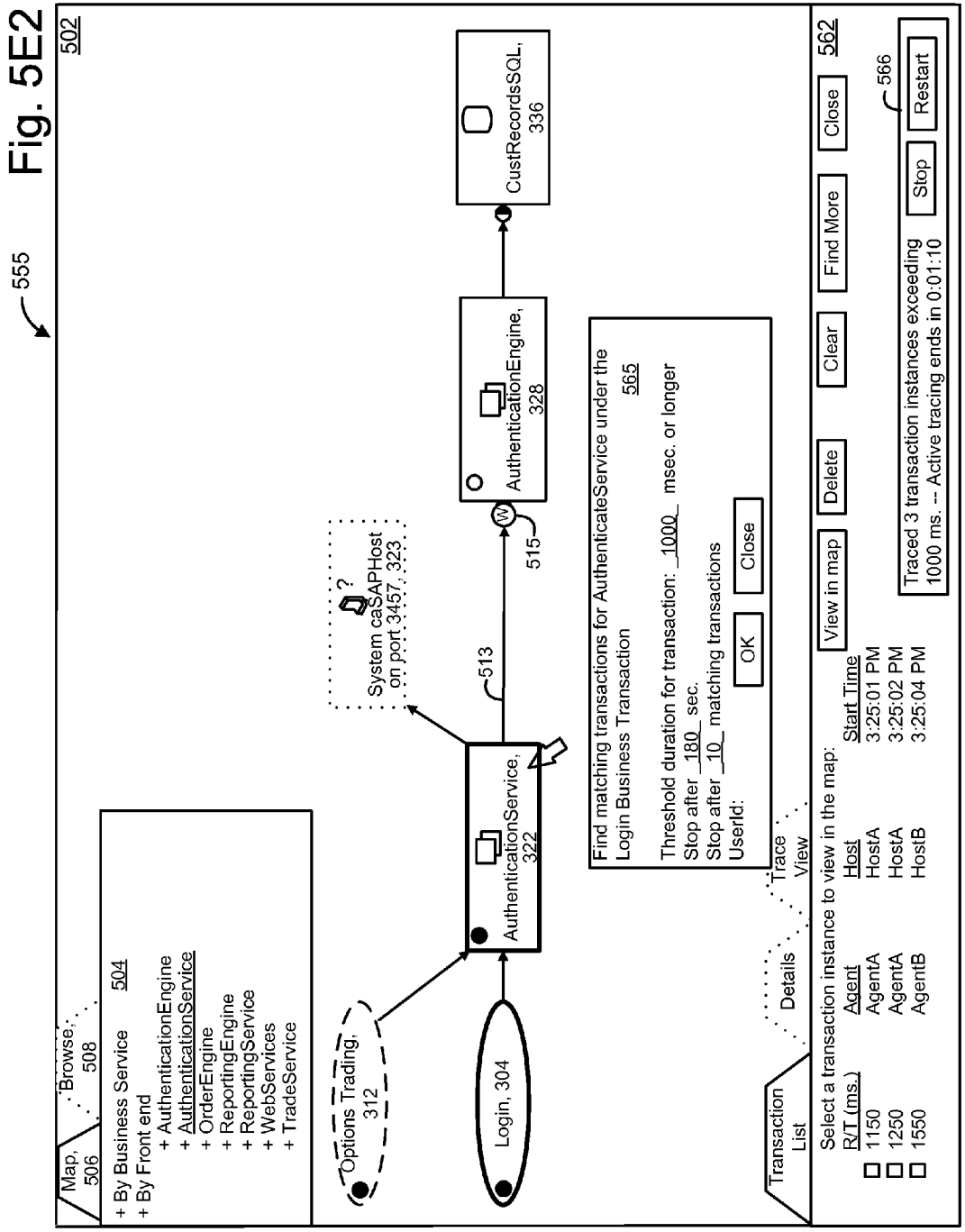
Fig. 5E2

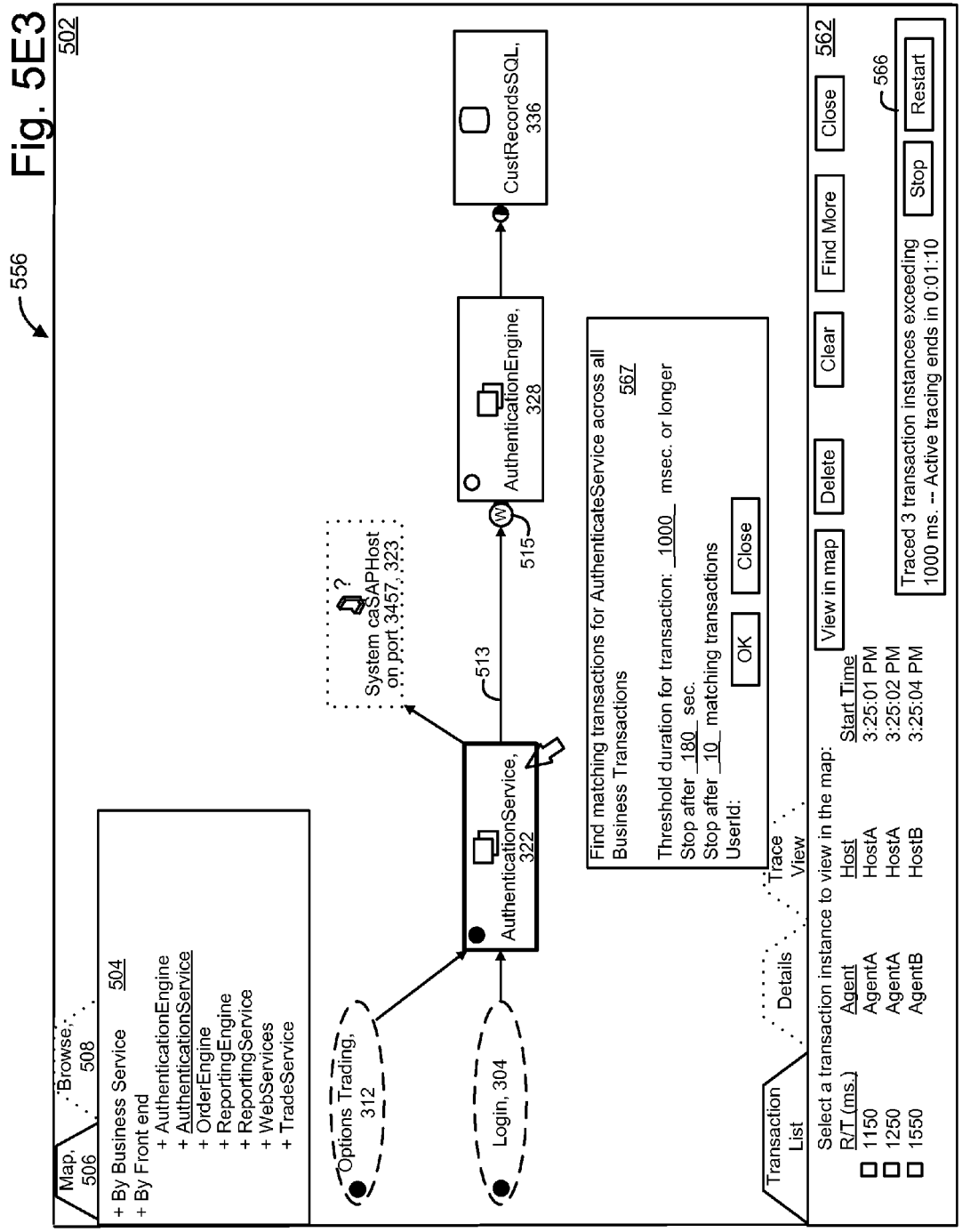
Fig. 5E3

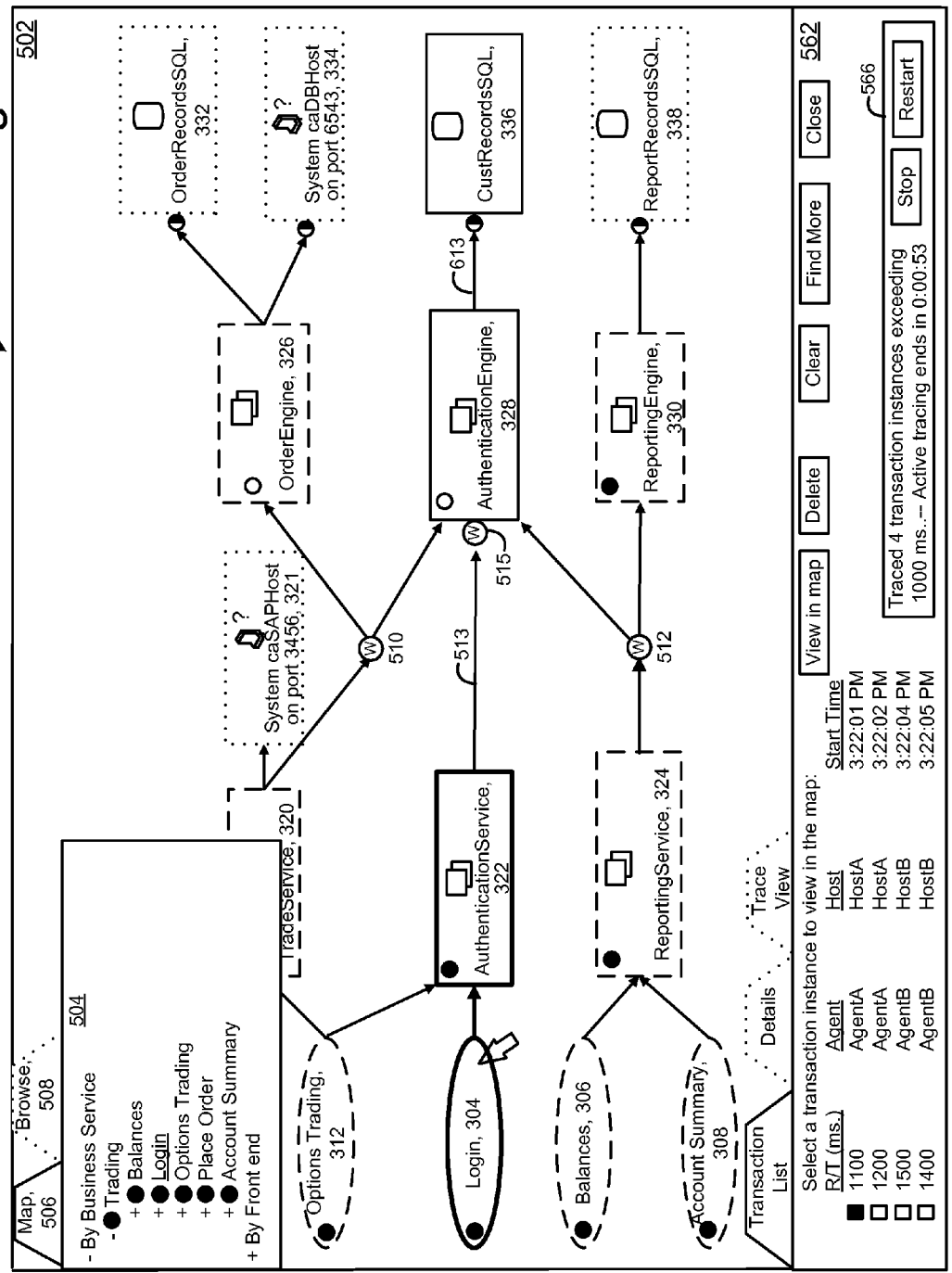

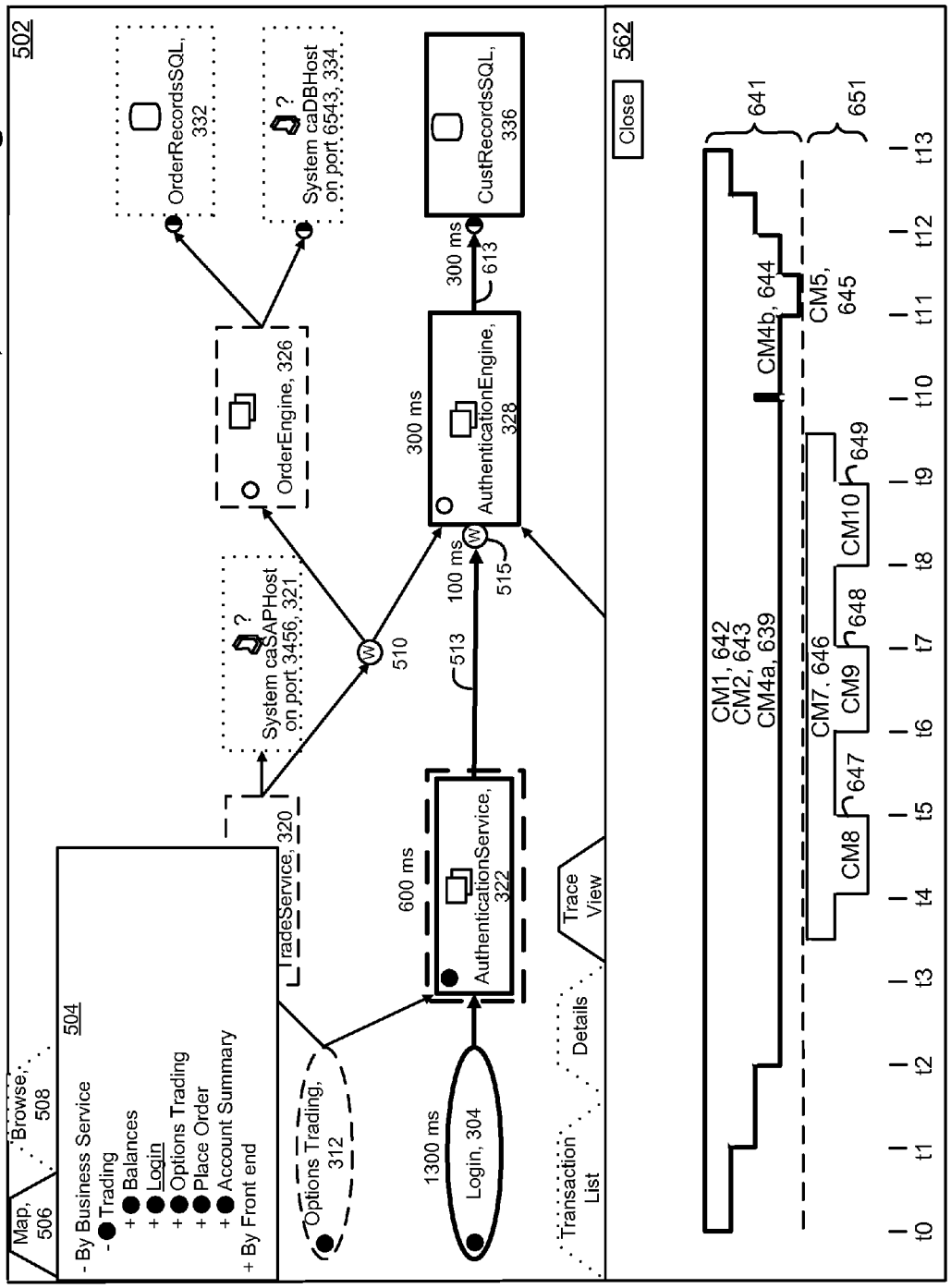
Fig. 5M1

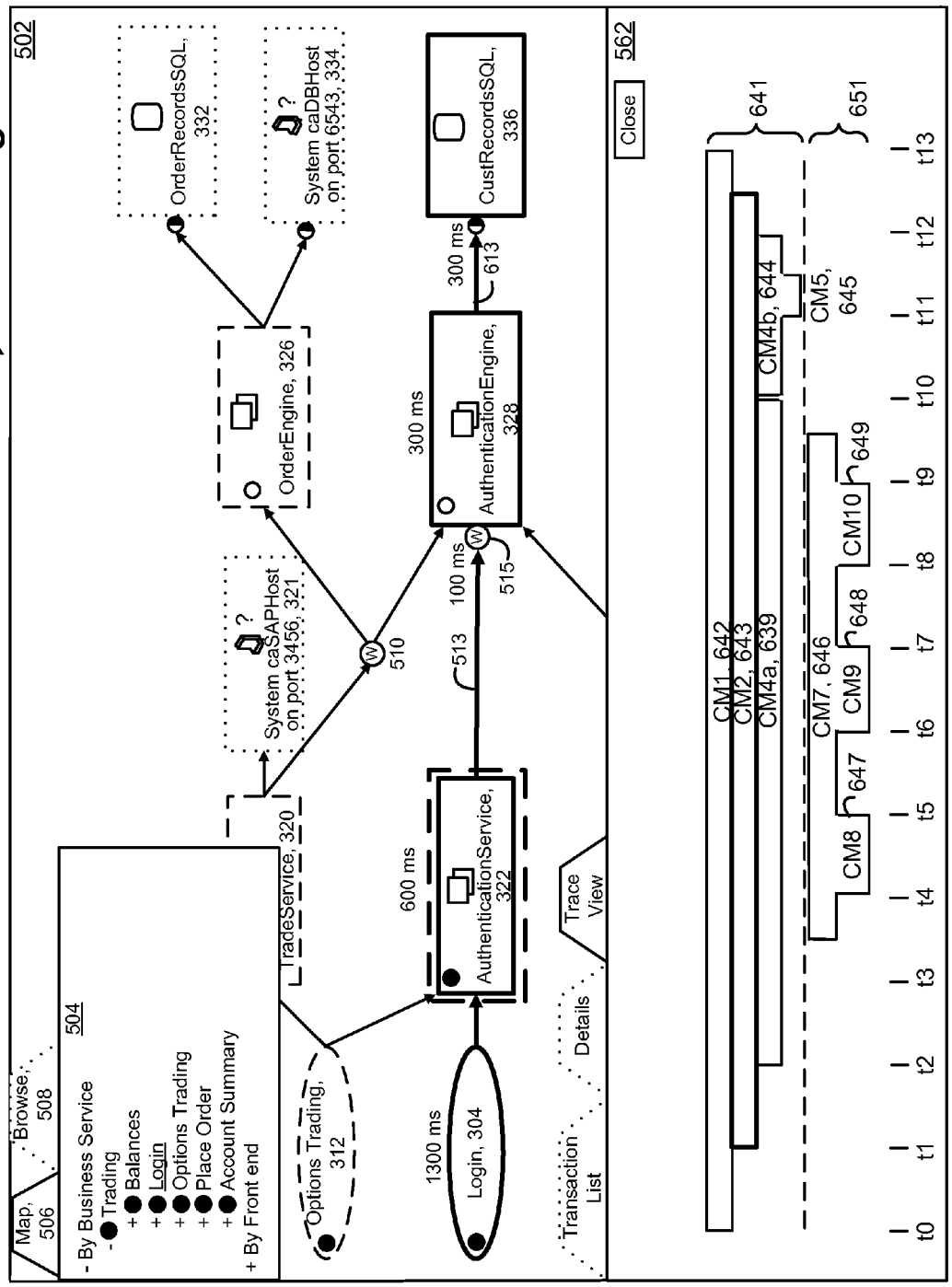

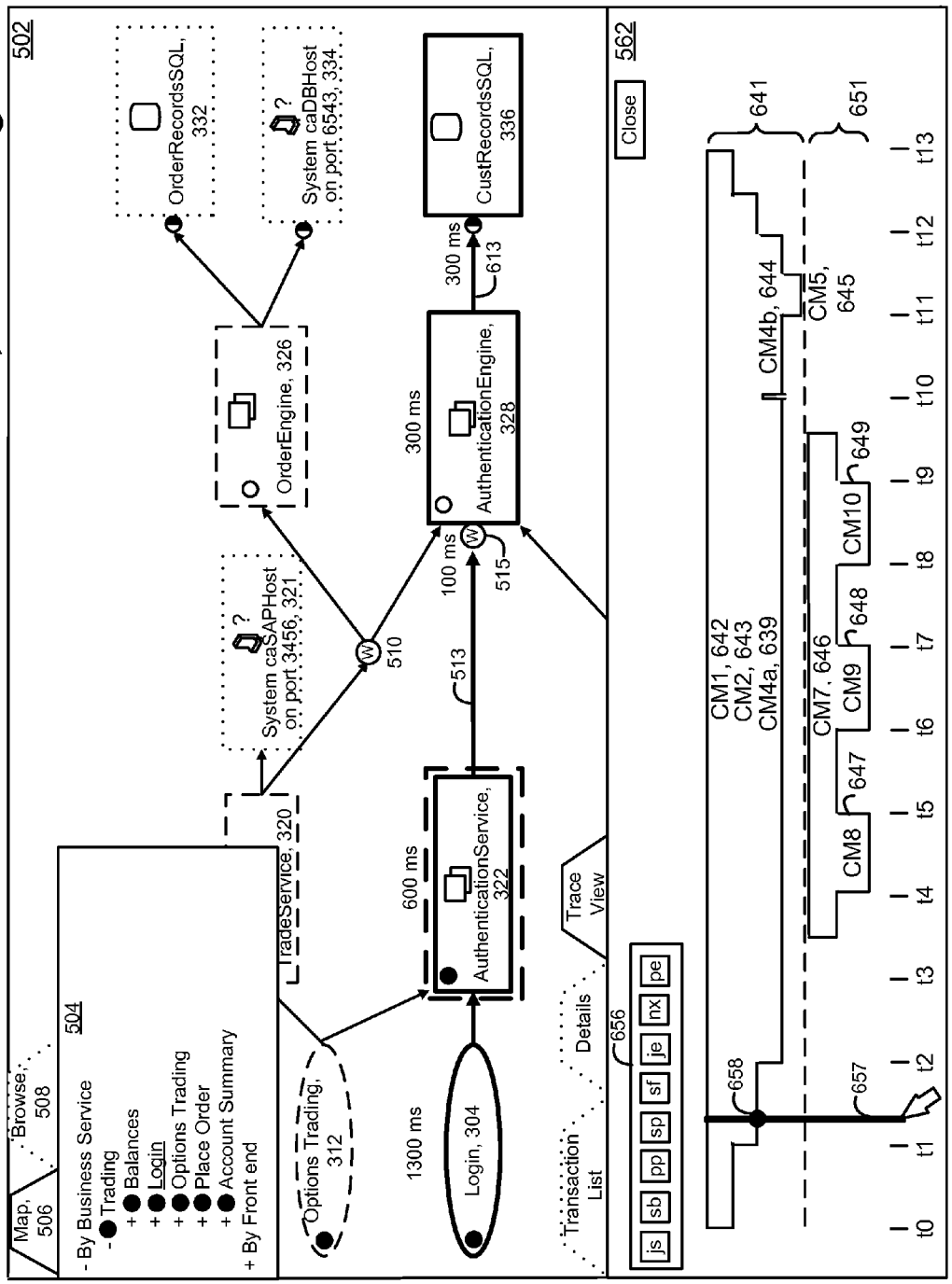

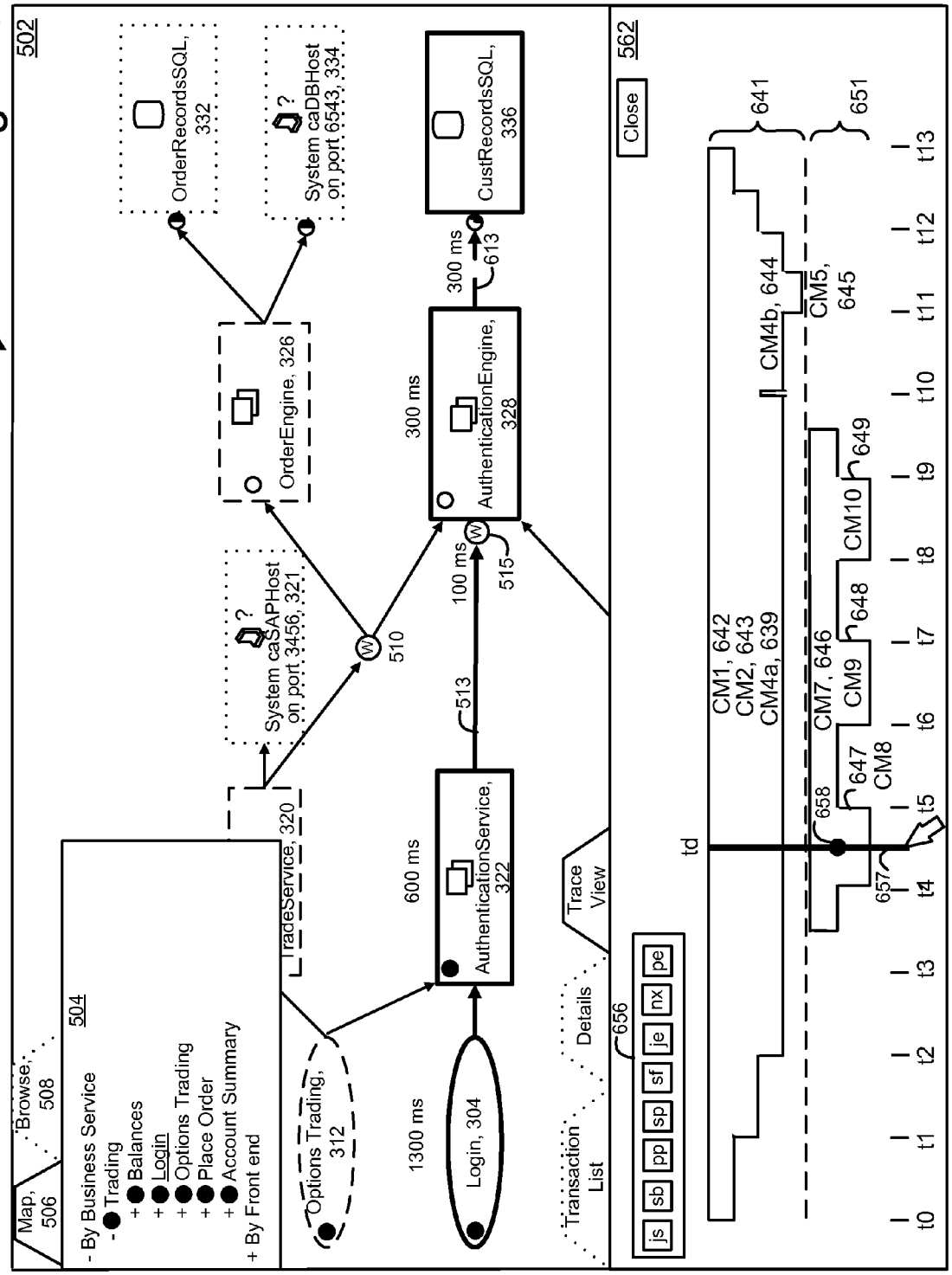

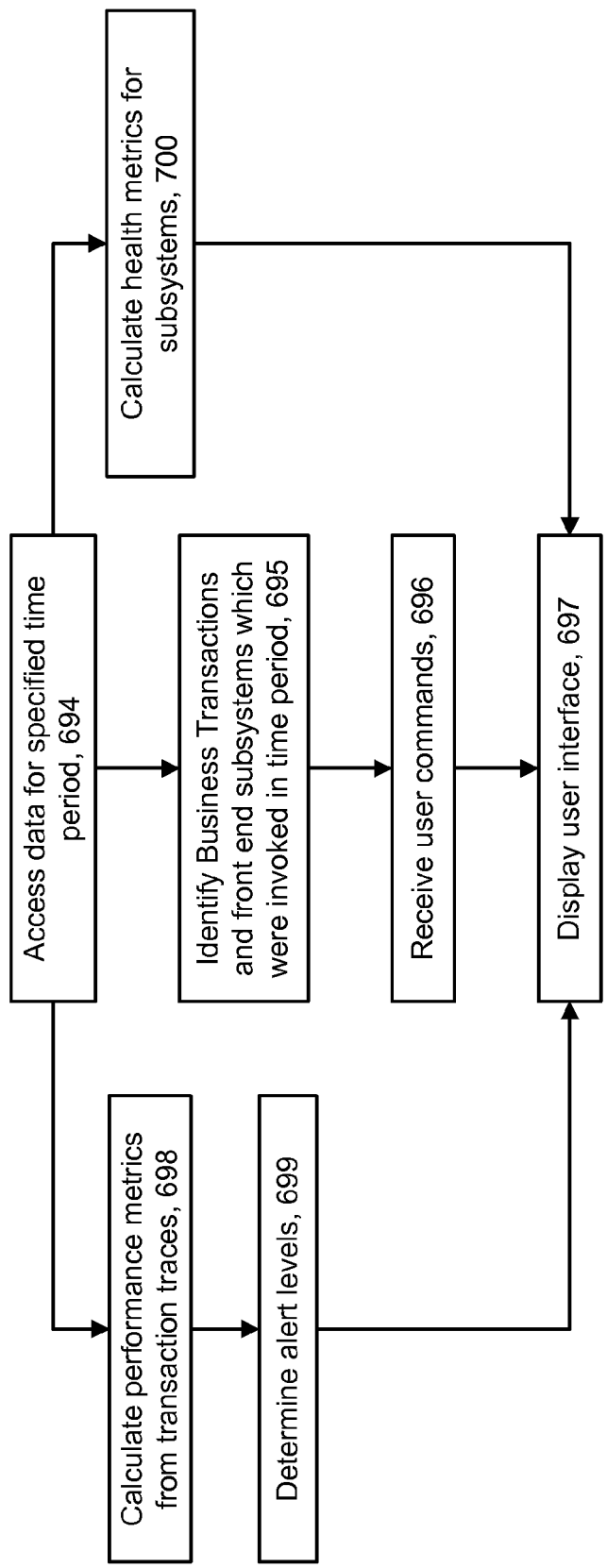

VISUALIZING RELATIONSHIPS BETWEEN A TRANSACTION TRACE GRAPH AND A MAP OF LOGICAL SUBSYSTEMS

BACKGROUND OF THE INVENTION

1. Field of the Invention

The present invention is directed to technology for monitoring software in a computing environment.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes. One type of trace is a stack trace. Traces can be used as an aid in debugging.

However, diagnosis of problems continues to be a vexing problem. For example, when a transaction or application is failing, the provider wants to know what exactly is going wrong, and why. Improved diagnostic techniques are needed.

SUMMARY OF THE INVENTION

The present invention provides a method for diagnosing problems in a computer system by visualizing flows through subsystems of the computer system.

In one embodiment, a tangible, non-transitory computer readable storage having computer readable software embodied thereon is provided for programming at least one processor to perform a method for visualizing flows through one or more applications. The method performed includes: (a) accessing a data store to access data which is obtained from one or more agents associated with the one or more applications, the agents provide the data using instrumentation which is installed in the one or more applications, (b) displaying a triage map region on a user interface, where the triage map region graphically depicts subsystems of the one or more applications and dependency relationships between the subsystems, and the subsystems are depicted as nodes, and (c) based on the accessed data, displaying an auxiliary region of the user interface, the auxiliary region displays at least a first transaction trace, where the at least a first transaction trace is a graph which identifies invoked components of at least a first transaction instance, and calling relationships among the invoked components of the at least a first transaction instance.

In another embodiment, a tangible, non-transitory computer readable storage having computer readable software embodied thereon is provided for programming at least one processor to perform a method for visualizing flows through one or more applications. The method performed includes: (a) accessing a data store to access data which is obtained from one or more agents associated with the one or more applications, where the agents provide the data using instrumentation which is installed in the one or more applications, (b) displaying a triage map region on a user interface, where the triage map region graphically depicts subsystems of the one or more applications and dependency relationships between the subsystems, and the subsystems are depicted as nodes, (c) based on the accessed data, displaying an auxiliary region of the user interface, the auxiliary region displays at least one transaction trace, where the at least one transaction trace is a graph which identifies invoked components of at least one transaction instance, and calling relationships among the invoked components, and (d) updating the auxiliary region in a time sequence in which a time marker moves across the at least one transaction trace, where the triage map is updated to visually distinguish one or more of the subsystems based on a position of the time marker.

In another embodiment, a computer-implemented method for visualizing flows through one or more applications is provided. The method includes the computer-implemented steps of: (a) accessing a data store to access data which is obtained from one or more agents associated with the one or more applications, where the agents provide the data using instrumentation which is installed in the one or more applications, (b) displaying a triage map region on a user interface, the triage map region graphically depicts subsystems of the one or more applications and dependency relationships between the subsystems, where the subsystems are depicted as nodes, (c) based on the accessed data, displaying an auxiliary region of the user interface, the auxiliary region displays at least one transaction trace, where the at least one transaction trace is a graph which identifies invoked components of at least one transaction instance, and calling relationships among the invoked components, and (d) updating the auxiliary region in a time sequence in which a time marker moves across the at least one transaction trace, where the triage map is updated to visually distinguish one or more of the subsystems based on a position of the time marker, (e) where the dependency relationships are depicted with arrows connecting the nodes, and (f) the triage map is updated to visually distinguish one or more of the arrows based on a position of the time marker.

Corresponding methods, systems and computer-or processor-readable storage devices which include a storage media encoded with instructions which, when executed, perform the methods provided herein, may be provided.

BRIEF DESCRIPTION OF THE DRAWINGS

FIG. 2A is a flowchart describing one embodiment of a process for starting the tracing of a transaction.

FIG. 2B is a flowchart describing one embodiment of a process for concluding the tracing of a transaction.

FIG. 2C depicts a computing device of the network of FIG. 1.

FIG. 3 depicts a hierarchy for use in describing the operation of one or more applications.

FIG. 4B1 depicts example transaction traces for sequences of components invoked in a transaction, based on one possible sequence of components of FIG. 4A.

FIG. 4B2 depicts waiting periods in the example transaction traces of FIG. 4B1.

FIG. 4B3 depicts a method for determining total durations, net durations, wait times and inter-subsystem communication times, for a sequence of dependent instrumented subsystems.

FIG. 5B1 depicts the user interface of FIG. 5A with the addition of a hover box showing metrics for the Login Business Transaction 304.

FIG. 5B2 depicts the user interface of FIG. 5A with the addition of a hover box showing metrics for the AuthenticationService subsystem 322.

FIG. 5C depicts the user interface of FIG. 5A with the addition of a context menu 532 showing options for the Login Business Transaction 304.

FIG. 5E1 depicts a user interface to find matching transactions for the Login Business Transaction which is launched from the context menu 532 of the user interface of FIG. 5C.

FIG. 5E2 depicts a user interface to find matching transactions for the AuthenticationService subsystem in the context of a selected Business Transaction.

FIG. 5E3 depicts a user interface to find matching transactions for the AuthenticationService subsystem in the context of multiple Business Transactions.

FIG. 5F depicts a user interface in which fewer than all subsystems of Login are invoked by a selected Business Transaction instance.

FIG. 5M1 depicts the user interface of FIG. 5K when a user selects a transaction trace.

FIG. 5M2 depicts the user interface of FIG. 5K when a user selects a component in a transaction trace.

FIG. 5N depicts the user interface of FIG. 5K in a playback mode, where the subsystem node 322 is highlighted based on a position of a time marker.

FIG. 5O depicts the user interface of FIG. 5N, where the path 513 is highlighted.

FIG. 5Q depicts the user interface of FIG. 5K in a playback mode, where the path 613 is highlighted.

FIG. 6 depicts a method for providing a user interface.

DETAILED DESCRIPTION

Figure 1:
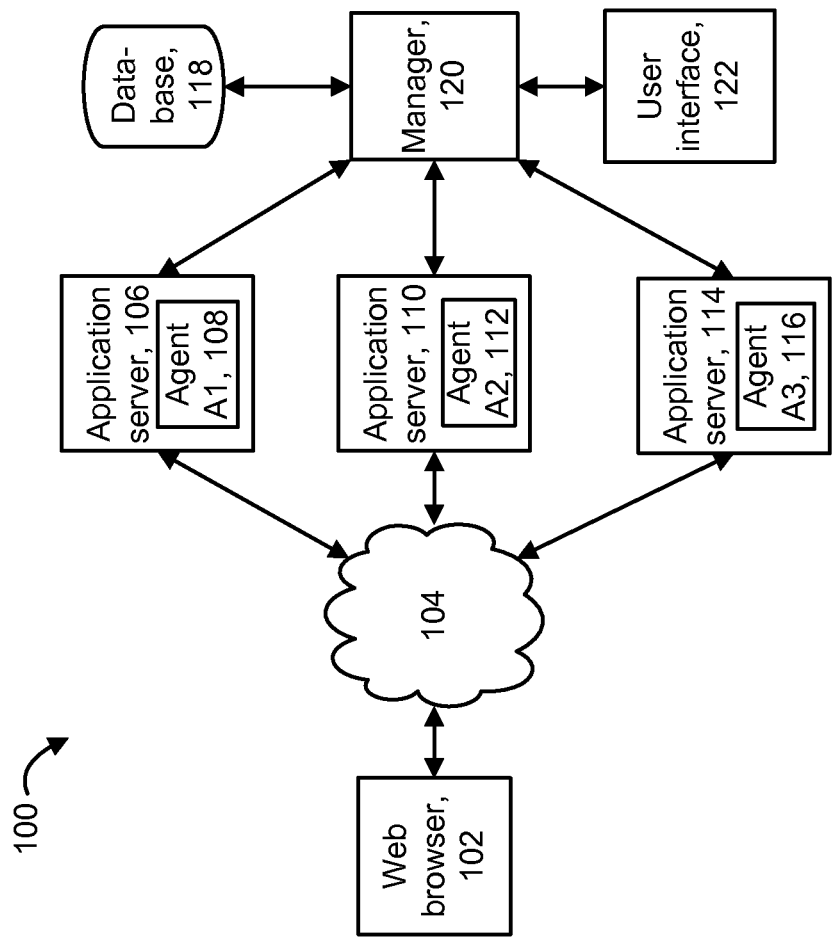
FIG. 1 depicts a system which includes a managed application.

The present invention provides a method for diagnosing problems in a computer system by visualizing flows through subsystems of the computer system.

When a Business Transaction or application is failing, the provider wants to know what exactly is going wrong and why. A Business Transaction can represent a task from a client perspective, such as logging into a web site, ordering an item, and so forth. Sometimes the problem is general—the transaction fails every time—and sometimes it is more specific. For instance, the transaction may fail only when a certain user attempts it, or when a certain type of item is requested. Determining whether the problem is general or specific can be challenging, and isolating the source of the problem is more so.

Different diagnostic tools are provided for the general and specific cases. For example, a triage map can be used to address the general case, as it aggregates transactions and displays every possible way the associated logical subsystems may interact. It also displays the overall health of each of the subsystems. A transaction tracing tool can be used to handle the most specific case. It records individual transactions as they pass through the system and displays them as sequences of timed low-level method calls. The problem is that there is a wide gap between the two tools. If the triage map is too general and coarse-grained, the transaction tracer may be too specific and granular. The user who starts at the triage map and finds nothing wrong—no general trend—must start pulling transaction traces and browsing through them to discern a pattern. Mapping the problem back to the subsystem level requires a thorough knowledge of both the software and the underlying infrastructure.

There is thus a real need to combine the two visualizations—to show the individual transactions as a series of timed steps through the logical subsystems. One possible solution allows the user to "overlay" an individual transaction trace (or a related set of traces) on the associated triage map. Thus, if a problem has been reported for a particular Business Transaction, the user could first view the triage map for that Business Transaction. If the overall health of the associated subsystems appeared normal, the user would recognize that this was not a general problem. The user would then request transaction traces for the Business Transaction. The transaction tracer would record and return a list of recent transactions that match the Business Transaction's parameters (e.g., a specific URL and POST parameter) and exceed the specified duration, and the user would choose one or more to "map." The user might choose to map all the lengthiest transactions one at a time (or simultaneously) to see if a pattern emerges—if, for example, database calls made from one particular host are responsible for the delays.

A mapped transaction appears as a highlighted portion of the current map, with durations listed on each node and beside each relevant edge. An edge is a transition between subsystems and is represented by an arrow. That is, those subsystems that were active in the transaction appear highlighted in the map, along with the edges that represent a call from one subsystem to the next. The total time spent within a subsystem appears on the node, while the length of the calls between subsystems appears beside the edges. The component with the longest total duration in the map is marked with a special icon, such as a clock symbol. Note that in the case of multiple overlaid transactions, average durations can be displayed. Individual durations can be provided on hover, in a tooltip.

Moreover, an auxiliary region such as a tabbed pane below the map can offer additional options and information. A first tab can contain the list of returned transactions (transaction list), so the user may view and change which items are selected (and overlaid on the map). A "Find More" button allows the user to record more transactions using the same parameters. The second tab (details) offers information about the item currently selected in the map. For instance, if a front end node is selected, all components of the overlaid transactions corresponding to that front end will be listed, by class and method, along with their agent identifiers and their durations. The user can navigate from these nodes to the corresponding metric paths in the Investigator agent tree.

Finally, for each transaction displayed in the map, a tab displays the transaction's "Trace View" as it appears in the Transaction Tracer, with VCR-type controls such as rewind, play, stop, pause and fast forward, appearing above it. The user can select individual components in the trace, causing the corresponding subsystem which invokes the component to be selected in the map; the user may also choose to "replay" the entire transaction. During the replay, each component in the trace will be selected in turn, and the corresponding subsystem in the map will be selected as well. The relevant durations will appear in the map alongside the selected items. Again, the user can navigate from a component in the trace view to the corresponding metric path in the Investigator agent tree.

This same functionality could be available throughout an existing interface which provides transaction traces. If the trace matched one of the applications or Business Transactions available in the triage map, an option could be offered to "Map This Transaction." This would bring up the appropriate map with the corresponding overlay, as described above.

Additionally, this feature could be expanded to include options for dynamically adding instrumentation from the transaction traces. Temporary instrumentation could be added by the user to drill into slow transactions for more detailed information; it could also be used to evaluate whether the current instrumentation is adequate or optimal for tracking the performance of specific Business Transactions. If not, the temporarily added instrumentation could be made permanent. Taken to the next level, this functionality could provide a simple way for users to configure their systems to monitor their Business Services.

Different types of design screens, or user interfaces, can be provided, as detailed further below.

Via the user interface, the user can easily detect relationships between subsystems and transactions of the triage map, and transaction instance data.

FIG. 1 depicts a network 100 in which different computing devices provide data to a manager. Example computing devices 106, 110 and 114 may include application servers or any other type of computing device having a processor for executing code to achieve a desired functionality. The computing devices can be located remotely from one another or co-located. The computing devices 106, 110 and 114 communicate with a local manager computer 120 in this example. The manager computer 120 could alternatively be remote from the computing devices 106, 110 and 114, in which case communication may occur via the network cloud 104.

For example, a corporation running an enterprise application such as a web-based e-commerce application may employ a number of application servers at one location for load balancing. Requests from users, such as from an example web browser 102 of a user, are received via a network cloud 104 such as the Internet, and can be routed to any of the computing devices 106, 110 and 114. The web browser 102 typically accesses the network cloud 104 via an Internet Service Provider, not shown. Agent software running on the computing devices 106, 110 and 114, denoted by Agent A1 (108), Agent A2 (112) and Agent A3 (116), respectively, gather information from an application, middleware or other software, running on the respective computing devices 106, 110 and 114, in one possible approach. For example, such information may be obtained using instrumentation, one example of which is byte code instrumentation. However, the gathered data may be obtained in other ways as well. The agents essentially live in the computing device being monitored and provide a data acquisition point. The agents organize and optimize the data communicated to the manager 120.

The manager 120 can be provided on a separate computing device such as a workstation which communicates with a user interface 122, such as a monitor, to display information based on data received from the agents. The manager can also access a database 118 to store the data received from the agents. In the example provided, the computing devices can communicate with the manager 120 without accessing the network cloud 104. For example, the communication may occur via a local area network. In other designs, the manager 120 can receive data from the agents of a number of computing devices via the network cloud 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 120 and user interface display 122 might be provided at a corporate headquarters location. Other applications which are not necessarily web-based or involve retail or other sales, similarly employ agents and managers for managing their systems. For example, a bank may use an application for processing checks and credit accounts. Moreover, in addition to the multi-computing device arrangements mentioned, a single computing device can be monitored as well with one or more agents.

Various approaches are known for instrumenting software to monitor its execution. For example, as mentioned at the outset, tracing may be used to track the execution of software. One example of tracing is discussed in U.S. Patent Application Publication No. 2004/0078691, titled "Transaction Tracer," published Apr. 22, 2004, incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application. The agent software receives information from the probes and may communicate the information to another process, such as at the manager 120, or process the information locally, such as to determine whether the information indicates an abnormal condition. The agent thus collects and summarizes information received from the probes. The probes collect information as defined by a directives file. For example, the information from the probes may indicate start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents 108, 112 and 116 are typically aware of the software executing on the local computing device 106, 110 and 114, respectively, with which they are associated.

The probes can report a standard set of metrics which include: CORBA method timers, Remote Method Invocation (RMI) method timers, Thread counters, Network bandwidth, JDBC update and query timers, Servlet timers, Java Server Pages (JSP) timers, System logs, File system input and output bandwidth meters, Available and used memory and EJB (Enterprise JavaBean) timers. A metric is a measurement of a specific application activity.

An agent reports information about transactions, which identifies resources which are accessed by an application. In one approach, when reporting about transactions, the word Called designates a resource. This resource is a resource (or a sub-resource) of a parent component, which is a consumer. For example, assume that Servlet A is the first component invoked in a transaction. Under the consumer Servlet A (see below), there may be a sub-resource Called EJB. Consumers and resources can be reported by the agent in a tree-like manner. Data for a transaction can also be stored according to the tree. For example, if a Servlet (e.g. Servlet A) is a consumer of a network socket (e.g. Socket C) and is also a consumer of an EJB (e.g. EJB B), which in turn is a consumer of a JDBC (e.g. JDBC D), the tree might look something like the following:

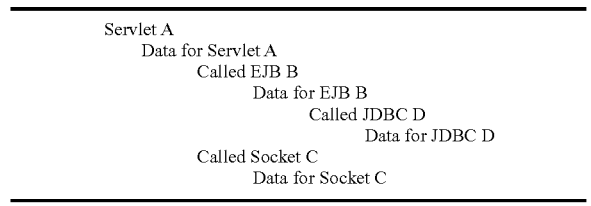

In one embodiment, the above tree is stored by the Agent in a stack, called the Blame Stack. When transactions are started, they are pushed onto the stack. When transactions are completed, they are popped off the stack. In one embodiment, each transaction on the stack has the following information stored: type of transaction, a name used by the system for that transaction, a hash map of parameters, a timestamp for when the transaction was pushed onto the stack, and sub-elements. Sub-elements are Blame Stack entries for other components (e.g. methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. As the tree above notes, EJB B is a sub-element of Servlet A and also has its own entry. The top (or initial) entry (e.g., Servlet A) for a transaction, is called the root component. Each of the entries on the stack is an object.

FIG. 2A is a flowchart describing one embodiment of a process for starting the tracing of a transaction. The steps are performed by the appropriate Agent(s). In step 130, a transaction starts. In one embodiment, the process is triggered by the start of a method (e.g., the calling of a "loadTracer" method). In step 132, the Agent acquires the desired parameter information. In one embodiment, a user can configure which parameter information is to be acquired via a configuration file or a UI. The acquired parameters are stored in a hash map, which is part of the object pushed onto the Blame Stack. In other embodiments, the identification of parameters is pre-configured. There are many different parameters that can be stored. In one embodiment, the actual list of parameters used is dependent on the application being monitored. The table below provides examples of some parameters that can be acquired.

| Parameters | Appears in | Value |
|---|---|---|
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Blamed Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |
| Object | All non-static methods | toString( ) of the this object of the traced component, truncated to some upper limit of characters. |
| Class Name | All | Fully qualified name of the class of the traced component. |
| Param_n | All objects with WithParams custom tracers | toString( ) of the nth parameter passed to the traced method of the component. |
| Primary Key | Entity Beans | toString( ) of the entity bean's property key, truncated to some upper limit of characters. |

Parameters can include query, cookie, post, URL and session type name/value pairs.

In step 134, the system acquires a timestamp indicating the current time. In step 136, a stack entry is created. In step 138, the stack entry is pushed onto the Blame Stack. In one embodiment, the timestamp is added as part of step 138. The process is performed when a transaction is started. A similar process is performed when a sub-component of the transaction starts (e.g., EJB B is a sub-component of Servlet A—see tree described above).

FIG. 2B is a flowchart describing one embodiment of a process for concluding the tracing of a transaction. The process is performed by an Agent when a transaction ends. In step 140, the process is triggered by a transaction (e.g., method) ending (e.g. calling of a method "finishTrace"). In step 142, the system acquires the current time. In step 144, the stack entry is removed. In step 146, the execution time of the transaction is calculated by comparing the timestamp from step 142 to the timestamp stored in the stack entry. In step 148, the filter for the trace is applied. For example, the filter may include a threshold period of one second. Thus, step 148, would include determining whether the calculated duration from step 146 is greater than one second. If the threshold is not exceeded (step 150), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the Agent to other components in the system of FIG. 1. If the duration exceeds the threshold (step 150), then the Agent builds component data in step 160. Component data is the data about a transaction that will be reported. In one embodiment, the component data includes the name of the transaction, the type of the transaction, the start time of the transaction, the duration of the transaction, a hash map of the parameters, and all of the sub-elements (which can be a recursive list of elements). Other information can also be part of the component data. In step 162, the Agent reports the component data by sending the component data via the TCP/IP protocol to Manager 120.

FIG. 2B represents what happens when a transaction finishes. When a sub-component finishes, however, the steps performed include getting a time stamp, removing the stack entry for the sub-component and adding the completed sub-element to previous stack entry. In one embodiment, the filters and decision logic are applied to the start and end of the transaction, rather than to a specific sub-component.

Note, in one embodiment, if the transaction tracer is off, the system will still use the Blame Stack; however, parameters will not be stored and no component data will be created. In some embodiments, the system defaults to starting with the tracing technology off. The tracing only starts after a user requests it, as described above.

FIG. 2C depicts a computing device of the network of FIG. 1. The computing device 200 is a simplified representation of a system which might be used as one of the web browsers, application server, managers and/or user interfaces, such as discussed in connection with FIG. 1. The computing device 200 includes a storage device 210 such as a hard disk or portable media, a network interface 220 for communicating with other computing devices, a processor 230 for executing software instructions, a working memory 240 such as RAM for storing the software instructions after they are loaded from the storage device 210, for instance, and a user interface display 250 such as one or more video monitor. A user interface can be provided one or more monitors. The storage device 210 may be considered to be a tangible, non-transitory processor- or computer-readable storage device having processor readable code embodied thereon for programming the processor 230 to perform methods for providing the functionality discussed herein. The user interface display 250 can provide information to a human operator based on the data received from one or more agents. The user interface display 250 can use any known display scheme, whether graphical, tabular or the like. In addition to an on-screen display, an output such as a hard copy such from a printer can be provided.

The database 118 may be included in the storage device 210 when the storage device 210 is part of a computing device 200 such as an application server, manager and/or user interfaces. The storage device 210 can represent one or more storage devices which store data received from one or more agents, and which can be accessed to obtain data to provide a user interface as described herein. The storage device 210 can represent a data store.

Further, the functionality described herein may be implemented using hardware, software or a combination of both hardware and software. For software, one or more non-transitory, tangible processor readable storage devices having processor readable code embodied thereon for programming one or more processors may be used. The non-transitory, tangible processor readable storage devices can include computer readable media such as volatile and nonvolatile media, removable and non-removable media. For example, non-transitory, tangible computer readable media may include volatile and nonvolatile, removable and non-removable media implemented in any method or technology for storage of information such as computer readable instructions, data structures, program modules or other data. Examples of non-transitory, tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more tangible computer readable media/storage devices, peripherals and/or communication interfaces.

FIG. 3 depicts a hierarchy for use in describing the operation of one or more applications. The different levels of the hierarchy can be defined based on any desired organizational structure. For example, the hierarchy can include human-facing terminology, that is, terminology which facilitates understanding of client's interactions with a monitored application. A hierarchy may encompass any type of interaction with an application, whether the interaction is in the realm of a for-profit business, such as for e-commerce transactions, educational organization or government organization, for instance. Further, the one or more hierarchies can include nodes at different levels of the one or more hierarchies, where each node has a descriptive name. The hierarchy can be considered to be an abstract construct which provides a way to organize information about how an application executes in a manner which is more understandable to the human operator.

A top level of the hierarchy is a domain level 300 named "Domain." A next level of the hierarchy is a Business Service level 302. An example of a Business Service relates to trading involving a stock or other financial instrument using a web site. Thus, "Trading" can be the name of a node at the Business Service level of the hierarchy. A specific instance of the Trading Business Service occurs, e.g., when a particular user executes a trade. Other example Business Services include "Buy Book" for a book-selling web site, and "Enroll in benefits" for a employees enrolling in a benefits program.

A next level of the hierarchy is a Business Transaction level. As mentioned, a Business Transaction can represent a task from a client perspective, such as logging into a web site, ordering an item, and so forth. A Business Service can be made up of a number of Business Transactions. For example, for Trading, the Business Transactions can include: Login 304 (e.g., login to the web site), Balances 306 (e.g., obtain a balance of an account), Account Summary 308 (e.g., obtain a report of recent buy/sell activity), Place Order 310 (e.g., place an order to buy or sell a security such as a stock or bond-something other than an option) and Options Trading 312 (perform an action such as researching and/or making an options trade). A specific instance of Login occurs when a user attempts to login to an account.

Further, a Business Transaction can be associated with one or more Business Transaction Components. In one approach, a Business Transaction has only one identifying component. A Business Transaction Component can be a type of component of an application which is recognizable and measurable by a server, such as a servlet or EJB. In one approach, one of the components of an application is set as a Business Transaction Component, which is an identifying transaction component for a Business Transaction. The Business Transaction Component is the identifying transaction component for the transaction that is the identifying transaction for the Business Transaction. A transaction can represent a sequence of software components which are invoked in response to a request from a client, to provide a corresponding response to the client. For example, a Business Transaction Component can be identified by determining when component data reported by an agent match the a set of rules. This definition can include, e.g., a specified URL host name, URL parameters, HTTP post parameters, cookie and/or session manager parameters. Additionally, or alternatively, the definition may require a transaction to start with a specified URL host name. The agent or manager, for instance, can compare the component data against the set of rules to determine when a Business Transaction Component is present in a Business Transaction. If a Business Transaction Component is detected, then the associated Business Transaction is of a specified type. For example, if the Business Transaction Component 305, 307, 309, 311 or 313 is detected, then the associated Business Transaction is Login 304, Balances 306, Account Summary 308, Place Order 310 or Options Trading 312, respectively.

For instance, for a transaction which is associated with a servlet, a Business Transaction Component might be invoked in connection with a JavaServer Page (JSP) that is loaded into a secondary frame.

Additionally, one or more applications include different subsystems, e.g., software components which perform a specific task. Typically, each instance of a Business Transaction involves execution of code of a sequence of one or more of the subsystems. The subsystems depend on one another, e.g., call one another, in a serial or branched chain. Different Business Transactions can sometimes use a common subsystem.

The example subsystems include instrumented subsystems which are represented by dashed line boxes, and which are typically front end subsystems, as well as un-instrumented subsystems which are represented by dotted line boxes, and which are typically back end subsystems. As used herein, a front end subsystem is typically instrumented, while a back end subsystem is typically not instrumented. Moreover, one front end subsystem can call another front end subsystem, such as via a Web Services call. Or, a front end subsystem can call a back end subsystem. A full range of performance metrics can be obtained from an instrumented subsystem. Limited information may be obtained regarding an un-instrumented subsystem from the methods that are used to call out to them from the instrumented subsystems. In the case of un-instrumented databases, for example, a JDBC driver (located in the same Java Virtual Machine (JVM) as the calling front end) provides metrics that give us an idea of the responsiveness of the database. In the case of un-instrumented mainframes, there is usually a method that calls out to the mainframe on a specified port on the mainframe, and we can measure how long that call takes or if it stalls or reports an error.

In many cases, an un-instrumented subsystem is a back end subsystem such as a mainframe, database or some other un-instrumented computing device. These are unknown components/destinations. The instrumented subsystems include: TradeService 320, OrderEngine 326, AuthenticationEngine 328, ReportingService 324, AuthenticationService 322 and ReportingEngine 330. The un-instrumented subsystems include: OrderRecordsSQL 332, ReportRecordsSQL 338, a system caDBHost 334, which is accessed via its port number 6543, a system caSAPHost 321, which is accessed via its port number 3456 and CustRecordsSQL 336. A subsystem which includes SQL in its name is a Structured Query Language (SQL) database. A "?" indicates that the subsystems 334 and 321 are unknown.

Figure 4A:
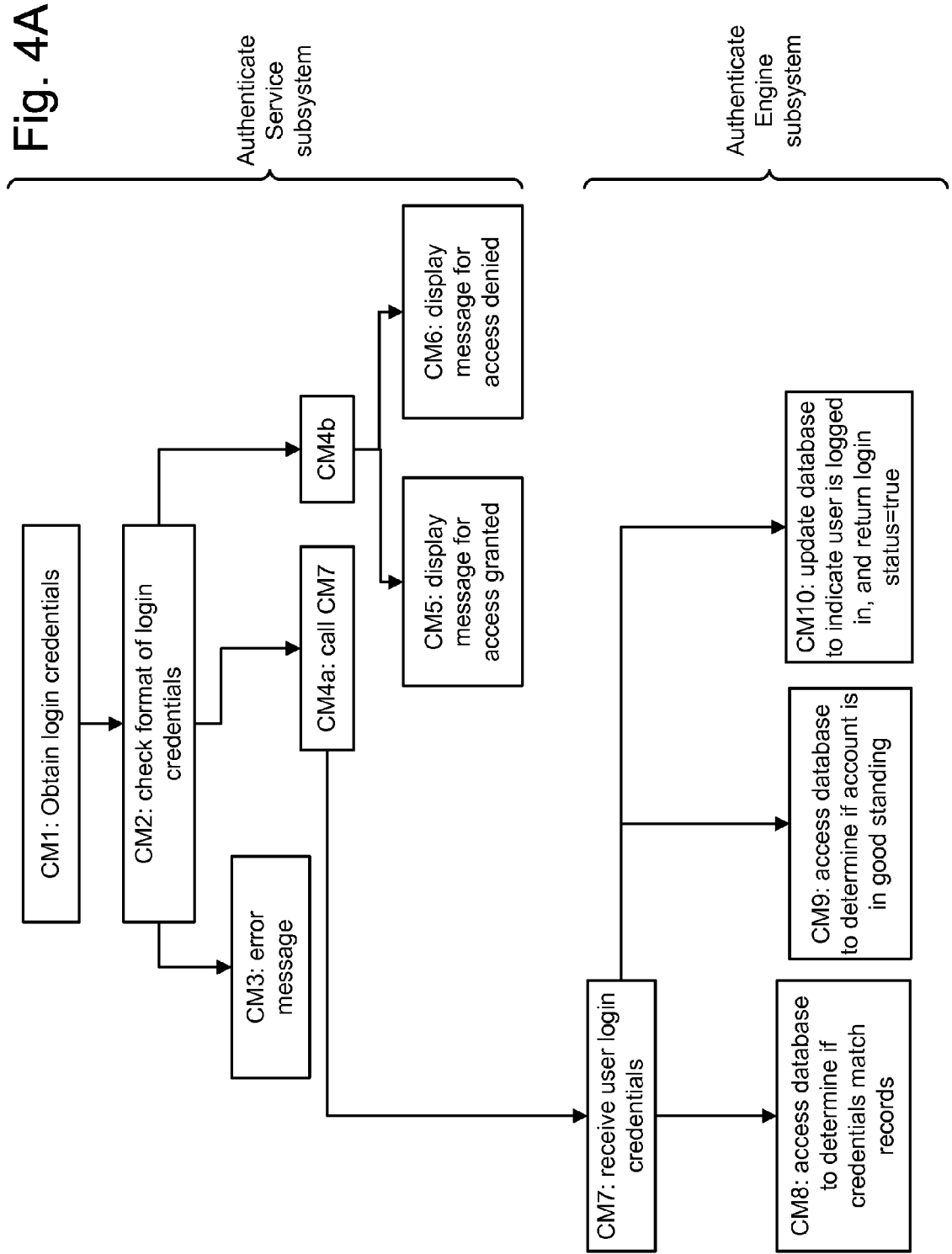
FIG. 4A depicts dependency relationships in an example sequence of components invoked in a transaction.

FIG. 4A depicts dependency relationships in an example sequence of components invoked in a Business Transaction. Component-oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. One example of a component oriented programming model is J2EE, which can employ components such as a Java Server Page, an Enterprise Java Bean (EJB), a servlet, and a Java Database Connectivity (JDBC) component. JDBC is an Application Programming Interface (API) for the JAVA™ programming language that defines how a client may access a database. It provides methods for querying and updating data in a database. However, other component oriented programming models such as .NET may also be used. Moreover, the programming model need not be object oriented.

This example provides details of the Login Business Transaction discussed previously. In one possible implementation, each component of Login is a class-method (CM) pair. For example, a servlet is a JAVA class. It is an object that receives a request and generates a corresponding response. A class-method pair can be represented by the notation class.method. Login could involve a first class-method pair CM1 which obtains a user's login credentials such as a login name and a password. An example format of CM1 is: ServletA1.ObtainLoginCredentials.

As an example, CM1 could be the Business Transaction Component of Login. Thus, whenever an agent detects that CM1 has been invoked, it concludes that the current transaction is part of Login, and associates its component data with Login.

A second class-method pair CM2 (e.g., ServletA2.CheckLoginCredentials) checks a format of the login credentials.

If the login credentials are not in a proper format, CM2 calls a third class-method pair CM3 (e.g., ServletA3.DisplayErrorMessage) which displays an error message, prompting the user to provide the proper input. If the login credentials are in the proper format, CM2 calls a CM4a (e.g., ServletA4.ValidateLoginCredentials). CM4a calls CM7 (e.g., ServletB1.ReceiveLoginCredentials), passing the login credentials with the call.

CM7 calls CM8 (e.g., JDBC driver call/SQL statement to CheckCredentialRecords) which accesses a database to determine if the user login credentials match with customer records. If CM8 replies to CM7 indicating that there is a match, CM7 calls CM9 (e.g., JDBC driver call/SQL statement to CheckAccountStanding) which accesses a database to determine if the user's account is in good standing. If CM9 provides a response to CM7 indicating that the account is in good standing, CM7 calls CM10 (e.g., JDBC driver call/SQL statement to UpdateLoginRecords) to update a database to indicate that the user is logged in, and return a login status=true to CM7. If the credentials do not match at CM8, or if the account is not in good standing at C9, CM7 sets login status=false and CM10 is not called, so that a default login status=false remains.

In an example implementation, CM8 to CM10 can each include a JDBC driver call which invokes one or more SQL statements, such as to create a table entry in a database, add data to the entry and so forth. Alternatively, each SQL statement could be specified as a separate component which is called by the JDBC driver call, if desired. See also FIG. 5R.

CM7 returns a reply to CM4a, and CM4a returns the reply to CM2, with either login status=true or login status=false. If login status=true, CM2 calls CM4b, which calls CM5 (e.g., ServletA5.DisplayMessageAccessGranted) which displays a message to the user indicating that access is granted. Or, if login status=false, CM2 calls CM4b, which calls CM6 (e.g., ServletA6.DisplayMessageAccessDenied) which displays a message to the user indicating that access is denied.

Note that separate components CM4a and CM4b are used to allow separate instrumenting of the call to CM7 by CM4a, and the call to CM5 or CM6 by CM4b. Alternatively, one component, CM4, could handle the functions of CM4a and CM4b. This one component would invoke both a WebServices call (to CM7) and another method (CM5 or CM6) within the same app server.

As an illustration, CM1 to CM6 execute within the AuthenticationService subsystem, while CM7 to CM10 execute within the AuthenticationEngine subsystem. Login can thus execute in, or invoke, both of these subsystems.

Note that a component can continue executing after calling another component, which begins executing, in an asynchronous, multi-thread or multi-process mode. Or, a component can temporarily pause until the called component has finished executing, in a synchronous, single-thread or single-process mode. A component which is pausing can be considered to be in a wait interval, while a component which is executing can be considered to be in an active, executing mode. A component may be invoked more than once during a transaction.

FIG. 4B1 depicts example transaction traces for sequences of components invoked in a transaction, based on one possible sequence of components of FIG. 4A. The horizontal direction represents time, while the vertical direction indicates call stack depth or position. A transaction trace, also referred to as a call stack, identifies instrumented components which have been called or invoked during the execution of one or more programs, processes or threads. Trace data of instrumented components can be used along with dependency data to understand and debug an application. A transaction trace can be a trace or all or a portion of a transaction and can extend over one or more computing devices having respective agents.

In particular, a separate transaction trace can be provided for each agent, such that different threads are separated out into different transaction traces. Moreover, each transaction trace can be represented by a separate horizontally-extending region, or "swim lane" of the diagram. In this diagram, a transaction trace 401 of the agent for the AuthenticationService subsystem is in the top horizontally-extending region, and a transaction trace 403 of the agent for the AuthenticationEngine subsystem is in the bottom horizontally-extending region. The two transaction traces are presented together to allow greater understanding of their relative timing. If it is known that the different agents' clocks are sufficiently synchronized, accurate conclusions can be made about the relative timing of the different transaction traces. Arrows 400 and 402 represent the respective call stack depths for the transaction traces 401 and 403, respectively.

In a graphical representation which can be provided on a user interface display, component CM1 is the first or root component of the transaction trace 401. The transaction trace includes CM2 at the second layer, CM4a and CM4b at the third layer and CM5 at the fourth layer. In the transaction trace 403, CM7 is at the first level and CM8, CM9 and CM10 are at the second level. Optionally, the transaction trace 403 could show further detail. For instance, if CM8, CM9 and CM10 are each JDBC driver calls, the transaction trace 403 could be modified to show child SQL statements 691, 692 and 693, respectively, such as depicts in FIG. 5R, discussed further below.

The time scale extends from t0-t13, which can represent 1300 milliseconds (ms.), for instance. The transaction trace indicates a time interval in which a component executes, and the calling relationship between components. For example, CM1 executes from t0-t13, CM2 executes from t1-t12.5, CM4a executes from t2-t10 (approximately), CM4b extends from t10 (approximately)-t12 and CM5 executes from t11-t11.5. Further, CM1 calls CM2, CM2 calls CM4a and CM4b, and CM4b calls CM5.

FIG. 4B2 depicts waiting periods in the example transaction traces of FIG. 4B1. A synchronous transaction involves one component, e.g., CM1, calling another component, e.g., CM2, and waiting for CM2 to reply before continuing/resuming execution. We can assume that the time required by the called method is a "wait time" for the calling method. It is also possible to trace an asynchronous transaction as well, and to depict it in a transaction trace view similar to FIG. 4B1. A time consumed by a component which is outside the wait time may be considered to be a net duration of the execution or response time, such that the wait time plus the net duration equals the total duration of the execution or response time. The total duration of a component can be calculated by summing the durations for all the methods directly called by the component and then subtracting that sum from the total recorded duration for the component.

For each horizontal bar in the graph, an unpatterned portion indicates that the component is not waiting for a response from a called component, while a bar with a pattern of slanted lines indicates that the component is waiting for a response from a called component. Even if the instrumentation of a component does not explicitly indicate whether a component is executing or waiting, we can infer that, for the synchronous case, the earlier components are waiting while the methods they called are executing. In the time consumed by a component, some of it may be spent executing, waiting for a called component to respond, being delayed by the network or CPU delay, and so forth.

In this example, CM1 begins to execute at t0, at the start of an instance of the Login Business Transaction, and calls CM2 at t1. CM2 begins to execute at t1 and calls CM4a at t2. CM4a begins to execute at t2. The transaction trace 401 may not specify that CM4a called CM7 at t3 because CM7 is on a different subsystem, associated with a different agent, in this example. Also, there may be a delay between CM4a calling CM7 and CM7 starting to execute due to a network transit time, processing delay, or other factors, for instance. However, the transaction trace 403 indicates that CM7 starts to execute at t3.5 and was called by CM4a, e.g., in a cross-process call. That is, CM7 starts to execute as a result of an invocation of CM4a. CM7 calls CM8 at t4 and CM8 executes from t4-t5. CM7 calls CM9 at t6 and CM9 executes from t6-t7. CM7 calls CM10 at t8 and CM10 executes from t8-t9. At t9, the control flow returns to CM7 and at t9.5, CM7 stops executing. The control flow does not return to CM4a until t10 due to the above-mentioned factors. At t10, the control flow returns to CM4a briefly and then to CM2 briefly, when CM2 calls CM4b just after t10. In the transaction trace 401, CM4b calls CM5 at t11 and CM5 executes from t11-t11.5. At t11.5, the control flow returns to CM4b, at t12 the control flow returns to CM2 and at t12.5 the control flow returns to CM1.

CM8, CM9 and CM10 each call a database (CustRecordsSQL). However, because the database is un-instrumented, the amount of time consumed by the database cannot be distinguished from the total execution time of CM8, CM9 or CM10 in the transaction trace 403.

In this example, for CM1, the total duration is t13−t0=1300 ms., the wait time is t12.5−t1=1150 ms. and the net duration is 1300−1150=150 ms. For CM2, the total duration is 1150 ms., the wait time is t12−t2=1000 ms. and the net duration is 1150−1000=150 ms. For CM4a, the total duration is t10−t2=800 ms., the wait time is t10−t3=700 ms. and the net duration is 800−700=100 ms. For CM4b, the total duration is t12−t10=200 ms., the wait time is t11.5−t11=50 ms. and the net duration is 200−50=150 ms. For CM5, the total duration is t11.5−t11=50 ms., the wait time is 0 ms. and the net duration is 50−0=50 ms.

Similarly, in the transaction trace 403, for CM7, the total duration is t9.5−t3.5=600 ms., a back end call time is t5−t4+ t7−t6+t9−t8=100+100+100=300 ms. and a time spent in the AuthenticateEngine subsystem is 600−300=300 ms. This time spent is analogous to a net duration. For CM8, the total duration is t5−t4=100 ms., the wait time is assumed to be 0 ms. and the net duration is 100 ms. For CM9, the total duration is t7−t6=100 ms., the wait time is assumed to be 0 ms. and the net duration is 100 ms. For CM10, the total duration is t9−t8=100 ms., the wait time is assumed to be 0 ms. and the net duration is 100 ms.

A total duration for the AuthenticationEngine subsystem is 600 ms. based on the total duration of its root component, CM7. The back end call time of the AuthenticationEngine subsystem is 100+100+100=300 ms. based on the times when a call was made outside the subsystem (e.g., the calls by CM8, CM9 and CM10, the lowest level components, at t4, t6 and t8, respectively) and the times when a corresponding response to the calls were received (e.g., t5, t7 and t9, respectively). The time spent in the AuthenticationEngine subsystem is then the total duration less the back end call times, or 600−300=300 ms. The back end call times can be apportioned to one or more instrumented or un-instrumented subsystems which are called. In this example, one un-instrumented subsystem is called (CustRecordsSQL) so the 300 ms. is attributed to it.

For the AuthenticationEngine subsystem as a whole, functionally, there is no "wait time" identified, in one implementation. CM8, CM9 and CM10 correspond to "back end call" times. The three components in the trace represent the calls made to one or more back ends, but we can't distinguish time spent in executing the call and time spent waiting for the back end to respond. We subtract the back end time from the total time for AuthenticationEngine so that we can distinguish between time spent in the AuthenticationEngine "front end" and time spent in "back end calls." In this case, since all the back end calls go to the same back end, they can be aggregated into a single value—the total time spent calling CustRecordsSQL. In other cases, a separate back end call time can be aggregated for each of multiple back ends.

Similarly, we can determine a total duration for the AuthenticationService subsystem as 1300 ms. from the total duration of its root component, CM1. The wait time of the AuthenticationService subsystem is 700 ms. based on the time when a lowest level component call was made outside the subsystem (e.g., the call by CM4a, the lowest level component, to CM7 at t3) and a time when a response to the call was received (e.g., t10). The net duration of the AuthenticationService subsystem is then the total duration less the wait time, or 1300−700=600 ms.

Further, the wait time of 700 ms. of the AuthenticationService subsystem can be attributed to the one or more subsystems it calls. Since the AuthenticationEngine subsystem is the only subsystem called by the AuthenticationService subsystem, we can attribute the 700 ms. to the AuthenticationEngine subsystem. However, it was determined that the total duration of the AuthenticationEngine subsystem was only 600 ms. Accordingly, 700−600=100 ms. can be attributed to a time consumed in communicating a request from the AuthenticationService subsystem to the AuthenticationEngine subsystem, and in communicating a corresponding reply from the AuthenticationEngine subsystem to the AuthenticationService subsystem. Note that the communicating of a request and a reply between subsystems can include accessing a service such as a Web Service, in addition to network and CPU delays.

In this manner, we can work from the last-called subsystem backwards to the first called subsystem of a transaction to determine total durations, net durations or time spent in a subsystem, wait times, back end call times (or other calls to un-instrumented subsystems), and inter-subsystem communication times. In terms of representing back end call times— there is a question of when and how to use net versus full duration. Net duration may be preferable because it provides more granularity, but in the case where the call is being made to an un-instrumented back end, we have only the full duration. We can set a rule to use net duration where available, but indicate with a grouping bracket or similar when the time includes that of the un-instrumented back end. An example procedure is discussed next.

FIG. 4B3 depicts a method for determining total durations, net durations, wait times and inter-subsystem communication times, for a sequence of dependent instrumented subsystems. A sequence of instrumented subsystems can be serial, so that one subsystem calls a first next subsystem, the first next subsystem calls a second next subsystem and so forth, so that there is only one branch or chain in the sequence. Or, the sequence can have one or more parallel branches, such as when one subsystem calls a first next subsystem and a second next subsystem. For example, in FIG. 5A, discussed further below, a serial sequence of instrumented subsystems is provided for Login, where AuthenticationService calls AuthenticationEngine. Further, a multi-branch sequence of instrumented subsystems is provided for Place Order, where TradeService calls both OrderEngine and AuthenticationEngine in separate branches. Furthermore, stages of a sequence of dependent subsystems can be defined. For example, for Login, AuthenticationService is at a first stage and AuthenticationEngine is at a second (and last) stage. For Place Order, TradeService is at a first stage, and OrderEngine and AuthenticationEngine are both at a second (and last) stage.

In view of these concepts, step 422 of FIG. 4B3 includes selecting an instrumented subsystem for which a trace has been obtained of components invoked by the subsystem. For example, in FIG. 4B2, select the AuthenticateService subsystem and its trace 401. Step 424 determines a total duration T1 of the subsystem from the duration of its root component. For example, T1=1300 ms. based on CM1 in the trace 401. Step 426 identifies all components in the trace that correspond to calls (e.g., a cross-process call) going out of the subsystem to a destination subsystem, whether instrumented or un-instrumented. For example, we identify CM4a in the trace 401. Step 428 sums the times of the identified components to obtain the total duration T2 of all calls outside the subsystem. Here, there is only one such identified component, CM4a, with Tc1=700 ms., and we have T2=Tc1=700 ms. Step 430 subtracts the total duration T2 of all calls outside the subsystem from the total duration T1 of the subsystem to obtain the net duration T3 of the subsystem, also referred to as a front end time. For the trace 401, we have T3=T1−T2=1300−700=600 ms.

Step 432 groups the identified components by their destination subsystem, then sums each group's times (such as the times Tc1, Tc2... of step 428). These sums are the full durations TF for each call to a destination subsystem. For the trace 401, there is only one group because there is only one destination subsystem, e.g., AuthenticateEngine subsystem. The sum of times for AuthenticateEngine subsystem is TF=700 ms. Decision step 434 determines if there is a next subsystem to analyze. If there is a next subsystem to analyze, steps 422-432 are repeated for the next subsystem. For example, a next subsystem to analyze would include a destination subsystem identified in step 426. The process could start at the front of a sequence of subsystems and work its way down to successively called subsystems in one or more serial paths. For example, AuthenticateEngine subsystem is a destination subsystem of AuthenticateService subsystem.

Thus, AuthenticateEngine subsystem and its trace 403 in FIG. 4B2 are selected at step 422. Step 424 determines a total duration T1=600 ms of the subsystem from the duration of its root component CM7. Step 426 identifies CM8, CM9 and CM10 which correspond to calls going out of the subsystem, in this case to the un-instrumented back end CustRecordsSQL. Step 428 sums the times of the identified components to obtain the total duration T2 of all calls outside the subsystem. Here, we have Tc1=100 ms. for CM8, Tc2=100 ms. for CM9 and Tc3=100 ms. for CM10, so T2=300 ms. Step 430 provides, for the trace 403, T3=T1−T2=600−300=300 ms.

Step 432 groups the identified components by their destination subsystem, then sums each group's times (TF=Tc1+Tc+Tc3=300 ms.). Decision step 434 determines if there is a next subsystem to analyze. When there is no next subsystem to analyze at decision step 434, the process revisits each call to a destination subsystem, which is instrumented and is associated with a respective agent. In particular, step 436 selects an instrumented destination subsystem. In the example of FIG. 4B2, AuthenticateEngine subsystem is revisited. Step 438 subtracts the total duration (T1=600 ms.) from the full duration TF=700 ms of the calls to the destination subsystem to obtain the net duration TN=100 ms. for the calls to the destination subsystem.

Figure 5A:
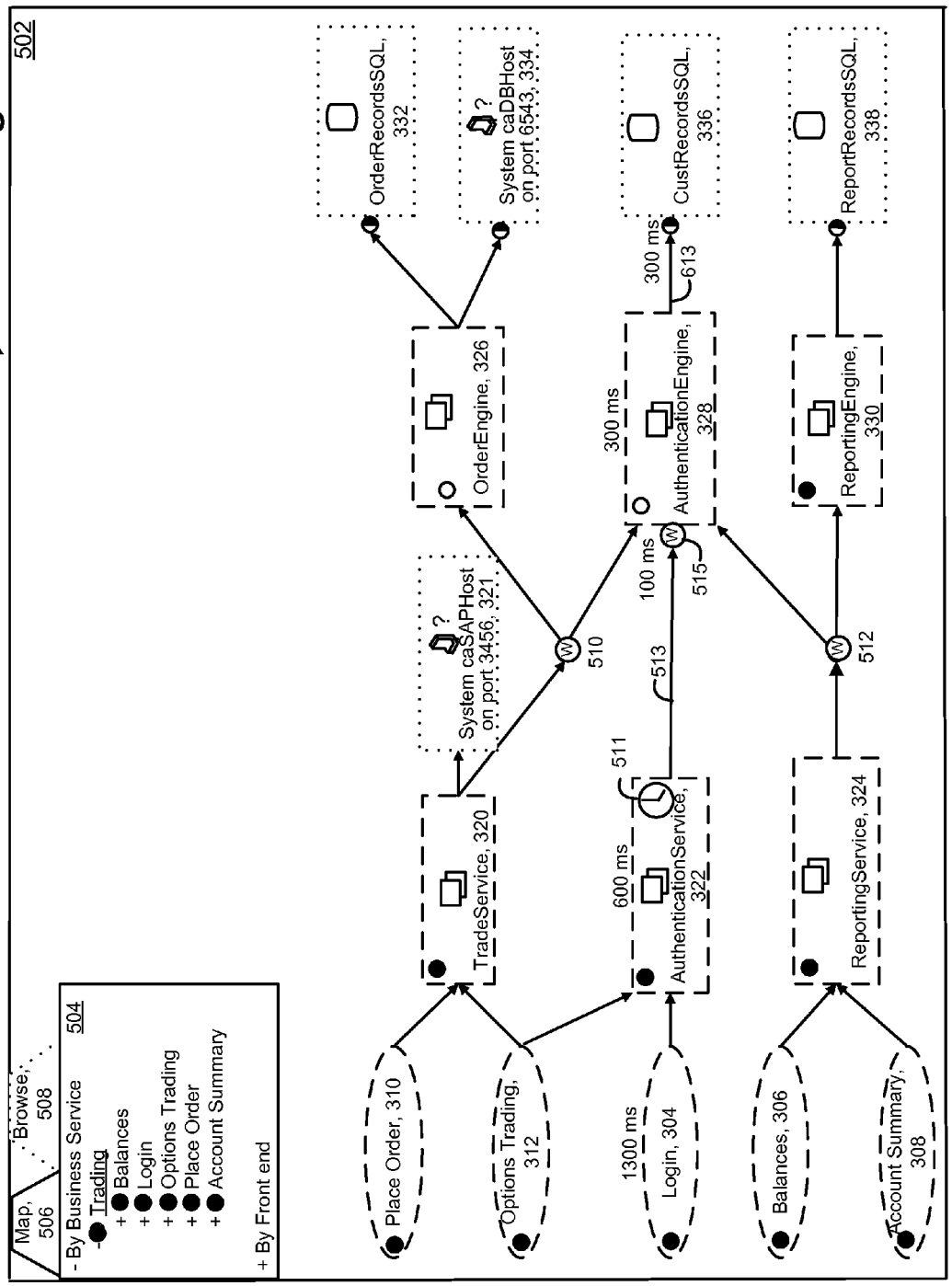
FIG. 5A depicts a user interface (UI) of subsystems and Business Transactions, where a Business Service has been selected by the user.

FIG. 5A depicts a user interface (UI) of subsystems and Business Transactions, where a Business Service of Trading has been selected by the user. The UI 500 provides a map, also referred to as an application dependency map or triage map, which graphically depicts how the subsystems depend on one another, e.g., an order in which they call one another using nodes which represent the subsystems and arrows which connect the nodes. Additionally, the map indicates which subsystems are associated with a particular Business Transaction. A Business Transaction can invoke components which are associated with one or more subsystems at one or more computing devices. The map can be developed based on an analysis of one or more managed applications to determine which subsystems can potentially call one another. This analysis can be done before component data is obtained in a specific time interval of the managed applications. The map can include subsystems of one or more Business Transactions.

A region 504 of the user interface allows the user to select a map tab 506 or a browse tab 508. Currently, the map tab 506 is selected. The tab provides a tree of nodes, including a node which can be opened to provide a view of the available Business Services, and a node which can be opened to provide a view of the available Frontends. The By Business Service node includes a node for the Business Service called Trading, and Trading includes nodes for its constituent Business Transactions: Balances, Login, Options Trading, Place Order and Account Summary, as discussed. Trading has been selected by the user, and the current display is based on this selection. This selection is noted by the underlining of "Trading" in the tree in region 504.

In response to this selection, a number (one or more) of associated Business Transactions, subsystems of the Business Transactions, and arrows which show dependency relationships among the subsystems, are displayed in a main area 502 of the user interface, referred to as a triage map region. The oval-shaped nodes 304, 306, 308, 310 and 312 on the left hand side represent, and include names of, the Business Transactions. Arrows, also referred to as edges, indicate which subsystem is first invoked for a Business Transaction, and the subsystems which are subsequently invoked. In some cases, a common subsystem is invoked for different Business Transaction instances. For example, AuthenticationService could be invoked by Options Trading and Login Business transactions.

The components which are invoked for a given Business Transaction instance can be separately tracked using unique identifiers, even when the components are at the same subsystem. Moreover, it is possible for separate instances of a component to be invoked at a subsystem in different Business Transaction instances. Again, these separate instances can be separately tracked.

Also, note that separate instances of the same Business Transaction need not invoke the same subsystems. For instance, due to an error or network failure, a Business Transaction instance may not invoke a particular subsystem which would otherwise be invoked when no error occurs. Or, due to the time of day or available resources, separate instances of the same Business Transaction can invoke different subsystems. Many variations are possible which are not necessarily depicted in these simplified examples.

The border of the nodes is used to depict whether the node is highlighted, and in some cases, a type of highlighting. Highlighting is one way to visually distinguish a node from other nodes. Different colors may also be used. In one approach, a dotted or dashed line border indicates no highlighting, while a solid line indicates highlighting. Double borders can also be used as well. In one approach, a solid line outer border indicates the node was selected by a user, and a dashed line outer border indicates that the node is being visually distinguished based on some other command by the user. The highlighting of a node can be responsive to a user selection in the region 504 and to a user selection of the node itself in the UI. Various highlighting, color coding and other visual effects can be provided to convey information to the user. Some of the subsystem nodes include: (a) a symbol such as two overlapping screens which represents a front end or aggregated front end (e.g., all servlets that share the same application context), (b) a cylinder-shaped symbol that represents a database or (c) a symbol that represents an unknown (un-instrumented) subsystem which is the destination of a socket call, to identify a type of the subsystem.

Other types of notations involve metrics and alerts. Alerts are available for Business Transactions (based on the associated component data), for a front end's overall performance ("Health"), and for back end calls made by the front end to an un-instrumented back end or to another front end. Calls made to another front end can be made through Web Services or EJB Clients to appear as such on the map. These alerts can be created and configured by a user. Thus, any given Business Transaction, front end, or back end call might or might not have an alert defined for it. If an alert is defined, it can appear in one of several states: normal (green), caution (yellow), danger (red), no data (gray) and scheduled downtime (black and gray). If an alert is not defined, no icon appears within the Business Transaction or front end, but a small "metric icon" can appear at the endpoint of the back end call to indicate that metric data is available here.

A circle which appears at the end of an arrow, which represents a call from one subsystem to another, indicates that there is recent data available for that call, though no alert has been defined. When an alert is defined for a back end call, the alert icon can be overlaid on and essentially replace the metric icon. The lack of any circle/alert icon can mean that no metrics have been seen for that call since the map was loaded. The alert icon for a method call can be set based on the total duration of the method call. The circle can be placed at a tip of the arrow, next to the called subsystem. For simplicity, in this example, a fully solid dark colored circle denotes a danger alert status, an open circle denotes a normal alert status, and a half-dark colored circle denotes that metrics are available and no alert has been defined. The region 504 can also provide the alert notation next to the name of a Business Service and Business Transaction to indicate what alert level is displayed for the associated hierarchical level. The circle notation in the region 504 for the Business Transactions is consistent with the circle notation for the nodes 304, 306, 308, 310 and 312. The alert level of a subject subsystem represents the highest alert level based on health metrics of the subsystem, as well as all associated destination subsystems of the subject subsystem. Also, the alert level of a Business Service can be set as the highest alert level of any of its Business Transactions.

The front end subsystems can make a call out of the application server through a socket. Those calls could be Web Services calls, JDBC driver calls or other types of calls. Web Services are typically application programming interfaces (API) or Web APIs that are accessed via Hypertext Transfer Protocol (HTTP) and executed on a remote system hosting the requested services. These calls, and others such as the JDBC driver calls, are still in the application server so we can detect them and obtain metrics regarding them, but since they call out of the application server, they are referred to as back end calls. Thus, the whole map such as in FIG. 5A shows detected front ends and the calls they make to back ends. The destinations of these back end calls are either other front ends (in the case of Web Services and some EJB calls) or un-instrumented back end components. Most of these un-instrumented components can be at least partially identified from the back end call; for instance, JDBC driver calls are labeled with their destination database name, and the default socket calls are labeled with the destination host and port. In other cases, the user may have defined custom calls and labeled them with their destination. In all these cases, the UI can provide a box representing the back end destination, labeled appropriately and with an icon depicting a database or other appropriate type of component.

For instance, if there is a call through a socket and we have instrumented the call and knew that it took 56 milliseconds, but we do not know its destination (what subsystem it called), we can display that time metric in the UI alongside a back end node showing an "unknown component" icon and labeled with the system hostname and port. The back ends 321, 332, 334, 336 and 338 are essentially dummy nodes in the map because they represent a destination which is not instrumented and for which we therefore have no information reported by the destination. The circular icon adjacent to these nodes, at the end of the arrows representing the calls from the front ends, serve as placeholders for the back end call metrics and associated alerts.

For a call from one front end to another, full instrumentation is available. The call may be made, e.g., via Web Services or an EJB client. All Web Services calls originating from a single front end are aggregated and represented as a single "Web Services" back end call; thus, unlike other types of calls, a Web Services call may have more than one destination. In this case, the back end call will appear as a forking or branching arrow in the map. Since only one set of data is associated with this call, in one approach, the circular "W" icon appears in the map at the base of the fork, rather than alongside the destination box. In FIG. 5A, Web Services 510 and 512 represent two such forking Web Services calls; contrast these with the call between AuthenticationService 322 and AuthenticationEngine 328, which is also a Web Services call, but with a single destination. Specifically, a the Web Services icon 510 is at the base of a fork and not alongside the destination nodes 326 and 328, so there is one set of data associated with the call to Web Services 510. A Web Services icon 515 is alongside or adjacent to the destination node 329 since there is only one destination for the call. Optionally, the Web Services icon 515 could be between the nodes 322 and 328 so that the arrow 513 still extends between the node 322 and the Web Services icon 515 but an additional arrow (not shown) extends between the Web Services icon 515 and the node 328. A Web Services node 512 is at the base of a fork and not alongside the destination nodes 328 and 330, so there is one set of data associated with the call to Web Services 512.

Recall that the TradeService node 320, for instance, can represent a summary of multiple instances of the TradeService subsystem which run across multiple machines. The Web Services 510 are associated with one or more computing device/machines on which the TradeService 320 subsystem runs, and the Web Services 512 are associated with one or more computing device/machines on which ReportingService 324 subsystem runs. The metric or alert icons for Web Services 510 and 512 represent the performance or health of the method call(s) that were made from one computing device to a next computing device.

In one approach, the alert relates to a time metric such as a response time. The alerts can be configured so that a normal status is indicated for a response time less than a first level L1, a caution status is indicated for a response time between L1 and a second level L2, and a danger status is indicated for a response time greater than L2. The alerts can be configured based on any type of performance metric. For example, instrumentation can yield many types of performance metrics, including an average execution or response time of a component, an invocation rate per second or per interval, a count of invocations, a concurrency metric indicating a number of invocations that have started but not finished per interval, and a stalled metric indicating a number of invocations that have started whose method invocation times have exceeded a specific threshold per interval. These are examples of component data obtained at application runtime and reported by an agent. Alerts can be provided for any of the items.

Further, for resources in use on the computing machine that support the subsystems, the instrumentation can yield, e.g., data which can identify a garbage collection heap size, a bandwidth metric indicating file and socket activity, a number of threads, system logs, exceptions, memory leaks and component interactions. Alerts can also be provided for any of these items.

Moreover, an alert can be configured based on one or more performance metrics for a Business Transaction Component, such as a URL with specific parameters. For example, an alert can represent an average response time of a Business Transaction Component over a specified period of time.

As explained further below, based on the alerts and metrics icons, the user can take various steps to obtain further information regarding the Business Transactions, subsystems and calls depicted in the UI. In one approach, the user is guided by the presence of the alerts and metrics icons and seeks to obtain further information regarding the associated Business Transactions, subsystems and calls, such as to diagnose a problem. Moreover, as explained below, other types of information can be presented on the UI to assist in diagnosis. Generally, the various UIs provided herein can be provided in one or more windows and can use known UI techniques such as a popup window, mouse over or hover box, tooltip and right-clicking to access information.

Referring to the specific Business Transactions and their subsystems, the UI indicates that Place Order 310 and Options Trading 312 both invoke the front end subsystem, TradeService 320. In an example scenario, a user initiates Place Order 310 by defining an order which is to be placed, e.g., to buy or sell a stock or bond. All user inputs, and information or instructions presented to the user, can be provided via a web page or other UI. Or, a user initiates Options Trading 312 by defining a trade involving an option, such as a put or call. In either case, TradeService is used. TradeService calls System caSAPHost 321, such as to obtain additional information to process the order/trade. Little is known about the System caSAPHost 321 because it is not instrumented, so the node for it is merely a placeholder. The port of the computing device 321 which is called by the instance of TradeService is known (e.g., port 3456), and this information is used to decorate the node 321. System caSAPHost 321 could call another host or resource (not shown) as well, but this would not be depicted.

In computer networking, a port is an application-specific or process-specific software construct serving as a communications endpoint. It is used, e.g., by Transport Layer protocols of the Internet Protocol Suite, such as Transmission Control Protocol (TCP) and User Datagram Protocol (UDP). A specific port is identified by its number, commonly known as the port number, the IP address with which it is associated, and the protocol used for communication. TCP and UDP specify a source and destination port number in their packet headers. A process associates its input or output channel file descriptors (sockets) with a port number and an IP address, a process known as binding, to send and receive data via a network. The operating system's networking software has the task of transmitting outgoing data from all application ports onto the network, and forwarding arriving network packets to a process by matching the packets IP address and port numbers.

Processes create associations with transport protocol ports by means of sockets. A socket is the software structure used as the transport end-point. It is created by the operating system for the process and bound to a socket address which consists of a combination of a port number and an IP address. Sockets may be set to send or receive data in one direction at a time (half duplex) or simultaneously in both directions (full duplex).

TradeService 320 uses one or more Web Services (aggregated into a Web Services nodes 510) to request the order/trade. Web Services 510 in turn call: (a) the OrderEngine subsystem 326, which processes the order/trade, and/or (b) the AuthenticationEngine subsystem 328, which authenticates the order/trade, such as by verifying the user's credentials. The map does not necessarily indicate that TradeService calls both of these other subsystems at approximately the same time or at different times (e.g., maybe it was after the call to the OrderRecordsSQL database was made); as part of the same Business Transaction or as part of different Business Transaction (there are two Business Transactions associated with TradeService, after all); etc. It's also possible they were both called as part of the same Business Transaction but during different instances of it. The map tells us that at some point in a specified time period, TradeService called both of these front ends, using Web Services 510.

To service one or more calls from Web Services 510, the OrderEngine subsystem 326 calls two back ends: the OrderRecordsSQL database 332, which stores order records using SQL, and System caDBHost 334. System caDBHost 334 may be used, e.g., for some administrative handshake or other task that was not marked as being part of the JDBC driver. The AuthenticationEngine subsystem 328 calls the CustRecordsSQL database 336, which stores customer records, such as to confirm that the user/customer is authorized to place the order/trade.

The Business Transaction of Login 304 involves the front end subsystem, AuthenticationService 322. In an example scenario, discussed previously, Login invokes components CM1-CM4*a* at the AuthenticationService subsystem 322 and CM7-CM10 at the AuthenticationEngine subsystem 328.

As depicted by arrow 513, CM4*a* calls CM7 at the AuthenticationEngine subsystem 328, which could be on the same server, or a different server, than the AuthenticationService subsystem 322. CM7 calls CM8, which calls the CustRecordsSQL database 336 to access customer records to confirm that the user login matches the password. Assuming this succeeds, the control flow returns to CM7 and CM7 calls CM9. CM9 calls the CustRecordsSQL database 336 (or another database) to again access customer records to confirm that the user's account is in good standing, e.g., the user has paid fees, or made a minimum number of trades, to maintain the account. Assuming this succeeds, the control flow returns to CM7 and CM7 calls CM10. CM10 calls the CustRecordsSQL database 336 (or another database) to again access customer records to update the records to indicate that the user is now logged in, and returns login status=true to CM7. The control flow then returns to CM2, and CM2 calls CM4*b* which in turn calls CM5. The control flow then returns to CM4*b*, then to CM2 and finally to CM1 at which point the instance of the Login Business Transaction ends.

Both Balances 306 and Account Summary 308 invoke a common front end subsystem, ReportingService 324. In an example scenario, a user initiates Balances by making a request to obtain an account balance, e.g., to learn the amount of funds in a particular account. Or, a user initiates Account Summary 308 by making a request to obtain a report (e.g., statement) of recent transactions, e.g., orders/trades, fund transfers and so forth. In either case, ReportingService 324 processes the report request by calling the Web Services 512, which in turn calls the AuthenticationEngine subsystem 328, which may call the CustRecordsSQL database 336 to access customer records to confirm that the user/customer is authorized to obtain a report.

In one implementation, the control flow returns to the ReportingService 324, which makes another call via the Web Services 512 to the ReportingEngine subsystem 330, which fulfills the report request by calling the ReportRecordsSQL database 338, to obtain records which are used to provide the report. This call to Web Services 512 may include information which specifies the type of report desired, an account identifier, a time frame involved and so forth.

The time metrics which are calculated as discussed in connection with FIG. 4B1-4B3 can be displayed on the UI 500, such as above a corresponding node. That is, the UI and its nodes and arrows are decorated with the metrics. The total duration, net duration and/or wait time can be displayed. Here, the total duration of Login (1300 ms. or ms.) is displayed above the Login node 304, the net duration of 600 ms. is displayed above the AuthenticationService node 322, the inter-subsystem communication time (100 ms.) for the call to AuthenticationEngine 328, is displayed above the arrow 513, the duration 300 ms. is displayed above the Authentication-Engine node 328 and the wait time of 300 ms. which is allocated to CustRecordsSQL is displayed above the arrow 613. The nodes and arrows are thus decorated with metrics. These metrics may be for a single instance of a Business Transaction such as Login or, more commonly, an average over multiple instances of the Business Transaction, such as over a specified time interval.

The danger level alert which is displayed for the Login node 304 may be based on the time of 1300 ms. exceeding a threshold level such as 1000 ms. The danger level alert which is displayed for the AuthenticationService node 322 may be based on the time of 600 ms. exceeding a threshold level such as 300 ms. The danger level alert which is displayed for the arrow 513 may be based on the time of 100 ms. exceeding a threshold level such as 50 ms. The normal level alert which is displayed for the AuthenticationEngine node 328 may be based on the time of 300 ms. not exceeding a threshold level such as 500 ms. The half-dark colored circle at the tip of the arrow 613 (e.g., at the endpoint of a back end call) denotes that related metrics are available and no alert has been defined.

Generally, the UI 510 can be populated with time metrics for various Business Transactions, subsystems and calls. Time metrics are depicted for the Login Business Transaction 304 only for simplicity, but in practice, can be displayed for all Business Transactions at the same time. When multiple time metrics are associated with a subsystem which is invoked by different Business Transactions (an example is TradeService 320 which is invoked by Place Order 310 and Options Trading 312), each time metric can be associated with one of the Business Transactions by color coding or other visual technique. For example, a time metric associated with Place Order can be displayed in one color above the TradeService node 320, while another time metric associated with Options Trading can be displayed in another color above the TradeService node 320.

A clock icon 511 can be provided for the subsystem which has a highest net duration (or total duration or wait time) among all subsystems of the Login Business Transaction. If two net durations are the same, within a tolerance, the higher level subsystem can receive the icon, the icon can be displayed with both subsystems, or the icon need not be displayed.

In this way, the user can quickly ascertain that a given subsystem is a problem and focus the diagnosis on that subsystem. Multiple problematic subsystems can also be identified. The severity of an alert can also guide the user. For example, if a normal level alert is displayed for the AuthenticationEngine subsystem, and a danger level alert is displayed for the AuthenticationService subsystem, the user may be led to investigate the AuthenticationService subsystem first. Various techniques are provided which allow a user to obtain additional details regarding a subsystem and the components it invokes.

The metrics which are provided on the UI are based on data from a managed application in a specified time interval. In one approach, the UI is initially displayed with no metrics, and the user enters a command to obtain metrics such as by finding transactions which match user-specified filter criterion. The user can manually specify the criterion, or a default set of one or more criterion can be used. The UI is then populated with the metrics from transactions that match the criterion. In another approach, the UI can be displayed initially with metrics which are captured based on a default set of filter criterion.

FIG. 5B1 depicts the user interface of FIG. 5A with the addition of a hover box showing metrics for the Login Business Transaction 304. In the UI 520, the user can use a pointing device such as a mouse to point a cursor (represented by an angled arrow) over a node of a Business Transaction, subsystem or Web Service call, or over an arrow, to display related performance metrics. Generally, the user can point at and click on a node to enter a selection to cause related information to be displayed in an auxiliary region of the UI, discussed further below. Pointing at an element usually causes the hovering tooltip to appear; clicking on (i.e., selecting) the element usually displays related information in another part of the UI. The node can be associated, e.g., with a Business Transaction overall or with a subsystem of a Business Transaction. The specific performance metrics and their format can be configurable. Here, the cursor is pointed at, and held over, the node for Login for a few moments, causing a hover box 522 to appear. The user thus provides a command to display metrics associated with the selected Business Transaction.

The hover box identifies the name of the Business Transaction (Login), as well as an alert level and performance metrics for a relevant time interval. The alert level indicates a dangerous condition. Next, the average response time (total duration) of 1300 ms. is displayed. In this scenario, as an example, the response time of Login is an average over four instances of Login. "Count" indicates a number of instances or invocations of Login in the most recent time interval, which is the time interval under analysis. Here, count=4 indicates four invocations. "Min" indicates the minimum response time, e.g., 1100 ms., and "Max" indicates the maximum response time, e.g., 1500 ms. "Errors per interval" identifies the number of errors in Login in the most recent time interval. "Responses per interval" identifies the number of responses associated with Login, e.g., four responses. "Stall count" identifies the number of stalls in Login in the most recent time interval, e.g., zero stalls. The hover box can provide summary performance data across all the computing devices/agents that are reporting the selected Business Transaction.

FIG. 5B2 depicts the user interface of FIG. 5A with the addition of a hover box showing metrics for the AuthenticationService subsystem 322. In the UI 525, in addition to providing a hover box for a Business Transaction, e.g., via node 304, a hover box with metrics could similarly be provided for any of the subsystems of Login. For example, a hover box 523 for the AuthenticationService subsystem 322 could indicate metrics specific to the subsystem, such as: an alert level, average response time, number of concurrent invocations, errors per interval, responses per interval and stall count.

Thus, for a given subsystem, the user can trigger the display of associated performance metrics. This is across all transactions that pass through that subsystem, so it is represents a general health or overall performance.

As a further example, a hover box for the Web Service 342 could indicate similar metrics which are specific to the calls made by TradeService 320, such as: an alert level, average response time, errors per interval and stall count.

The user can also trigger the display of a list of reporting agents and per-agent data. Along with the by-agent data, the dependency map can display summary performance data, e.g., overall health data, across all the computing devices/ agents that are reporting a particular Business Transaction. The current values are displayed on hover, and time trends are also available, e.g., under the tabs labeled Transaction List, Details and Trace View, in an auxiliary region. Finally, the same kind of summary data is also available for the identified subsystems (front ends and their back end calls), both the snapshot on hover and the time trends.

The tooltip data (and the data charts shown in FIG. 5H) corresponds to the "general health" or "overall performance," as it is summarized across all relevant transactions on all agents. When we list contributing agents and the by-agent performance metrics (as in FIG. 5G), we are summarizing across all relevant transactions reported by the listed agent (i.e., running on a particular JVM). We refer to this as a single "Location" of the subsystem, and talk about the Location health metrics.

FIG. 5C depicts the user interface of FIG. 5A with the addition of a context menu 532 showing options for Login. Generally, the node of a Business Transaction such as node 304 can be used to provide a user command associated with the node, such as a command entered via a pointing device. The user can point to the node and right-click a mouse to cause the UI 530 to display a list of options which are specific to the node. An option can then be selected by pointing to the option with the cursor and left-clicking, in one possible approach.

For example, the context menu 532 allows the user to select among four options to obtain additional information regarding Login 304. The first option is to display a map of Login, which results in the interface of FIG. 5D. The second option is to find matching transactions, which results in the interface of FIG. 5E1. The third option is to find locations (i.e., contributing agents and their associated health metric data) for Login, which results in the interface of FIG. 5G. The fourth option is to view health metrics for Login, which results in the interface of FIG. 5H. The health metrics, a set of performance metrics, can indicate the overall health of Login, for instance.

Figure 5D:
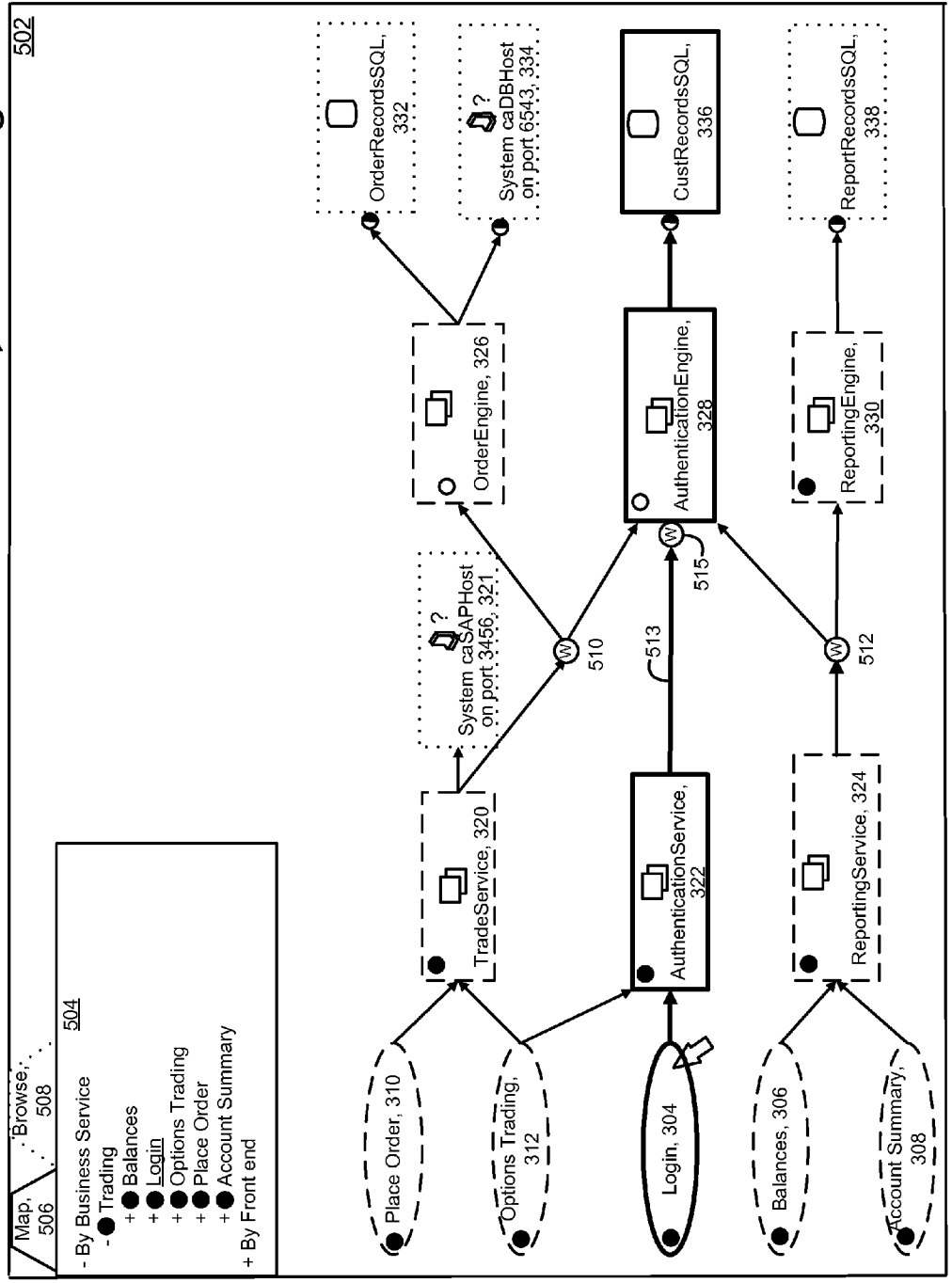
FIG. 5D depicts a user interface of a map of the Login Business Transaction which is launched from the context menu 532 of the user interface of FIG. 5C.

FIG. 5D depicts a user interface of a map of the Login Business Transaction which is launched from the context menu 532 of the UI of FIG. 5C. When "Display map of Login" is selected, the tree in the region 504 is automatically updated (e.g., by underlining) to indicate that Login has been selected, and the UI 540 provides details for this selected Business Transaction. Alternatively, the user can select Login from the region 504 by selecting the corresponding node in the tree, instead of using the context menu 532. Or, the user could double click on the Login node 304 using an arrow-shaped cursor (shown). A single-click on the node 304 can select the node and causes an auxiliary display region or lower pane 562 (discussed below) to appear.

Here, the user selection causes the UI to highlight the node 304 which represents Login 304 and the associated subsystem nodes 322, 328 and 336 with a heavy solid line border. Again, highlighting by changing the border of the nodes is one option, as the use of color, shadows and/or other visual effects is also possible. The arrows associated with Login can also be highlighted, e.g., by an increased thickness or other visual technique. Through this highlighting, the user can easily identify and focus on the subsystems involved in a user-selected Business Transaction, as well as the calling dependency relationships among these subsystems. The nodes of the subsystems which are not involved in the user-selected Business Transaction are not highlighted, and can remain de-emphasized, e.g., with a dashed or dotted border. The highlighting is one way to visually distinguish one node or arrow from another.

FIG. 5E1 depicts a user interface to find matching transactions for the Login Business Transaction which is launched from the context menu 532 of the UI of FIG. 5C. In the UI 550, a window 564 is displayed which allows a user to find matching transaction instances for a currently selected Business Transaction, e.g., Login. The window allows the user to enter a command with one or more filter criterion to be used in obtaining data from instrumentation of an application in a future time period, in a transaction mapping mode. For example, consider a scenario in which a user of a client computing device has a problem logging in to an application, where the login takes an unusually long time. The user may telephone personnel at a help center and explain the problem. The help center personnel may take steps to diagnose the problem, such as instructing the user to repeat the same steps which resulted in a problem, while initiating a new recording of metrics from the transaction. This can assist the help center personnel in determining if the problem is specific to the particular user, occurring each time for that user, or is general, occurring for all, or a substantial portion of, users who attempt to login. If the problem is specific to a user, additional matching transactions can be located for only that user. The window 564 could include a field (UserId) to identify a user of a client computing device as a filter criterion. Determining whether the problem is general or specific is helpful in isolating the source of the problem.

The help center personnel can obtain additional data by configuring the recording of data in a future monitoring period, such as the next few seconds or minutes. The help center personnel can enter a threshold duration for the transactions which is a specified number of milliseconds or longer. This means only component data for future Login Business Transactions (e.g., transactions which invoke CM1) which exceed the threshold will be captured and displayed via the UI. In some cases, a Business Transaction includes multiple threads in which case the first thread can be captured and displayed, in one approach. Depending on the configuration, we can also capture all the threads; however, we typically list/label the traces by the first component of the first thread.

Further, the help center personnel can set the time period to end after the earlier of: (a) a specified number of seconds, and (b) after a specified number of matching transactions (e.g., matching instances or traces) are detected. As an example, the help center personnel may set the threshold for 1000 ms. stopping after 180 seconds (3 minutes) or after 10 matching transactions, whichever comes first. The help center personnel can select the "OK" button to begin the monitoring period, or the "close" button to close the window without beginning a new monitoring period.

The window 564 could be used to set any filter criterion, including minimum and maximum transaction duration, as well as filtering by agent or host identifier, or other factors.

Information about the matching transactions is depicted in auxiliary region 562. The auxiliary region 562 provides a table which lists a total duration, or other time metric, of each transaction instance, the reporting agent identifier, the identifier of the host on which the agent runs, and a timestamp of a start time of the transaction. The time is listed in hours, minutes and seconds. Fractions of a second could also be provided. The auxiliary region 562 could provide any type of performance metric associated with the transaction instances.

The metrics that we gather every 15 seconds, for instance, are different from this transaction trace data. Transaction traces involve recording matching transactions and identifying the call sequence and the durations of each call (and total duration of the sequence). We also obtain information about whether a particular transaction reported an error.

The auxiliary region 562 can be displayed as a window or other portion of the UI 550, or on a separate display screen, for instance. It is helpful if the auxiliary region is displayed concurrently with the triage map region 502. The auxiliary region can appear in any portion of the UI.

The user can click the column headings to sort the table entries in the auxiliary region 562. In another approach, the auxiliary region 562 could present the results on two or more axes, where one axis represents time and one or more other axes represent the other table headings, e.g., duration, transaction id, agent id and host id. Other visual displays are possible such as bar charts, pie charts and so forth. The longest duration transactions can be identified quickly, for instance, for diagnosis.

Here, four transactions are located, two from AgentA at HostA and two from AgentB at HostB. The response times (total duration) of the transactions at AgentA are 1100 and 1200 ms. for an average of 1150 ms. The response times (total duration) of the transactions at AgentB are 1500 and 1400 ms. for an average of 1450 ms. An average response time of the four transactions is thus 1300 ms. The user can select the "find more" button to obtain more of the same type of transaction instances which are currently displayed in the auxiliary region 562. In one approach, this search automatically uses the same filter criterion set by the window 564 so the user is not required to re-enter the criterion. That is, the "Find More" command repeats the transaction trace session with the same criterion as before. Or, the user can search again with new criterion. In either case, the auxiliary region 562 is updated with the new results, either in place of or in addition to, the previous results.

The auxiliary region 562 can be updated in real time as additional matching transactions are identified. Furthermore, a region 566 can inform the user of the progress of the search before it completes. Here, the user is informed that four transactions which exceed 1000 ms. in duration have been traced/located so far, and the remaining time in the search is 53 seconds. Buttons in the region 566 allow the user to stop or restart the current search. The relative size of the auxiliary region 562 can expand, up to a certain point, as additional transactions are located. A scrolling mechanism can allow the user to view additional transactions when there is not sufficient space on the screen to display all results concurrently. The results can be displayed as entries or rows in a table, in one approach. A "Clear" button allows the user to remove all of the old transaction instances from the list, that is, all traces from the previous recording session. Individual entries can be deleted by the user by selecting the checkbox next to the entry, then selecting the "Delete" button.

When the recording session is concluded, and no transaction is selected in the auxiliary region 562, the timing data which is located near the node of Login can be updated to reflect the current set of metrics. For example, the average duration of Login (1300 ms.) can be displayed. The average total durations of the associated subsystem nodes 322, 328 and 336, and the inter-subsystem communication times, can also be displayed. If the user selects one or more of the transactions in the auxiliary region 562 by selecting the check boxes and then the "View in map" button, the triage map region 502 can be updated with the corresponding metrics. For example, if the first two entries are selected, the duration of 1150 ms. would be provided for the Login node 304 and corresponding metrics optionally provided for the other nodes.

Note that for some transactions, it is possible that fewer than all of the subsystems of the Business Transaction were invoked. This can be reflected by the highlighting only the invoked subsystems but not the other subsystems in triage map region 502, when the user selects that transaction instance from the auxiliary region 562 followed by "View in map." For example, as depicted in FIG. 5F, one of the transaction instances may invoke AuthenticationService but not AuthenticationEngine or CustRecordsSQL, in which case the nodes 304 and 322 are highlighted, but not the nodes 328 and 336, or the arrows 513 and 613.

FIG. 5E2 depicts a user interface to find matching transactions for the AuthenticationService subsystem in the context of a selected Business Transaction. As an alternative to finding transaction traces which are associated with a Business Transaction, it is possible to find transaction traces which are associated with one or more user-selected subsystems in the context of a selected Business Transaction. In this example, the user selects a front end view in the region 504 for the AuthenticateService subsystem in the UI 555. A front end view represents all the transactions originating in a front end subsystem. With this selection the nodes in the region 502 which are not associated with the selected subsystem are removed. Optionally, the nodes for the associated Business Transactions 304 and 312 can remain. Moreover, one or more additional subsystems which are dependencies of the AuthenticateService subsystem can be displayed. For example, another unknown component (socket) 323 is depicted. The AuthenticationService may occasionally call some backup system that isn't involved in any of the Business Transactions defined as part of the Trading Business Service. In this case, that backup subsystem would appear in the front end view but not in the Trading Business Service map.

Here, the user selects the icon 322 by pointing at it to call up a context menu (such as context menu 532 in FIG. 5C) and selects "Find matching transactions" to find matching transactions, resulting in the window 565 being displayed. In this example, the Login Business Transaction is selected so that matching transactions are considered which invoke AuthenticationService only in the Login Business Transaction. The threshold can be run in comparison to a total duration of a subsystem. The threshold is set at 1000 ms. again in this example. Thus, we can find transaction instances which meet a filter for front ends and Business Transactions as well as the previous example of finding transactions for a specified Business Transaction without regard to a front end. In other words, we can look for all Business Transactions of Login where the first subsystem was AuthenticationService. In this case, we return Login instances, but not standalone threads from other Business Transactions that require authentication using AuthenticationService. For example, we do not return transactions of Options Trading which can also call AuthenticationService. The auxiliary region 562 indicates that three transactions have been matched so far, and that they are from AgentA and AgentB with response times of 1150 ms., 1250 ms. and 1550 ms.

The above example could be extended in a case where three or more Business Transactions can invoke a subsystem. For example, the user could select the first and second Business Transactions but not the third as the filter criterion.

FIG. 5E3 depicts a user interface to find matching transactions for the AuthenticationService subsystem in the context of multiple Business Transactions. In contrast, to FIG. 5E2, the user interface 556 allows the user to locate matching transactions for AuthenticateService across all associated Business Transactions. Here, the icons for Login and Options Trading are unselected so that, when the AuthenticateService icon 322 is selected, the window 567 indicates that the filter criterion does not specify a particular Business Transactions. Optionally, from a Business Transaction View, such as in FIG.

5E1, the user could request matching transaction for a selected subsystem independent of Business Transaction (this might be the default if the Business Service was selected in the tree. We could then jump the user to a front end view for that subsystem such as in FIG. 5E3 before running the trace.

FIG. 5F depicts a user interface 560 in which fewer than all subsystems of Login are invoked for a selected Business Transaction instance. Metrics such as duration may not be provided for the non-invoked subsystems. A scenario where a particular instance of a Business Transaction invokes only a subset of the subsystems which are invoked in the aggregated Business Transaction could be caused by, e.g., an error that occurred, or due to some parameter of the transaction that affected the flow. Moreover, in an error scenario, the transaction list in the auxiliary region 562 can identify transactions that included an error with a different font or color, for instance. An example of a parameter of the Business Transaction that affected the flow occurs, e.g., where an illegal character in the UserId caused the UI to return an error before AuthenticationEngine was invoked.

Figure 5G:
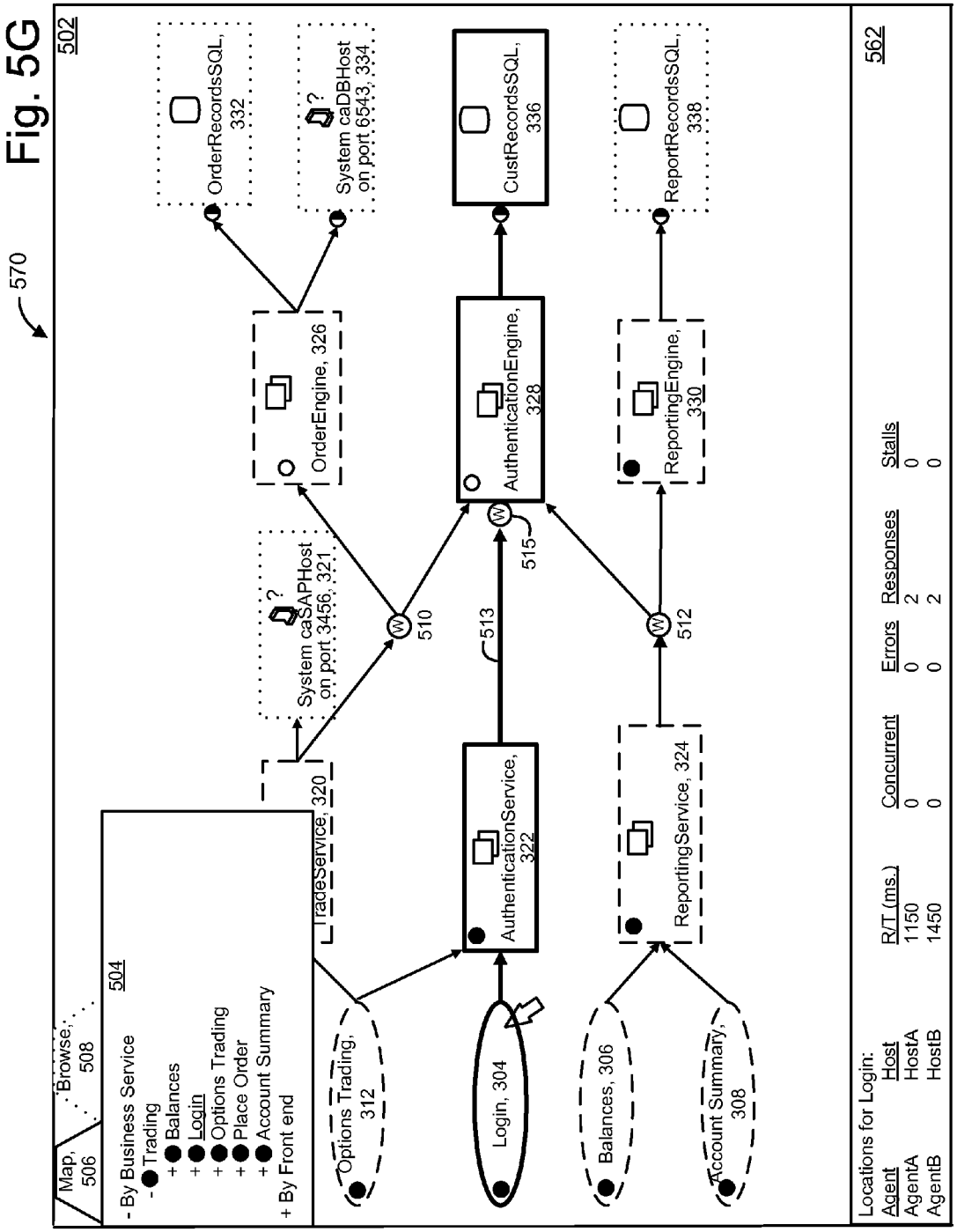
FIG. 5G depicts a user interface with locations for Login which is launched from the context menu 532 of the user interface of FIG. 5C.

FIG. 5G depicts a user interface 570 with locations for Login which is launched from the context menu 532 of the UI of FIG. 5C. The UI shows the locations in which Login instances are invoked, that is, which agents and computing devices (computing machines) have reported one or more instances of Login in a specified time period. In response to this selection, made by selecting "Show Locations for 'Login" in the context menu 532, the auxiliary region 562 is provided. The context menu 532 allows the user to link to the auxiliary region 562. The locations can be identified by listing a host computing device on which software of Login executes, as well as an associated agent which obtains metrics from instrumentation of the software. Metrics for a current time interval can also be provided, such as response time (R/T) (total duration), number of concurrent invocations of Login, number of errors, number of responses and number of stalls. The agent and host locations are indexed to the metrics.

In this example, two agents/computing devices have reported a location for Login, each reporting two instances of Login. Specifically, AgentA at HostA detected two Login transaction instances and the average response time or duration was 1150 ms. (e.g., an average of one instance at 1100 ms. and another instance at 1200 ms.). Agent B at HostB detected two other Login transaction instances and the average response time or duration was 1450 ms. (e.g., an average of 1400 ms. for one instance and 1500 ms. for another instance). Optionally, auxiliary region 562 could display an entry for each instance of Login instead of aggregating the instances for each agent/host. A host could be identified by a text name or by an Internet Protocol (IP) address or other network address. Both of these hosts represent computing devices that recorded the triggering request of the Login transaction; thus both are associated with AuthenticationService. But these numbers represent the metrics for the specific Business Transaction Component that defines the Business Transaction, which is a subset of the total activity measured for the AuthenticationService front end.

It is possible that software for implementing Login is installed on only one computing device. Or, software for implementing Login may be installed on multiple computing devices, but only one of them has invoked Login in the specified time period for which information is reported. This information is revealed in the auxiliary region 562. The reported metrics can be provided by the agent to a central manager which provides the UI, in one implementation.

Figure 5H:
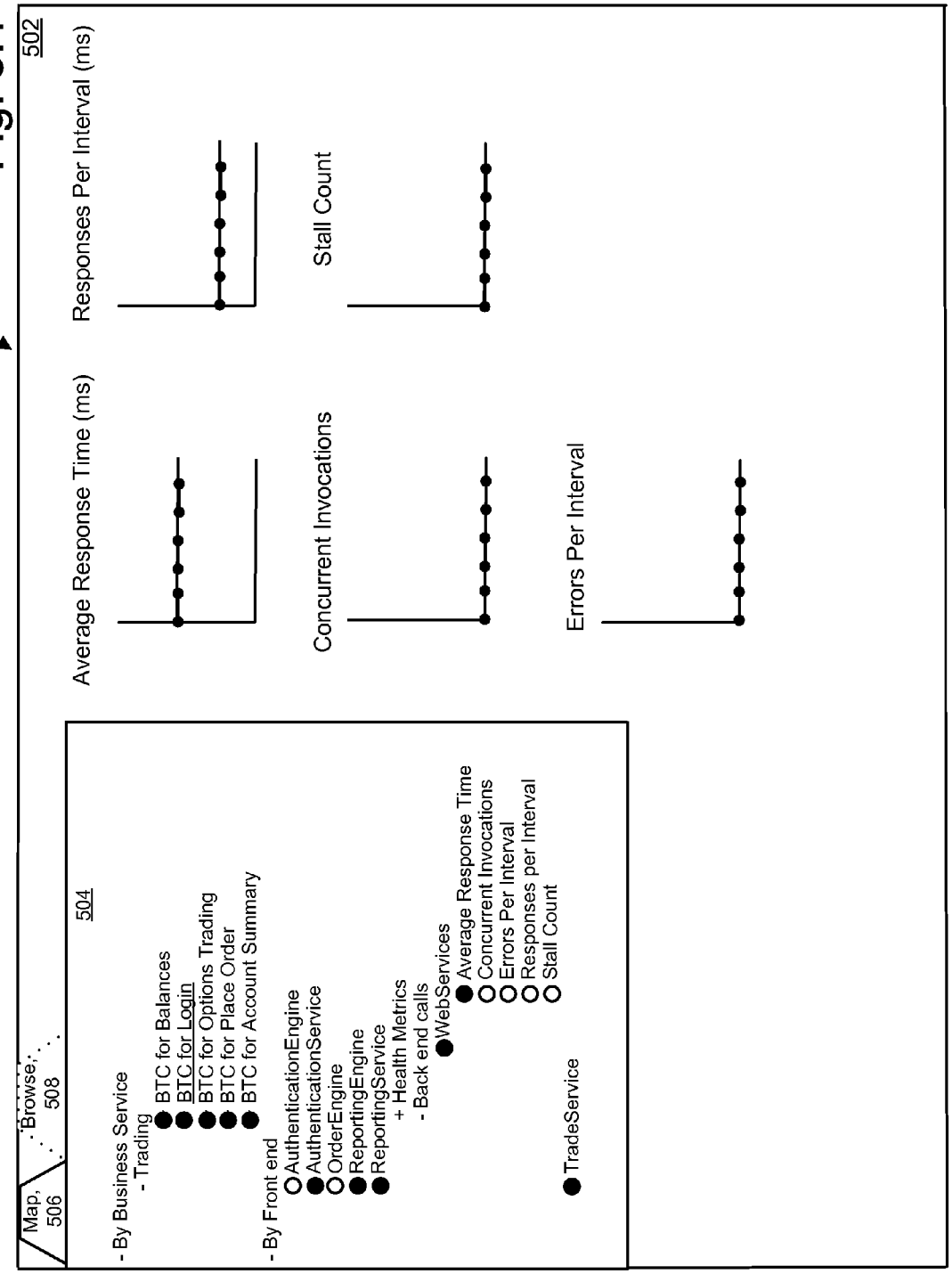
FIG. 5H depicts a user interface of health metrics of the Login Business Transaction which is launched from the context menu 532 of the user interface of FIG. 5C.

FIG. 5H depicts a user interface 580 of health metrics of Login which is launched from the context menu 532 of the UI of FIG. 5C. In the region 504, the tree is expanded to identify the components for which health metrics are available. The metric graphs shown for the Business Transactions and other subsystems here are summarized across all transaction instances on all agents. In one approach, the tree can have a single child node for each Business Transaction. Each such child node can be named for the associated Business Transaction Component (BTC), which is the only component which is actually measured by instrumentation, in one implementation. Selecting the BTC in the tree yields the graphs depicted.

The health metrics can include graphs, tables, or other visual presentations which provide metrics such as average response time, responses per interval, concurrent invocations, errors per interval and stall count. The UI 550 could be launched as a new window, as a popup window over the UI 530, on or a separate display screen, for instance.

Nodes of the tree can be expanded to view each option, or collapsed to hide the options. "By Business Service" and "By Front end" are different portions of the map tree (different sub-trees), representing different objects (Business Transactions and front ends) that are used for grouping and mapping transactions through the applications. That is, a transaction can be categorized as matching a particular Business Transaction, or it can be categorized as having a particular subsystem as its front end (or both). We can map a Business Transaction and its dependencies (i.e., all the subsystems invoked by transactions matching the Business Transaction), or we can map a front end and its dependencies (i.e., all the subsystems invoked by transactions originating in that front end).

Selecting "By Business Service" or "By Front end" in the tree region 504 provides a search utility for finding a particular Business Service or Business Transaction, in the first case, or Front end or Back end Call, in the second case. Selecting a Business Service or Business Transaction in the tree yields a "Business View" of the Application Triage Map—that is, a map of all the Business Transactions in the Business Service (with one of them highlighted if a Business Transaction is selected). Selecting a front end in the tree yields a "Front end View" of the Application Triage Map—that is, a map of that front end and its dependencies. Selecting anything beneath the level of a Business Transaction or a front end yields metric information about the selected item or its child nodes.

Performance metrics can be collected for the Business Transaction (actually, the Business Transaction Component) or for the front end's overall health and its various back end calls. The Business Service node in the tree is a folder for grouping the associated Business Transactions (and mapping them all together); the Business Transaction nodes let us see the Business Transaction maps; the front end nodes let us see the front end maps; all the other nodes show us relevant performance data.

Thus, the "By Business Service" element in the tree region 504 allows the user to view data from the perspective of the hierarchical arrangement of a Business Service and Business Transaction, for instance.

The "By Front end" element in the tree region 504 allows the user to view data from the perspective of a front end subsystem. This is a different way to look at the same data as the "By Business Service" view. For example, the nodes of the tree can include the different subsystems discussed previously. The node for ReportingService is expanded to indicate that Health Metrics can be accessed. This node could be expanded to provide sub-nodes such as average response time, concurrent invocations, errors per interval, responses per interval and stall count. The "Back end calls" node has been expanded to show sub-nodes for Web Services and its performance metrics. As mentioned, the circles identify alert levels (white for a normal level and dark for a danger level). This allows the user to quickly diagnose a problem.

In particular, the alerts "bubble up" in the tree, so that parent nodes show the worst-case alert status of any of their child nodes. So if ReportingService's Web Services back end call has a danger level alert, the "Back end Calls" node above it will also have a danger level alert, and so will the ReportingService node itself (The "Health" nodes represent the health of the front end itself, while the node above that represents the full set of items—front ends and back end calls—for that application.) Actual alert thresholds can be defined for the individual metrics associated with the front end "health", the back end calls, and the Business Transaction Components. The rest can be summary alerts based on those (worst-case, "bubble up" alerts).

Figure 5I:
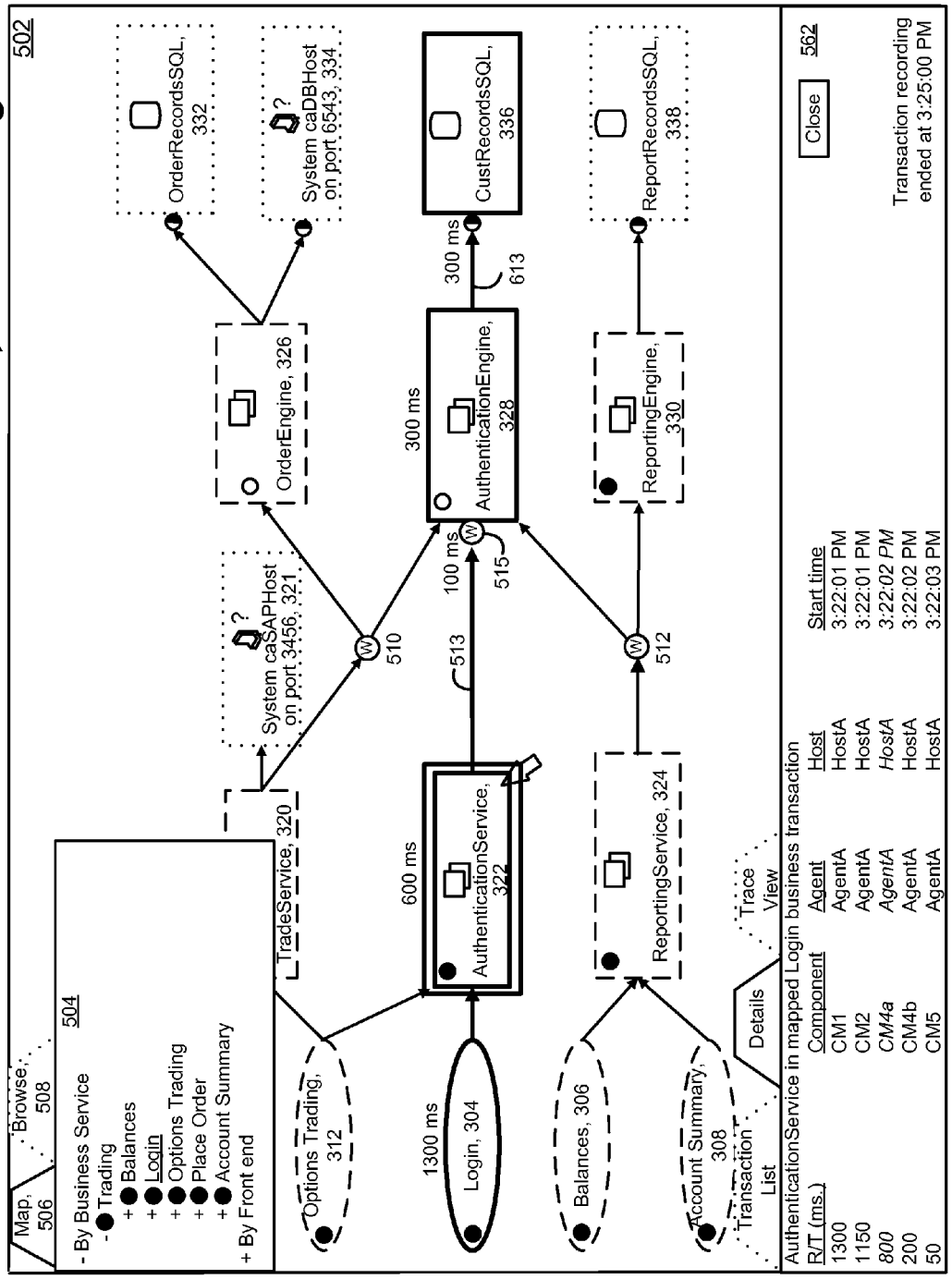
FIG. 5I depicts the user interface of FIG. 5G after a user selects node 322 and the "Details" tab from the auxiliary region 562.

FIG. 5I depicts the user interface of FIG. 5G after a user selects node 322 and the "Details" tab from the auxiliary region 562. In the UI 590, details regarding the selected subsystem 322 (AuthenticationService) are provided. Note that a different type of highlighting is used when a user selects a subsystem (e.g., a double solid line border) as opposed to when a subsystem is highlighted to depict a Business Transaction's path (e.g., a single solid line border).

For example, the region 562 can identify each instance of a component which is invoked at the subsystem as part of Login. In a simple example, only one instance of each component is depicted. In practice, multiple instances of each component can be depicted. As an example, the response times (total duration) of CM1 CM2, CM4a, CM4b and CM5 are 1300 ms., 1150 ms., 800 ms., 200 ms. and 50 ms., respectively. Recall that CM denotes a class-method pair. Further, AgentA on HostA is associated with each component, and execution start times of each component are indicated. Net durations could also be provided, additionally or alternatively. The Details tab is now active and selected; it lists the method calls from the transaction trace that are associated with the AuthenticationService node 322 in the triage map.

Optionally, the components of a subject subsystem which call a dependent subsystem are not provided in the auxiliary region 562 when only the subject subsystem node is selected by the user. For example, when only subsystem node 322 is selected, CM1 CM2, CM4a and CM5 can be listed in the auxiliary region 562 but not CM4a since it calls CM7 in subsystem 328. In this approach, the calling components to the dependent subsystem (e.g., CM4a) can be listed by itself in the auxiliary region when the user selects only the arrow 513. If the user then also selects the node 322, the additional components CM1 CM2, CM4a and CM5 can be listed. This allows the user to explore the triage map with greater granularity.

The components (calling components) which are invoked by a subsystem and call another subsystem can also be visually distinguished (e.g., by color, font, icon, note, etc.) in the auxiliary display region 562 from components which are invoked by the subsystem and do not call another subsystem. For example, the calling component CM4a is distinguished by italics in FIG. 5I.

The user can choose the Close button from any of the tabs to exit a "transaction-mapping mode" and return the map to its standard appearance and behavior.

In another option, the information under one or more of the "Transaction List," "Details" and "Trace View" tabs can be provided concurrently in the user interface instead of using tabbed views.

Figure 5J:
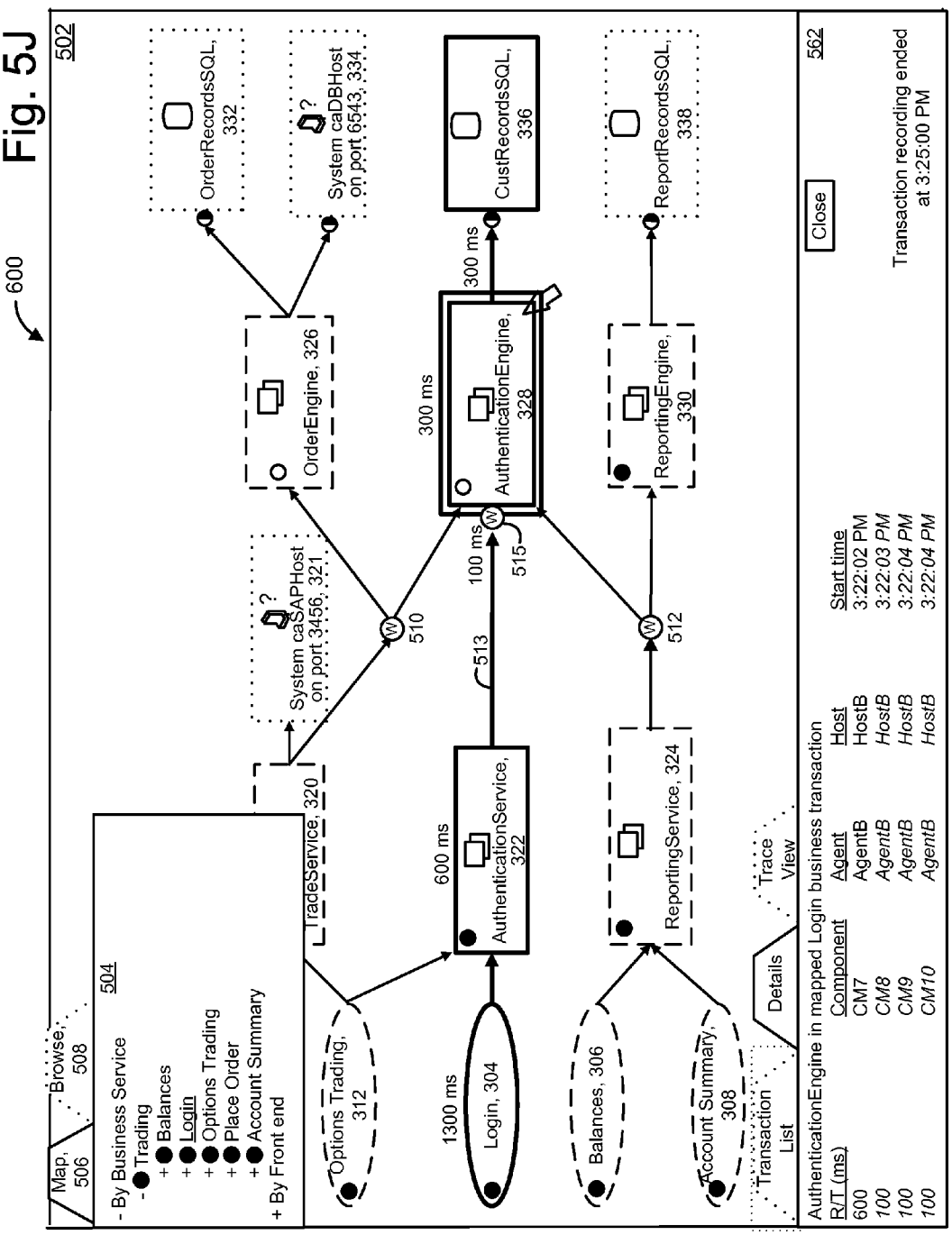
FIG. 5J depicts the user interface of FIG. 5G after a user selects node 328 and the "Details" tab from the auxiliary region 562.

FIG. 5J depicts the user interface of FIG. 5G after a user selects node 328 and the "Details" tab from the auxiliary region 562. In the UI 600, additional details regarding the selected subsystem 328 (AuthenticationEngine) are provided. As before, a different type of highlighting (double solid border) is used when a subsystem node is user-selected. Auxiliary region 562 can identify each instance of a component which is invoked at the selected subsystem as part of Login. In a simple example, only one instance of each component is depicted. In practice, multiple instances of each component can be depicted. As an example, the response times of CM7 is 600 ms., the response time of each of CM8, CM9 and CM10 is 100 ms. AgentB on HostB is associated with each component, and execution start times of each component are indicated.

Optionally, as mentioned, the components of a subject subsystem which call a dependent subsystem are not provided in the auxiliary region 562 when only the subject subsystem node is selected by the user. For example, when only subsystem node 328 is selected, CM7 can be listed in the auxiliary region 562 but not CM8, CM9 and CM10 since CM8, CM9 and CM10 call subsystem 336. In this approach, the calling components to the dependent subsystem (e.g., CM8, CM9 and CM10) can be listed by themselves in the auxiliary region when the user selects only the arrow 613 and/or the node 336. If the user then also selects the node 328, the additional component CM7 can be listed.

The components (calling components) which are invoked by a subsystem and call another subsystem can also be visually distinguished (e.g., by color, font, icon, note, etc.) in the auxiliary display region 562 from components which are invoked by the subsystem and do not call another subsystem. For example, the calling components are distinguished by italics in FIG. 5J.

Figure 5K:
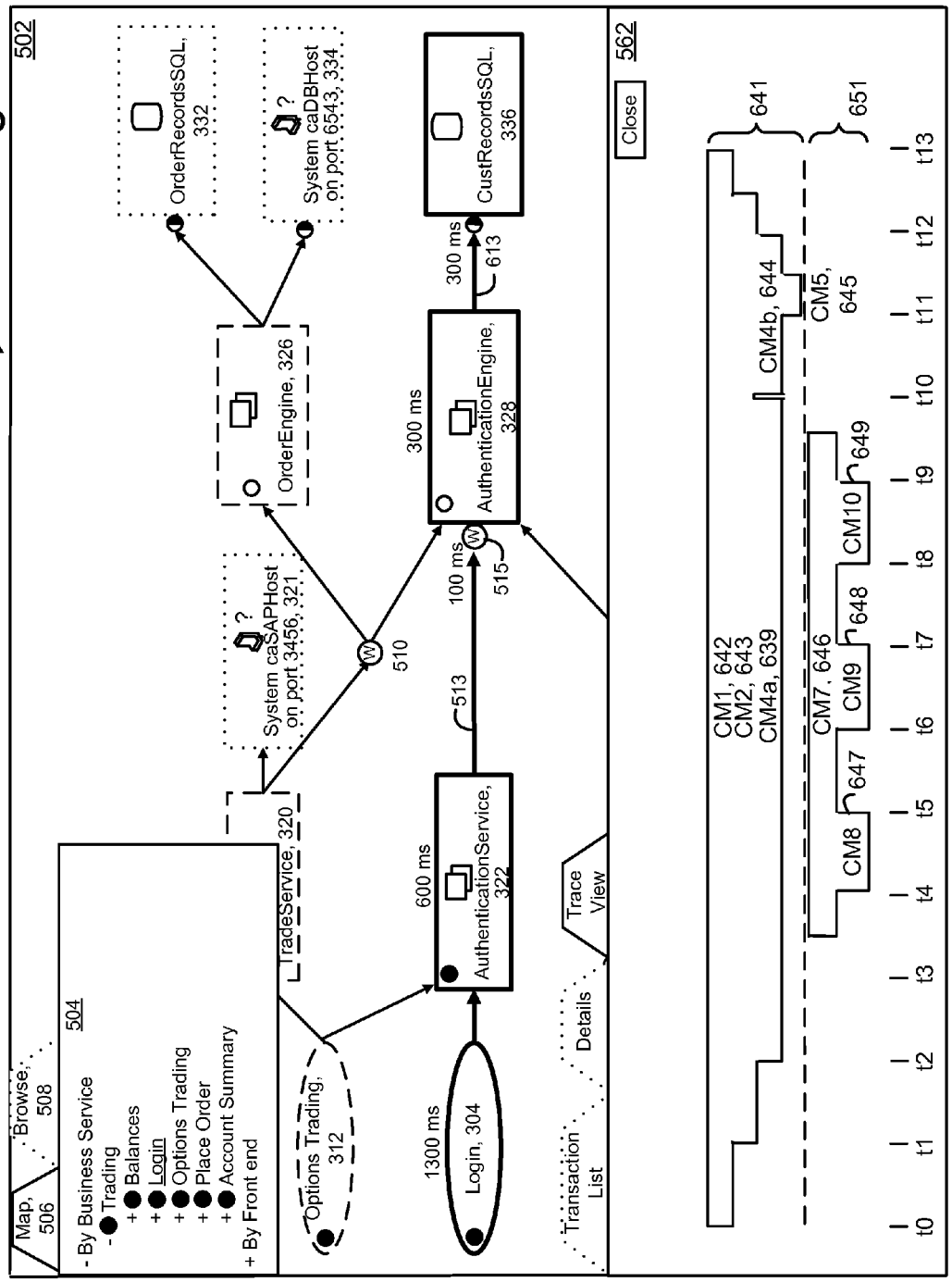
FIG. 5K depicts transaction traces for a selected transaction instance which can be launched from the user interface of FIG. 5E1.

FIG. 5K depicts transaction traces for a selected transaction instance which can be launched from the user interface of FIG. 5E1. For example, the user can select one of the transaction instances from the "Transaction List" tab of the auxiliary region 562 in FIG. 5E1, then select the "Trace View" tab. The trace view provides one or more transaction traces for a selected transaction instance. In this example, the transaction traces of FIG. 4B1 and 4B2 are repeated since they have been discussed in detail and are representative of the transactions in FIG. 5E1.

In the auxiliary region 562 of the UI 610, a transaction trace 641 is provided based on component data from the agent associated with AuthenticationService, and a transaction trace 651 is provided based on component data from the agent associated with AuthenticationEngine. The transaction trace 641 includes graph portions 642, 643, 639, 644 and 645 to represent CM1, CM2, CM4a, CM4b and CM5, respectively. The transaction trace 651 includes graph portions 646, 647, 648 and 649 to represent CM7, CM8, CM9 and CM10, respectively.

The user can view the triage map region 502 and the transaction traces at the same time, in the same UI on one or more screens, while exploring correlations between the two. The user can select (e.g., using a pointing device) a transaction trace as a whole, or its graph regions 639 and 642-649, to cause one or more corresponding nodes to be visually distinguished in the triage map region 502.

When the user selects the first transaction trace 641, the node 322 is visually distinguished from the node 328 and other nodes. And, when the user selects the second transaction trace 651, the node 328 is visually distinguished from the node 322 and other nodes. In another possible approach, when the user selects the first transaction trace 641, the node 322 and all dependent nodes (328, 336) and associated arrows (513, 613) are visually distinguished from other nodes and arrows. And, when the user selects the second transaction trace 651, the node 328 and all dependent nodes (336) and associated arrows (613) are visually distinguished from other nodes and arrows.

Figure 5L:
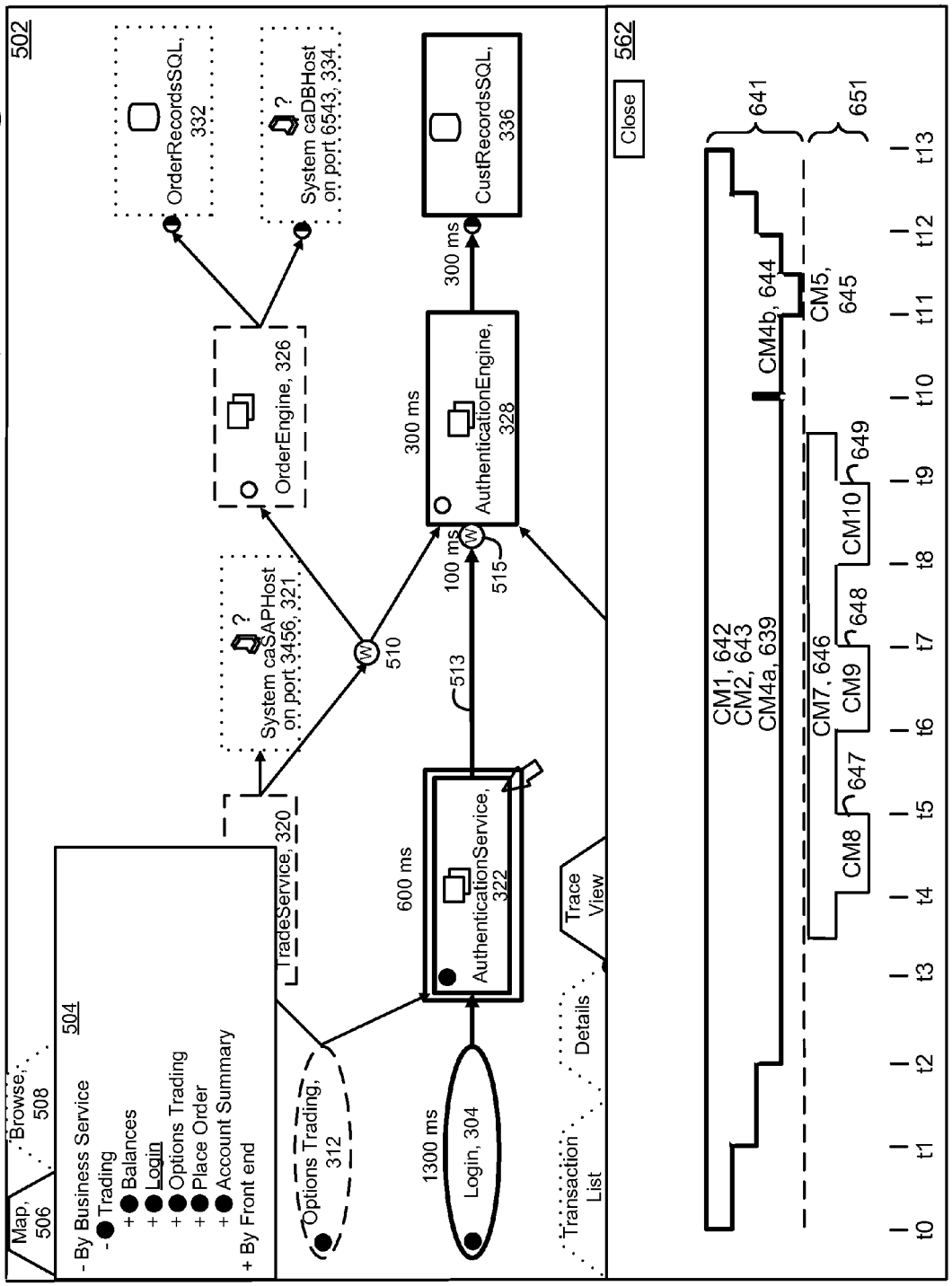
FIG. 5L depicts the user interface of FIG. 5K when a user selects a subsystem node.
Figure 50:
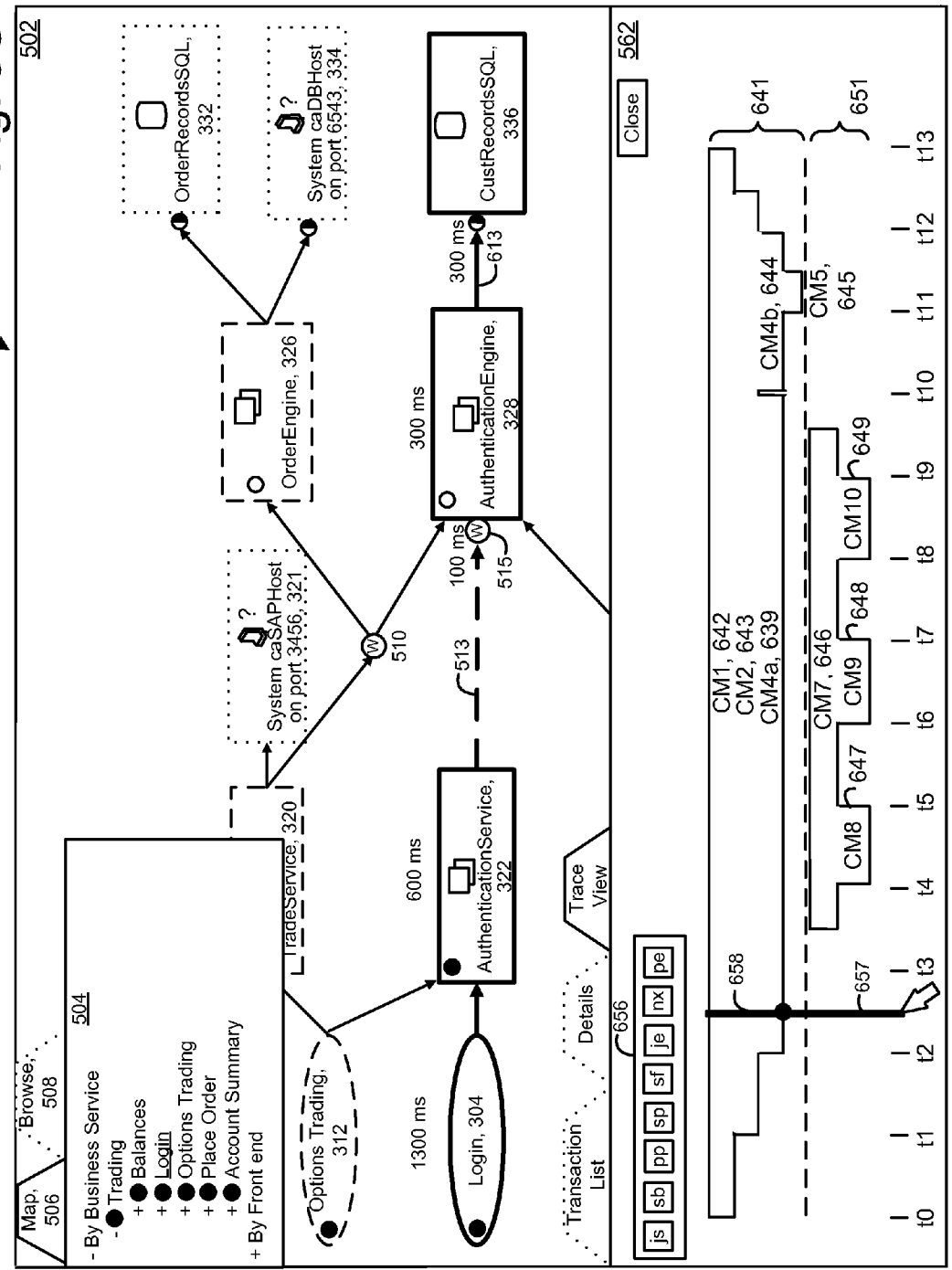

FIG. 5L depicts the user interface of FIG. 5K when a user selects a subsystem node. Here, in a UI 620, the user selects the node 322, as indicated by the cursor location and the double solid line border. This selection results in the corresponding transaction trace 641 being highlighted or otherwise visually distinguished from the transaction trace 651 with a heavier solid line in the auxiliary region 562. The user can therefore quickly identify a transaction trace, from among multiple traces in the auxiliary region 562, which is associated with a subsystem. Alternatively, the user could select the node 328 to cause the corresponding transaction trace 651 to be highlighted or otherwise visually distinguished from the transaction trace 641.

Optionally, if the user only selects the node 322, only the components (e.g., CM1, CM2, CM4b and CM5 but not CM4a) in the transaction trace 641 which do not call another subsystem are visually distinguished. If the user only selects the arrow 513, only the component (e.g., CM4a) in the transaction trace 641 which calls another subsystem is visually distinguished. All components are visually distinguished if the user selects both the node 322 and the arrow 513. Similarly, if the user selected only node 328, then only CM7 in the transaction trace 651 would be visually distinguished. If the user selected arrow 613 and/or node 336, only CM8, CM9 and CM10 (but not CM7) in trace 651 would be visually distinguished.

FIG. 5M1 depicts the user interface of FIG. 5K when a user selects a transaction trace. Here, in a UI 630, the user selects the transaction trace 641 (that is, the user selects the corresponding portion of the graph), as indicated by the cursor location, causing it to be visually distinguished from the transaction trace 651, as indicated by the heavy line. This results in the corresponding subsystem node 322 being highlighted with a heavier dashed line and thus visually distinguished from the node 328. The user can therefore quickly identify a subsystem, from among multiple subsystems in the triage map region 502, which is associated with a selected transaction trace. Alternatively, the user could select the transaction trace 651, causing it to be visually distinguished from the transaction trace 641. This results in the corresponding subsystem node 328 being highlighted and thus visually distinguished from the node 322.

In another example, the user selects an arrow which depicts a calling relationship between a subsystem and a back end (such as arrow 613 between subsystem 328 and back end 336. In response, one or more graph portions of a trace in the auxiliary region 562 are visually distinguished, such as graph portions CM8 (647), CM9 (648) and CM10 (649) in the auxiliary region 562 of FIG. 5M1, or graph portions 691-693 in the auxiliary region 562 of FIG. 5R, discussed further below. These graph portions represent components which are invoked at the subsystem 328 to call the back end 336. The subsystem 328 and/or back end 336 could also be highlighted based on this user selection. Or, the user can select a node which depicts a back end (such as back end 336), in response to which one or more graph portions of a trace in the auxiliary region 562 are visually distinguished. These graph portions represent components which are invoked at the subsystem to 328 call the back end 336. The subsystem 328 and/or arrow 613 could also be highlighted based on this user selection. See FIG. 5S for further details.

FIG. 5M2 depicts the user interface of FIG. 5K when a user selects a component in a transaction trace. In the user interface 631, auxiliary region 562, the user selects a single component CM2, in response to which the associated subsystem node 322 is visually distinguished. The user could also select multiple components of a trace, but fewer than all components of the trace, in response to which the associated subsystem node or nodes are visually distinguished. This allows the user to understand the system with greater granularity.

FIG. 5N depicts the user interface of FIG. 5K in a playback mode, where the subsystem node 322 is highlighted based on a position of a time marker. In this case, a time marker 657 such as a thick vertical line with a circle can be dragged or otherwise positioned by the user at a desired time point. The circle indicates an intersection point 658 of the time marker with the transaction trace, e.g., at a lowest level of the trace which is overlapped with the time marker. This action selects the component in the transaction trace at the intersection point.

The time marker can be moved manually by the user, e.g., by dragging it, or automatically in a playback mode. In the playback mode, the auxiliary region 562 includes a VCR-style playback control button region 656, including buttons for jump to start (js), step back (sb), play/pause (pp), stop (sp), step forward (sf), and jump to end (je). Instead of using the step back and step forward buttons, the user can click on the next (nx) or previous element (pe) while the playback is paused. An alternative is: "step back, play/stop, step forward", where the assumption is that "play" always starts from the first of the currently selected segments (or the first segment if none are selected). Stop is thus the same as pause, and the user can click on the first element to rewind or click on a later element to jump ahead.

By activating these controls, the time marker and the intersection point move, and corresponding portions of the map are highlighted. In one approach, each successive node in a Business Transaction is highlighted, based on the current position of the intersection point 658, while the previously-highlighted nodes remain highlighted. In another approach, only the nodes which are associated with the current position of the time marker are highlighted. The node 304 which identifies the Business Transaction (Login) could optionally remain highlighted through the playback.

For example, by selecting "play," the time marker can begin at t0 and move gradually from left to right at a fixed rate, with increasing time, or in steps. The user can have the ability to adjust the playback speed. Moreover, the user can adjust the time scale of the transaction traces for greater visibility into the smaller segments. The playback speed will be typically slower than the actual speed at which the data was recorded.

In one option, the "skip ahead" or "skip back" button allows the playback to proceed only in discrete increments, e.g., steps, which result in a change in the highlighted nodes and/or arrows between nodes, so that the user can quickly progress through changes in the highlighted nodes of the triage map. For example, each time the user clicks the "skip ahead" button, the time marker 657 can jump to the next time point which results in a change in highlighting of the nodes. In this case, the time marker skips in increments in response to a user command for each increment. Similarly, each time the user clicks the "skip back" button, the time marker 657 can jump to the previous time point which results in a change in highlighting of the nodes. In another option, the "skip ahead" button is a toggle button selected once by the user, in response to which the playback proceeds in the same discrete increments, but without requiring the user to reselect the command for each increment. The time marker thus moves in increments to stop at selected time points which result in a change in the highlighting of the nodes of the subsystems and/or arrows, without stopping at time points which do not result in a change in the highlighting of the nodes and/or arrows. These selected time points can be identified, e.g., by dividing the graph into intervals based on each transition in the graph, identifying the one or more subsystems and/or arrows, associated with each interval, and combining adjacent intervals which are associated with the same one or more subsystems and/or arrows. The remaining time points are time points at which a change in highlighting occurs. Clicking the button a second time would cause the button to return to its normal raised state and cause the playback to resume its regular, segment-by-segment updates.

As an example of discrete increments which result in a change in the highlighted nodes and/or arrows, the subsystem nodes and/or arrows which are highlighted, and the corresponding times are: t0 (node 322), t2 (arrow 513), t3.5 (node 328), t4 (arrow 613), t5 (node 328), t6 (arrow 613), t7 (node 328), t8 (arrow 613), t9 (node 328), t9.5 (arrow 513), t10 (node 322), and optionally t13 (node 322) as an end point.

In another option, the time marker skips from component-to-component in the transaction trace, rather than moving across the trace evenly. Each skip may or may not cause a change in the triage map, but it would help the user see where the different components are in the trace and how many components are associated with the same subsystem. Also, the map could update to show the duration of the currently selected component, e.g., rather than the total time for the subsystem. For example, td is the time for the component CM8 in FIG. 5Q, discussed further below. As an example of discrete increments for component-to-component skipping, the subsystem nodes and/or arrows which are highlighted, and the corresponding times are the same as the previous example, with the addition of: t1 (node 322), t11 (node 322), t11.5 (node 322), t12 (node 322) and t12.5 (node 322).

In the skipping approaches, the time marker can be positioned at the left most portion, the center, or the rightmost portion, of each discrete time increment.

FIG. 5O depicts the user interface of FIG. 5N, where the path 513 is highlighted in a UI 650. At this time, from t2-t3, CM4 may have made its call to CM7 as early as t2, and CM7 has not started executing until t3, so a communication via path 513 is taking place. As a result, path 513 is highlighted.

Figure 5P:
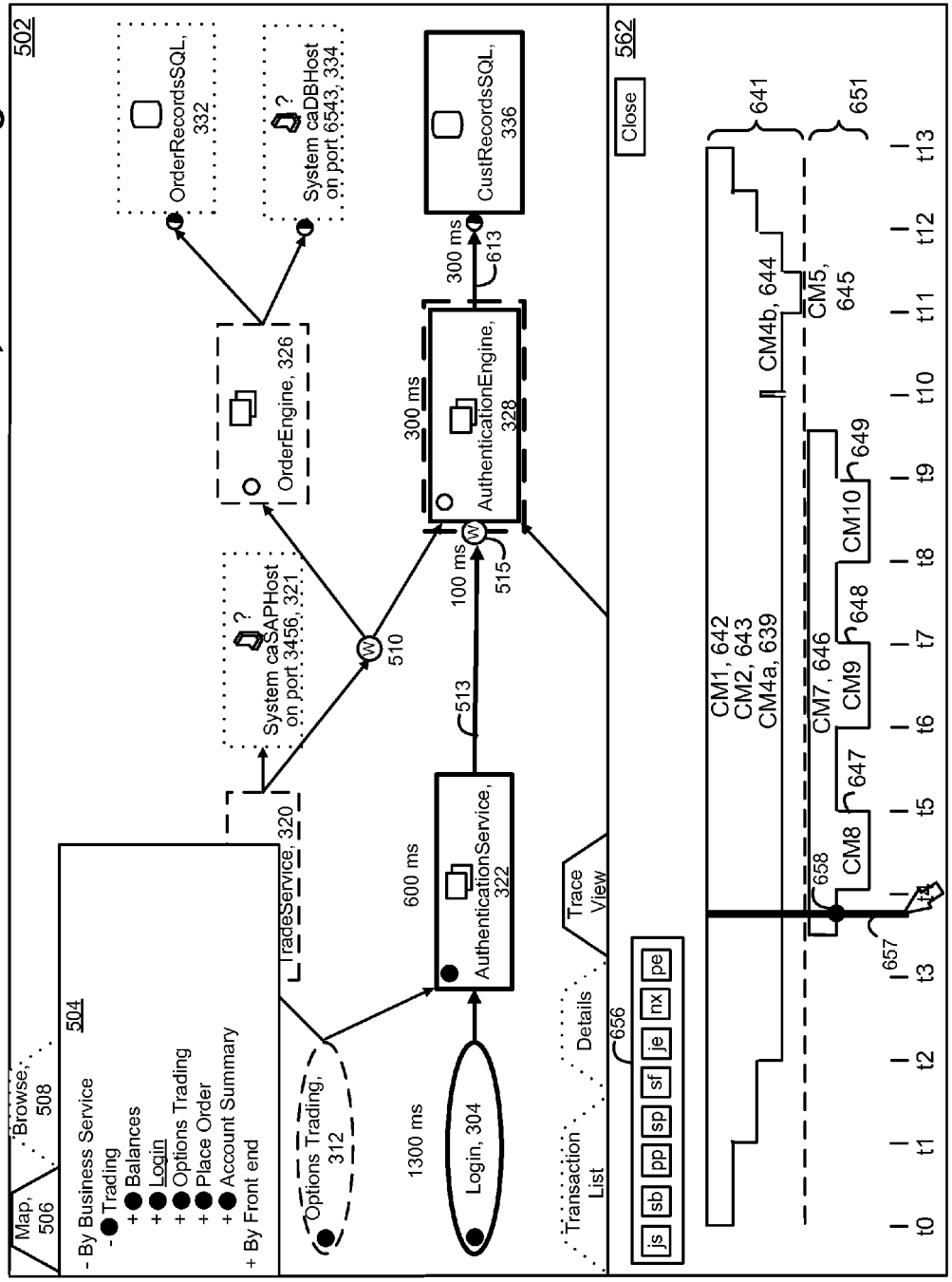
FIG. 5P depicts the user interface of FIG. 5K in a playback mode, where the subsystem node 328 is highlighted.

FIG. 5P depicts the user interface of FIG. 5N in a playback mode, where the subsystem node 328 is highlighted in a UI 660. At this time, t3-t4, CM7 is executing but a call has not yet been made to the back end 336, so the path 613 is not highlighted.

FIG. 5Q depicts the user interface of FIG. 5N in a playback mode, where the path 613 is highlighted in a UI 670. At this time, t4-t5, CM8 is making a call to the back end 336 so the path 613 (the arrow and the circle icon) is highlighted. Node 328 is not highlighted, in one approach, because it is waiting for a response from the database 336. The node 336 is not highlighted, in one approach, because it is a dummy node that has no instrumentation and therefore can't be seen in the transaction trace. Alternatively, the arrow 613 and node 336 can be tied so that they are highlighted (or not) together. Recall that the call to a back end can represent, e.g., a Web Services call, or a JDBC driver call in combination with one or more child SQL statements. CM8, CM9 and CM10 can each therefore represent a JDBC driver call in combination with one or more child SQL statements which appear at separate levels of depths in the transaction trace (the JDBC driver call at one level and the SQL statements at the next lower level. For simplicity, these are combined into one level in the transaction traces 641 and 642.

Figure 5R:
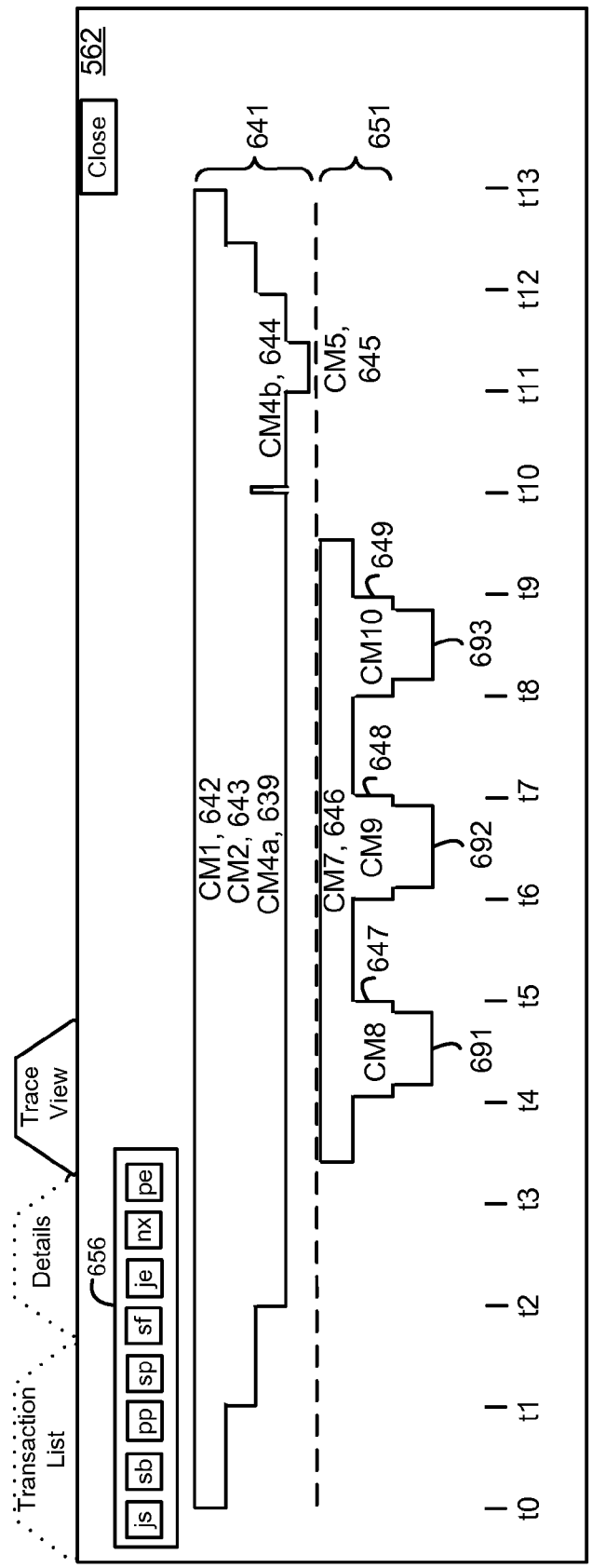
FIG. 5R depicts the transaction trace 651 of FIG. 5Q with the addition of SQL statements.

FIG. 5R depicts the transaction trace 651 of FIG. 5Q with the addition of SQL statements. As discussed, in one possible implementation, CM8, CM9 and CM10 can each be a JDBC driver call, while the child SQL statements 691, 692 and 693, respectively, are also depicted.

Figure 5S:
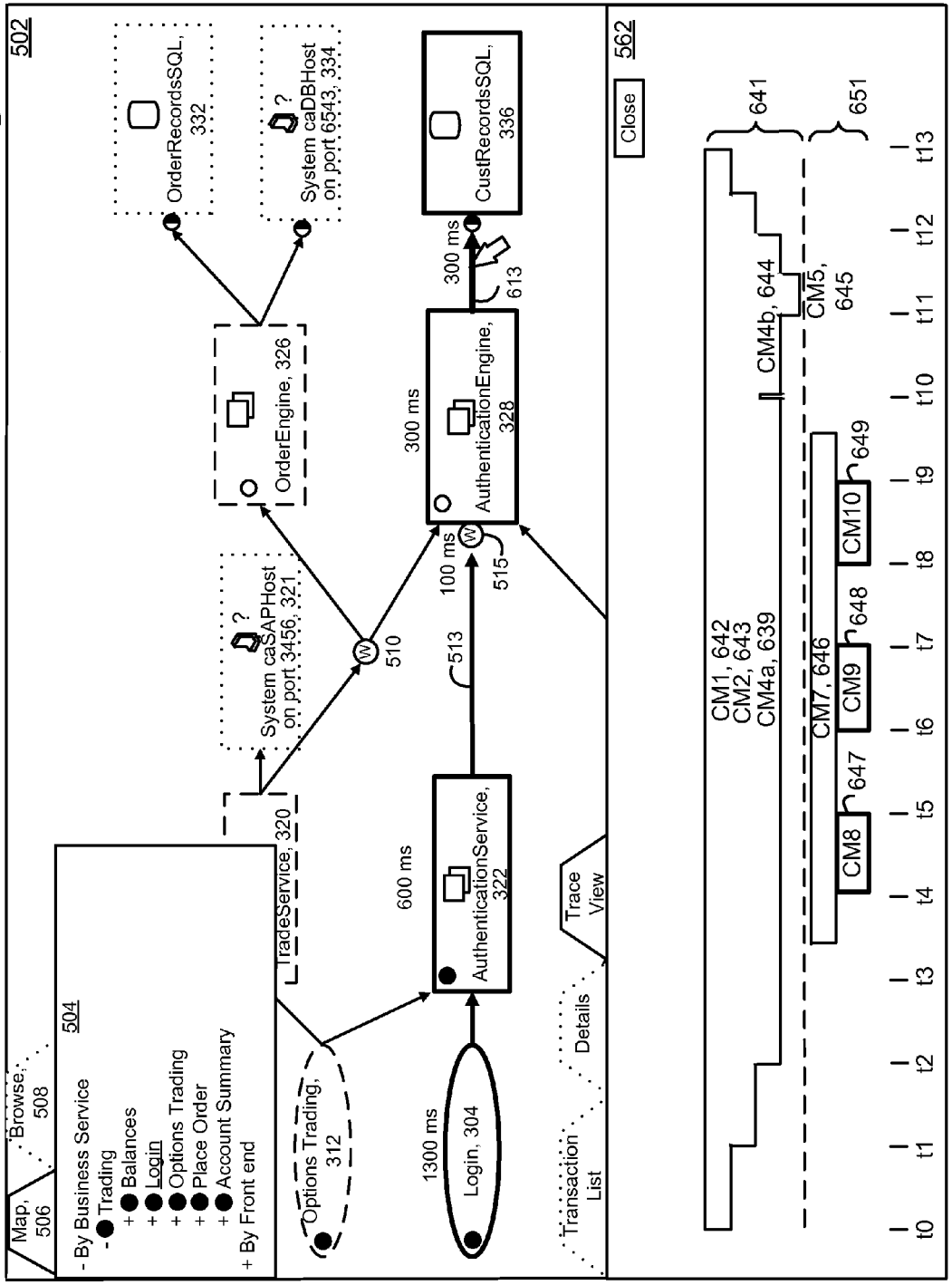
FIG. 5S depicts an example user interface 680 in which a user selects an arrow 613, resulting in the graph portions CM8 (647), CM9 (648) and CM10 (649) in the auxiliary region 562 of FIG. 5M1 being visually distinguished.

FIG. 5S depicts an example user interface 680 in which a user selects an arrow 613, resulting in the graph portions CM8 (647), CM9 (648) and CM10 (649) in the auxiliary region 562 of FIG. 5M1 being visually distinguished. The arrow-shaped cursor, and the resulting thicker arrow 613, represents the user selection. In the auxiliary region of FIG. 5R, the graph portions 691-193 could be visually distinguished, additionally or alternatively.

FIG. 6 depicts a method for providing a user interface. As mentioned, as a managed application executes, relevant component data is obtained through instrumentation of the application. This information can be reported by agents to a central manager. The data at the manager can be provided in a database 118 (FIG. 1) such as at a storage device 210 (FIG. 2C). The data can include various data fields which allow the data to be queried and accessed in different ways to achieve the functionality described herein.

At step 694, the data can be accessed for a specified time interval under analysis which can be set to a default such as 15 minutes or as specified by the user. In one approach, this step can involve the "Find more" command, discussed previously. The data can be accessed from a data store, for instance. Historical data (past days or months) could also be used, although gathering and storing large quantities of transaction trace data can be costly in terms of processing time and storage space. Also, it is possible to rely on ongoing transaction trace sampling, with the sampling set to a higher frequency.

Generally, three separate processing paths can be followed. In a first processing path, performance metrics such as response times and durations can be computed from the transaction traces/call stacks at step 698. Step 699 determines alert levels, such as by comparing the performance metrics to respective thresholds. Alerts may be computed based on the overall performance metrics for the subsystems. Regarding thresholds for transaction trace durations, we could reuse the thresholds for the subsystem's "average response time" alerts—applying them to the corresponding durations measured in the transaction traces. These thresholds might be overly sensitive for use on a single transaction, resulting in many yellow and red alerts. In one approach, performance metrics and alerts are not directly dependent on, and can be computed independently from, the triage map structure. The performance metrics describe the performance of the Business Transaction Components, front end and back end calls as a whole—that is, over all transactions observed over a particular time interval, typically every 15 seconds. This data is used in the triage map in live and historical modes.

Performance metrics can include average response time, concurrent invocations, errors per interval, responses per interval and stall count. Moreover, for a particular transaction instance, the transaction tracer can calculate the execution time and invocation duration for each Business Transaction, transaction and component based, e.g., on FIG. 4B1 and the associated discussion.

In a second processing path, two different sets of data are provided: one to specify the structure of the triage map, and one to map specific transaction traces to that map structure. These are used to provide an overlay of transaction trace information on the triage map. To provide these data sets, we identify Business Transactions and front end subsystems which were invoked in the time period, at step 695. Triage map data can be provided across all transactions. The data used to build the triage map is captured and stored on an ongoing basis (with data sampling), and each map can represent—by default—the data for the past three days, for instance, with live updates. Configuration settings can change this default time window, and the user can also specify a historical time range. In both cases, the information to build the map is retrieved from a data store.

The association of subsystems to a Business Transaction can be achieved using special map tracers that report back information about transactions that are occurring; if the transaction matches a Business Transaction Component, then that transaction is labeled with that Business Transaction Component name and all the lower-level components invoked during that transaction are associated with that Business Transaction Component (and thus its Business Transaction). Those lower-level components later get aggregated into "subsystems" based on certain rules.

A Business Transaction can be identified by looking for the selected Business Transaction Component or front end identifier—as the initial segment of the thread. Once a subsystem identifier is found in the transaction trace, it can be concluded that the subsystem has been invoked. All the calls made from that point on in the transaction are then necessarily part of the same subsystem—until the next recognized subsystem (front end or back end call) is invoked.

Moreover, within an individual transaction trace, the front end and back end-calls that appear in the map and the tree are associated with specific metric paths (identifiers) that are associated with a segment when that component is hit as part of a traced transaction.

In a third processing path, step 700 calculates health metrics in an additional set of data for the subsystems on the triage map. See also FIG. 5H. These metrics are in contrast to performance metrics such as response time which are obtained from the transaction traces.

Step 696 includes receiving a user command. User commands can include selections and/or entries in the various portions of the user interface, such as the tree region 504, main area 502 and auxiliary region 562 as described herein. Step 697 includes displaying, e.g., updating, the user interface with the relevant information for the time interval under analysis.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method, comprising:

displaying a triage map region on a user interface, the triage map region graphically depicts subsystems of an application which are invoked in one transaction instance of one Business Transaction and dependency relationships between the subsystems, the subsystems are depicted as nodes, and the dependency relationships are depicted with arrows connecting the nodes and indicate an order in which the subsystems call one another; and based on data which is obtained from an agent associated with the application and based on a user command selecting the one Business Transaction, displaying an auxiliary region of the user interface, the auxiliary region displays a first transaction trace, the first transaction trace comprises a graph which identifies invoked components of one of the subsystems and calling relationships among the invoked components of the one of the subsystems, the invoked components of the one of the subsystems are invoked in the one transaction instance of the one Business Transaction.

2. The method of claim 1, wherein:

the triage map region identifies the one Business Transaction by displaying a node with a name of the one Business Transaction;

the triage map region indicates that the node with the name of the one Business Transaction is associated with nodes of the subsystems; and the user command selects the one Business Transaction by selecting the node with the name of the one Business Transaction.

3. The method of claim 1, further comprising:

in response to a user selection of a portion of the graph, the portion depicts one of the invoked components of the one of the subsystems, visually distinguishing one of the nodes which represents the one of the subsystems.

4. The method of claim 3, wherein:

another of the subsystems comprises a back end which is called by the one of the subsystems in the one transaction instance;

the triage map region use one of the arrows to graphically depict a dependency relationship between the one of the subsystems and the back end; and the method performed further comprises, in response to the user selection of the portion of the graph, visually distinguishing the one of the arrows.

5. The method of claim 1, wherein:

based on the data which is obtained from the agent associated with the application and based on the user command selecting the one Business Transaction, the auxiliary region displays a second transaction trace on a common time scale with the first transaction trace, the second transaction trace comprises a graph which identifies invoked components of another of the subsystems in the one transaction instance and calling relationships among the invoked components of the another of the subsystems in the one transaction instance.

6. The method of claim 5, further comprising:

in response to a user selection of a portion of the graph of the first transaction trace, visually distinguishing one of the nodes which represents the one of the subsystems from another of the nodes which represents the another of the subsystems.

7. The method of claim 5, further comprising:

in response to a user selection of one of the nodes which represents the one of the subsystems, visually distinguishing the graph of the first transaction trace from the graph of the second transaction trace.

8. The method of claim 1, wherein:

another of the subsystems comprises a back end which is called by the one of the subsystems in the one transaction instance;

the triage map region uses one of the arrows to graphically depict a dependency relationship between the one of the subsystems and the back end; and the method performed further comprises, in response to a user selection of the one of the arrows, visually distinguishing one portion of the graph which represents one of the invoked components in the one of the subsystems which calls the back end.

9. The method of claim 1, wherein:
   another of the subsystems comprises a back end which is called by the one of the subsystems in the one transaction instance; and
   the triage map region uses one of the arrows to graphically depict a dependency relationship between the one of the subsystems and the back end; and
   the method performed further comprises, in response to a user selection of one of the nodes which represents the back end, visually distinguishing one portion of the graph which represents one of the invoked components in the one of the subsystems which calls the back end.

10. Tangible, non-transitory computer readable storage comprising computer readable software embodied thereon for programming a processor to perform a method, the method performed comprises:
    displaying a triage map region on a user interface, the triage map region graphically depicts subsystems of an application and dependency relationships between the subsystems, the subsystems are depicted as nodes and the dependency relationships indicate an order in which the subsystems call one another;
    based on data which is obtained from an agent associated with the application, displaying an auxiliary region of the user interface, the auxiliary region displays one transaction trace, the one transaction trace comprises a graph which identifies invoked components of one of the subsystems and calling relationships among the invoked components, the invoked components are invoked in one transaction instance;
    updating the auxiliary region in a time sequence in which a time marker moves across the one transaction trace; and
    updating the triage map region to visually distinguish one of the nodes which represents one of the subsystems based on a position of the time marker.

11. The tangible, non-transitory computer readable storage of claim 10, wherein:
    the one of the nodes which represents the one of the subsystems is visually distinguished when the time marker intersects with a portion of the one transaction trace which represents one of the invoked components.

12. The tangible, non-transitory computer readable storage of claim 10, wherein:
    the auxiliary region is updated to show a duration of each of the invoked components as the time marker skips between portions of the graph which represent the invoked components.

13. The tangible, non-transitory computer readable storage of claim 10, wherein:
    the time marker skips to selected time points in the graph which result in updating of the triage map region without stopping at time points in the graph which do not result in updating of the triage map region.

14. The tangible, non-transitory computer readable storage of claim 10, wherein:
    the dependency relationships are depicted with arrows connecting the nodes; and
    the time marker skips to selected time points in the graph which result in updating of the triage map region to visually distinguish at least one of the subsystems or one of the arrows.

15. The tangible, non-transitory computer readable storage of claim 10, wherein:
    the dependency relationships are depicted using an arrow connecting the one of the nodes which represents the one of the subsystems with one of the nodes which represents another of the subsystems which is called by the one of the subsystems; and
    the triage map region is updated to visually distinguish the arrow when the time marker intersects with a portion of the graph which represents a call from the one of the subsystems to the another of the subsystems.

16. The tangible, non-transitory computer readable storage of claim 10, wherein:
    the auxiliary region displays another transaction trace, the another transaction trace comprises a graph which identifies invoked components of another of the subsystems in the one transaction instance and calling relationships among the invoked components of the another of the subsystems in the one transaction instance;
    the graph of the one transaction trace is on a common time scale with the graph of the another transaction trace; and
    the triage map region is updated to visually distinguish one of the nodes which represents the another of the subsystems when the position of the time marker intersects with the graph of the another transaction trace.

17. A method, comprising:
    displaying a triage map region on a user interface, the triage map region graphically depicts subsystems of an application and dependency relationships between the subsystems, the subsystems are depicted as nodes the dependency relationships are depicted with arrows connecting the nodes and indicate an order in which the subsystems call one another;
    based on data which is obtained from an agent associated with the application, displaying an auxiliary region of the user interface, the auxiliary region displays one transaction trace, the one transaction trace comprises a graph which identifies invoked components of one of the subsystems and calling relationships among the invoked components, the invoked components are invoked in one transaction instance;
    updating the auxiliary region in a time sequence in which a time marker moves across the one transaction trace;
    updating the triage map region to visually distinguish one of the subsystems based on a position of the time marker; and
    updating the triage map region to visually distinguish one of the arrows based on a position of the time marker when the time marker is at a point in the one transaction trace at which a call is made by the one of the subsystems to another of the subsystems.

18. The method of claim 17, wherein:
    the one of the arrows is between one of the nodes which represents the one of the subsystems and another of the nodes which represents the another of the subsystems.

19. The method of claim 17, wherein:
    the another of the subsystems comprises an un-instrumented subsystem.

20. The method of claim 17, wherein:
    the auxiliary region displays another transaction trace, the another transaction trace comprises a graph which identifies invoked components of another of the subsystems in the one transaction instance and calling relationships among the invoked components of the another of the subsystems in the one transaction instance;
    the graph of the one transaction trace is on a common time scale with the graph of the another transaction trace; and
    the triage map region is updated to visually distinguish one of the nodes which represents the another of the subsystems when the position of the time marker intersects with the graph of the another transaction trace.

* * * * *